US011368675B2

United States Patent
Jeong et al.

(10) Patent No.: US 11,368,675 B2
(45) Date of Patent: Jun. 21, 2022

(54) METHOD AND DEVICE FOR ENCODING AND DECODING INTRA-FRAME PREDICTION

(71) Applicant: Dolby Laboratories Licensing Corporation, San Francisco, CA (US)

(72) Inventors: Je Chang Jeong, Seoul (KR); Ki Baek Kim, Seoul (KR); Ung Hwang, Bucheon-si (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/579,217

(22) Filed: Sep. 23, 2019

(65) Prior Publication Data

US 2020/0021801 A1    Jan. 16, 2020

Related U.S. Application Data

(63) Continuation of application No. 15/579,869, filed as application No. PCT/KR2016/006013 on Jun. 7, 2016, now abandoned.

(30) Foreign Application Priority Data

Jun. 5, 2015  (KR) .................. 10-2015-0079878
Jun. 5, 2015  (KR) .................. 10-2015-0079896

(51) Int. Cl.
  *H04N 19/105*  (2014.01)
  *H04N 19/577*  (2014.01)
  (Continued)

(52) U.S. Cl.
  CPC ......... *H04N 19/105* (2014.11); *H04N 19/109* (2014.11); *H04N 19/117* (2014.11);
  (Continued)

(58) Field of Classification Search
  None
  See application file for complete search history.

(56) References Cited

U.S. PATENT DOCUMENTS

2011/0286679 A1   11/2011  Boon et al.
2012/0314766 A1*  12/2012  Chien .................. H04N 19/11
                                              375/240.12
(Continued)

FOREIGN PATENT DOCUMENTS

CN   102957911 A   3/2013
CN   103907351 A   7/2014
(Continued)

OTHER PUBLICATIONS

Nilsson, Mike et al., "Proposed Draft Text Motifications to Joint Video Specification (ITU-T Rec. H.264 | ISO/IEC 14496-10 AVC), for decoded frame buffering", *Joint Video Team (JVT) of ISO/IEC MPEG and ITU-T VCEG*, 5th Meeting: Geneva, Switzerland, Oct. 9-17, 2002 (227 pages in English).
(Continued)

*Primary Examiner* — Clifford Hilaire
(74) *Attorney, Agent, or Firm* — Michael Best & Friedrich LLP

(57) ABSTRACT

A method and a device for encoding and decoding intra prediction are disclosed. An image decoding method for performing intra prediction comprises the steps of: receiving a bitstream including data on prediction modes of a current block and a block adjacent to the current block; extracting the data from the received bitstream so as to confirm the prediction mode of the adjacent block; determining whether a boundary pixel within the adjacent block can be used as a reference pixel for the current block in consideration of the prediction mode of the adjacent block; obtaining the reference pixel of the current block according to the determined result; generating a prediction block predicted in the frame
(Continued)

on the basis of the obtained reference pixel; and decoding the current block by using the generated prediction block.

3 Claims, 27 Drawing Sheets

(51) Int. Cl.
*H04N 19/593* (2014.01)
*H04N 19/176* (2014.01)
*H04N 19/119* (2014.01)
*H04N 19/59* (2014.01)
*H04N 19/109* (2014.01)
*H04N 19/117* (2014.01)
*H04N 19/51* (2014.01)

(52) U.S. Cl.
CPC ......... *H04N 19/119* (2014.11); *H04N 19/176* (2014.11); *H04N 19/51* (2014.11); *H04N 19/577* (2014.11); *H04N 19/59* (2014.11); *H04N 19/593* (2014.11)

(56) References Cited

U.S. PATENT DOCUMENTS

| | | | |
|---|---|---|---|
| 2013/0136175 | A1 | 5/2013 | Wang et al. |
| 2013/0301715 | A1 | 11/2013 | Lin et al. |
| 2013/0336406 | A1 | 12/2013 | Zhang et al. |
| 2014/0140404 | A1 | 5/2014 | Liu et al. |
| 2014/0307787 | A1 | 10/2014 | Zheng et al. |
| 2015/0023405 | A1 | 1/2015 | Joshi et al. |
| 2015/0110181 | A1 | 4/2015 | Saxena et al. |
| 2015/0358623 | A1 | 12/2015 | Li et al. |
| 2015/0365692 | A1* | 12/2015 | Liu ................... H04N 19/186 375/240.13 |
| 2016/0100189 | A1* | 4/2016 | Pang ................... H04N 19/593 375/240.13 |

FOREIGN PATENT DOCUMENTS

| | | |
|---|---|---|
| CN | 104081770 A | 10/2014 |
| CN | 104541510 A | 4/2015 |
| KR | 10-2012-0058379 A | 6/2012 |
| KR | 10-2013-0105114 A | 9/2013 |
| KR | 10-2015-0000851 A | 1/2015 |
| WO | WO 2014/107083 A1 | 7/2014 |

OTHER PUBLICATIONS

Xu, Xiaozhong et al., "CE2: Test 5-Intra BC unified with Inter using intra_bc_flag", Joint Collaborative Team on Video Coding (JCT-VC) of ITU-T SG 16 WP 3 and ISO/IEC JTC 1/SC 29/WG 11, 19th Meeting: Strasbourg, France, Oct. 17-24, 2014 (9 pages in English).
Pang, Chao et al., "Non-CE2: Intra block copy with Inter Signaling", *Joint Collaborative Team on Video Coding (JCT-VC) of ITU-T SG 16 WP 3 and ISO/IEC JTC 1/SC 29/WG 11*, 19th Meeting: Strasbourg, France, Oct. 17-24, 2014 (3 pages in English).
Rapaka, Krishna et al., "HLS: On intra block copy signaling control", *Joint Collaborative Team on Video Coding (JCT-VC) of ITU-T SG 16 WP 3 and ISO/IEC JTC 1/SC 29/WG 11*, 21st Meeting: Warsaw, Poland, Jun. 19-26, 2015 (5 pages in English).
International Search Report dated Aug. 24, 2016 in counterpart international application No. PCT/KR2016/006013 (3 pages in English; 3 pages in Korean).
Joshi, Rajan, et al. "High Efficiency Video Coding (HEVC) Screen Content Coding: Draft 2." *Joint Collaborative Team on Video Coding (JCT-VC) of ITU-T SG 16* (2014): 372-374.(7 pages in English).

\* cited by examiner

FIG. 12

| Intra | Inter | |
|---|---|---|
| | ref_idx = curr | else |
| 2Nx2N, NxN | skip, 2Nx2N, NxN | skip, 2Nx2N, 2NxN, Nx2N, nLx2N, nRx2N, 2NxnU, 2NxnD |

METHOD AND DEVICE FOR ENCODING AND DECODING INTRA-FRAME PREDICTION

CROSS REFERENCE TO RELATED APPLICATIONS

This application is a Continuation Application of U.S. patent application Ser. No. 15/579,869, filed on Dec. 5, 2017, now abandoned, which is a U.S. National Stage Application of International Application No. PCT/KR2016/006013, filed on Jun. 7, 2016, which claims the benefit under 35 USC 119(a) and 365(b) of Korean Patent Application No. 10-2015-0079878, filed on Jun. 5, 2015 and Korean Patent Application No 10-2015-0079896, filed on Jun. 5, 2015 in the Korean Intellectual Property Office, the entire disclosures of which are incorporated herein by reference for all purposes.

TECHNICAL FIELD

The present invention relates to an image encoding and decoding technology and, more particularly, to encoding and decoding method and device for performing a reference pixel construction and a most probable mode construction in intra prediction.

BACKGROUND ART

With the spread of an Internet and mobile terminals and the development of information and communication technology, the use of multimedia data is increasing rapidly. Therefore, in order to perform various services or tasks through image prediction in various systems, a need for improvements of performance and efficiency of the image processing system has increased considerably, but research and developments that can meet such needs are insufficient.

With an image encoding and decoding method and device according to the existing art described above, there has been a demand for performance improvement of image processing, particularly image encoding or image decoding.

DISCLOSURE

Technical Problem

The present invention has been made to solve the above problems, and an object of the present invention is to provide an image encoding/decoding method that improves an intra prediction mode.

Other object of the present invention is to provide an image encoding/decoding device that improves an intra prediction mode.

Technical Solution

An image encoding method for performing intra prediction according to an aspect of the present invention in order to achieve an object of the present invention, includes determining whether a boundary pixel within an adjacent block is available as a reference pixel of the a current block in consideration of a prediction mode of each of the current block and the adjacent block, obtaining the reference pixel of the current block based on the determined result, generating a prediction block by performing intra prediction based on the obtained reference pixel, and decoding the current block using the generated prediction block.

Here, the obtaining the reference pixel may be performed by obtaining the reference pixel composed of a predetermined pixel value, when the boundary pixel is determined to be unavailable as the reference pixel of the current block.

Here, the determining whether the boundary pixel is available as the reference pixel may be performed by indicating whether a predefined flag takes into consideration a prediction mode of an adjacent block.

Here, the determining whether the boundary pixel is available as the reference pixel may be performed by determining that the boundary pixel is available as a reference pixel of the current picture when the prediction mode of the adjacent block is intra prediction.

Here, the determining whether the boundary pixel is available as the reference pixel may be performed by determining that the boundary pixel is unavailable as a reference pixel of the current picture when the prediction mode of the adjacent block is inter prediction.

Here, the determining whether the boundary pixel is available as the reference pixel may be performed by determining whether the boundary pixel is available as the reference pixel of the current picture in consideration of the reference picture of the adjacent block when the prediction mode of the adjacent block is inter prediction.

Here, the reference picture may be selected from a list 0 storing data for reference pictures previous to the current picture or a list 1 storing data for reference pictures subsequent to the current picture, and the current picture is selected from the list 0 or the list 1.

Here, when the reference picture of the adjacent block is the current picture, the boundary pixel may be determined to be available as a reference pixel of the current picture.

Here, if the reference picture of the adjacent block is not the current picture, it may be determined that the boundary pixel is unavailable as the reference pixel of the current picture Here, when the reference picture of the adjacent block is an I-picture, the boundary pixel may be determined to be available as the reference pixel of the current picture.

An image decoding method for performing intra prediction according to another aspect of the present invention in order to achieve other object of the present invention, includes receiving a bitstream including data on prediction modes of a current block and a block adjacent of the current block, confirming the prediction mode of the adjacent block by extracting data from the bitstream received, determining whether a boundary pixel within the adjacent block is available as a reference pixel of the current block in consideration of the prediction mode of the adjacent block, obtaining the reference pixel of the current block depending on the determined result, generating a prediction block by performing intra prediction based on the obtained reference pixel, and decoding the current block using the generated prediction block.

Here, the obtaining the reference pixel may be performed by obtaining the reference pixel constituted by the preset pixel value when the boundary pixel is determined to be unavailable as the reference pixel of the current block.

Here, the determining whether a boundary pixel is available as a reference pixel may indicate whether a preset flag takes into consideration a prediction mode of an adjacent block Here, the determining whether a boundary pixel is available as a reference pixel may be performed by determining that the boundary pixel is available as a reference pixel of the current picture when the prediction mode of the adjacent block is intra prediction.

Here, the determining whether a boundary pixel is available as a reference pixel may be performed by determining that the boundary pixel is unavailable as a reference pixel of the current picture when the prediction mode of the adjacent block is inter prediction.

Here, the determining whether a boundary pixel is available as a reference pixel may be performed by determining whether the boundary pixel is available as a reference pixel of the current picture in consideration of the reference picture of the adjacent block.

Here, the reference picture may be selected from a list 0 storing data for reference pictures previous to the current picture and a list 1 storing data for reference pictures subsequent to the current picture, and the current picture may be included in the list 0 or the list 1.

Here, it may be determined that the boundary pixel is available as the reference picture of the current picture, when the reference picture of the adjacent block is the current picture.

Here, it may be determined that the pixel in the adjacent block is unavailable as the reference picture of the current picture when the reference picture of the adjacent block is not the current picture.

Here, it may be determined that the pixel in the adjacent block is available as the reference picture of the current picture, when the reference picture of the adjacent block is an I-picture.

In the image decoding device including one or more processors according to another aspect of the present invention in order to achieve other object of the present invention, one or more processors may receive a bitstream including data on a prediction mode of a current block and a block adjacent to the current block, extract the data from the bitstream received to confirm the prediction mode of the adjacent block, determine whether the boundary pixel within the adjacent block is available as the reference pixel of the current block in consideration of the prediction mode of the adjacent block, obtain the reference pixel of the current block based on the determined result, generate prediction block by performing intra prediction based on the obtained reference pixel, and decode the current block using the generated prediction block.

An image encoding method for performing intra prediction according to an aspect of the present invention in order to achieve the object of the present invention, includes determining whether each of a left block and an upper block of a current block can be used for constructing a reference pixel of the current block, selecting a most probable mode MPM candidate group based on the determined result, determining redundancy of a prediction block derived from an intra prediction mode in the MPM candidate group, selecting a MPM group using prediction modes of substitute blocks adjacent to the left block or adjacent to the upper block when it is determined that the redundancy exists, and performing an intra prediction mode encoding on the current block based on the selected MPM group.

Here, the determining whether or not each block can be used may be performed by determining to be unavailable when the left block and the upper block exist outside the image boundary or encoded with inter prediction, and may be determined to be available when they are otherwise.

Herein, the MPM candidate group may be selected from intra prediction mode for a block determined to be available among a left block and an upper block, intra-prediction mode predetermined for a block determined to be unavailable, a planar prediction mode, a prediction mode, and a DC prediction mode.

Here, the determining the redundancy may be performed by determining the redundancy based on variance values computed for reference pixel values in two or more consecutive blocks among the blocks located at lower left, left, upper left, upper, and upper right of the current block, when the left block and the upper block are all available.

The determining the redundancy may include selecting intra prediction modes constructed by referring only to boundary pixels between an unavailable block and the current block when at least one of the left block and the upper block is unavailable, and determining that the redundancy exists when at least two of the prediction modes selected are included in the MPM candidate group.

Here, the substitute blocks may be selected from the adjacent blocks located at lower left, upper left, and upper right of the current block.

Here, when an adjacent block is constructed with one or more blocks, the substitute block may be selected with a clockwise or counterclockwise priority among the one or more blocks.

Here, the substitute block may be selected with a clockwise or counterclockwise priority among the adjacent blocks located at lower left, upper left, and upper right of the current block.

According to another aspect of the present invention, an image decoding method for performing intra prediction may include extracting data on whether a prediction mode for a current block is included in a most probable mode MPM group from received bitstream, determining whether a prediction mode for the current block is included in the MPM group based on the data, extracting MPM group index data of the current block from the received bitstream when it is determined that the prediction mode for the current block is included in the MPM group, confirming the prediction mode for the current block in the MPM group based on the extracted MPM group index data, and performing intra prediction on the current block based on the confirmed prediction mode.

Here, the MPM group may be selected by determining whether a left block and an upper block of the current block can be used for constructing a reference pixel of the current block, selecting a most probable mode MPM candidate group based on the determined result, determining redundancy of prediction blocks derived from intra prediction modes in the MPM candidate group, and using a prediction mode of a substitute block adjacent to the left block or adjacent to the upper block when it is determined that the redundancy exists.

Here, the determining whether or not the blocks can be used may be performed by determining to be unavailable when each of the left block and the upper block exists outside an image boundary or encoded with inter prediction, and may determine to be available when they are otherwise.

Herein, the MPM candidate group may be selected from intra prediction mode for a block determined to be available among a left block and an upper block, intra-prediction mode predetermined for a block determined to be unavailable, a planar prediction mode, a prediction mode, and a DC prediction mode.

Here, the determining the redundancy of the prediction block may be performed by determining the redundancy based on variance values computed for reference pixel values in two or more consecutive blocks among the blocks located at lower left, left, upper left, upper, and upper right of the current block, when the left block and the upper block are all available.

Here, the determining the redundancy of the prediction block may select an intra prediction mode constructed by referring only to boundary pixels between the unavailable block and the current block when at least one of the left block and the upper block is unavailable, and determine that the redundancy exists when at least two of the prediction modes selected are included in the MPM candidate group.

Here, the substitute block may be selected from adjacent blocks located at lower left, upper left, and upper right of the current block.

When the adjacent block is constructed with one or more blocks, the substitute block may be selected with a clockwise or counterclockwise priority among the one or more blocks.

Here, the substitute block may be selected with a clockwise or counterclockwise priority among the adjacent blocks located at lower left, upper left, and upper right of the current block.

In an image decoding device including one or processors according to other aspect of the present invention in order to achieve the object, the one or more processors may extract data related to whether a prediction mode for a current block is included in a most probable mode MPM group from bitstream received, determine whether the prediction mode for the current block is included in the MPM group based on the data, extract MPM group index data of the current block from the received bitstream when it is determined that the prediction mode for the current block is included in the MPM group, confirm the prediction mode for the current block in the MPM group based on the extracted MPM group index data, and perform intra prediction on the current block based on the confirmed prediction mode.

Here, the MPM group may be selected by determining whether a left block and an upper block of the current block can be used for constructing a reference pixel of the current block, selecting a MPM candidate group based on the determined result, determining redundancy of the prediction block derived from an intra prediction mode in the MPM candidate group, and using a prediction mode of a substitute block adjacent to the left block or adjacent to the upper block when it is determined that the redundancy exists.

Here, the determining whether or not the blocks can be used may be performed by determining to be unavailable when each of the left block and the upper block exist outside an image boundary or encoded with inter prediction, and may determine to be available when they are otherwise.

The determining the redundancy of the prediction block may select intra prediction mode constructed by referring only to boundary pixels between the unavailable block and the current block when at least one of the left block and the upper block is unavailable, and determine that the redundancy exists when at least two of the prediction modes selected are included in the MPM candidate group.

Advantageous Effects

When the image encoding/decoding method and device according to the embodiment of the present invention as described above is used, accuracy of prediction can be increased by realizing an improvement in the reference pixel construction and the most probable mode construction in an intra prediction.

In addition, in the intra prediction, the encoding efficiency of the picture can be improved by increasing the accuracy of the prediction.

DESCRIPTION OF DRAWINGS

FIG. 12 is an exemplary view illustrating a main procedure of the image encoding method according to an embodiment of the present invention, using a syntax in a coding unit.

MODE FOR INVENTION

Figure 1:
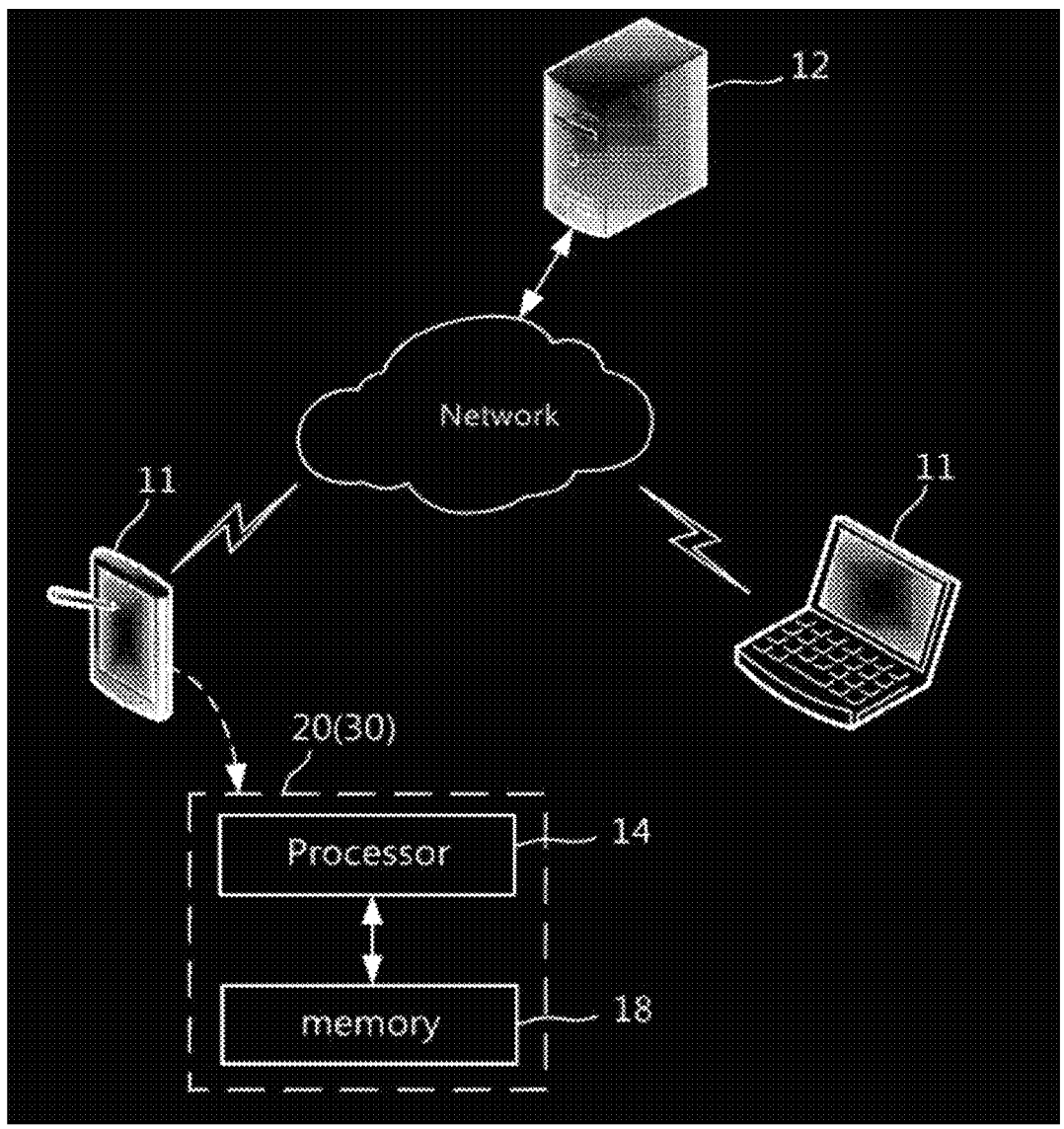
FIG. 1 is a conceptual view of an image encoding and decoding system according to an embodiment of the present invention.

While the invention is capable of being variously modified and altered, specific embodiments thereof are shown by way of example in the drawings and will herein be described in detail. It is to be understood, however, that the invention is not to be limited to the specific embodiments, but includes all modifications, equivalents, and alternatives falling within the spirit and scope of the invention.

Terms such as first, second, A, B, and the like may be used to describe various components, but the components should not be limited by these terms. The terms are used only for the purpose of distinguishing one component from another. For example, without departing from the scope of the present invention, the first component may be referred to as a second component, and similarly, the second component may also be referred to as a first component. The term "and/or" includes any combination of a plurality of related listed items or any of a plurality of related listed items.

It is to be understood that when an element is referred to as being "connected" or "coupled" to another element, it may be directly connected or coupled to the other component, but it should be understood that other components may be present between them. On the other hand, when an element is referred to as being "directly connected" or "directly coupled" to another element, it should be understood that there are no other elements between them.

The terminology used herein is for the purpose of describing particular embodiments only and is not intended to be limiting of the invention. The singular forms include plural referents unless the context clearly dictates otherwise. In this application, the terms "comprises" or "having", etc., are used to specify that there is a stated feature, figure, step, operation, element, part or combination thereof, but do not preclude the presence or addition of one or more other features, integers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in commonly used dictionaries should be interpreted as having a meaning consistent with the contextual meaning of the related art and should not be interpreted as either ideal or overly formal in meaning unless explicitly defined in the present application.

In general, a moving picture can be composed of a series of pictures, and each picture can be divided into a predetermined area such as a block. In addition, the divided area may be referred to as various sizes or terms such as a coding tree unit (CTU), a coding unit (CU), a prediction unit (PU), and a transform unit (TU) as well as a block. Each unit may be constructed with one luminance block and two color difference blocks, which may be differently constructed according to the color format. In addition, sizes of the luminance block and the color difference block can be determined according to the color format. For example, in the case of 4:2:0, the size of the color difference block may have a length of ½ of a width and a height of the luminance block. For these units, reference can be made to terms such as existing HEVC or H.264/AVC. In the present invention, the blocks and the terms are used in an intermixed manner, but they can be understood differently according to standard techniques, and they should be understood as corresponding terms or units for the encoding and decoding processes according to such standard techniques.

In addition, a picture, a block, or a pixel referenced when encoding or decoding a current block or a current pixel are referred to as a reference picture, a reference block, or a reference pixel. It will be understood by those skilled in the art to which this embodiment belongs that the term "picture" described below may be used in place of other terms having equivalent meanings such as image, frame, and the like.

Hereinafter, preferred embodiments of the present invention will be described in detail with reference to the accompanying drawings. In order to facilitate a thorough understanding of the present invention, the same reference numerals are used for the same constituent elements in the drawings and redundant explanations for the same constituent elements are omitted.

FIG. 1 is a conceptual diagram of an image encoding and decoding system according to an embodiment of the present invention.

Referring to FIG. 1, an image encoding device 12 and a decoding device 11 may be implemented by a user terminal such as a personal computer (PC), a notebook computer, a personal digital assistant (PDA), a portable multimedia player (PMP), a PlayStation Portable (PSP), a wireless communication terminal, a smart phone, a TV, and the like, or a server terminal such as an application server and a service server, and may include a communication device such as a communication modem for performing communication with various machines or a wired/wireless communication network, a memory 18 for encoding or decoding an image or storing various programs and data for inter- or intra-prediction for encoding or decoding, a processor 14 for computing and controlling via a program execution, and the like. Further, the video encoded by the video encoding device 12 as a bitstream can be transmitted to the video decoding device and then decrypted by the video decoding device to be reconstructed and reproduced as an image, through a wired or wireless communication network such as the Internet, a local area wireless communication network, a wireless LAN network, a WiBro network, a mobile communication network, or the like in real time or non-real time, or various communication interfaces such as a cable, a universal serial bus (USB), and the like.

In addition, an image encoded by a video encoding device as a bitstream may be transmitted from an encoding device to a decoding device through a computer-readable recording medium.

Figure 2:
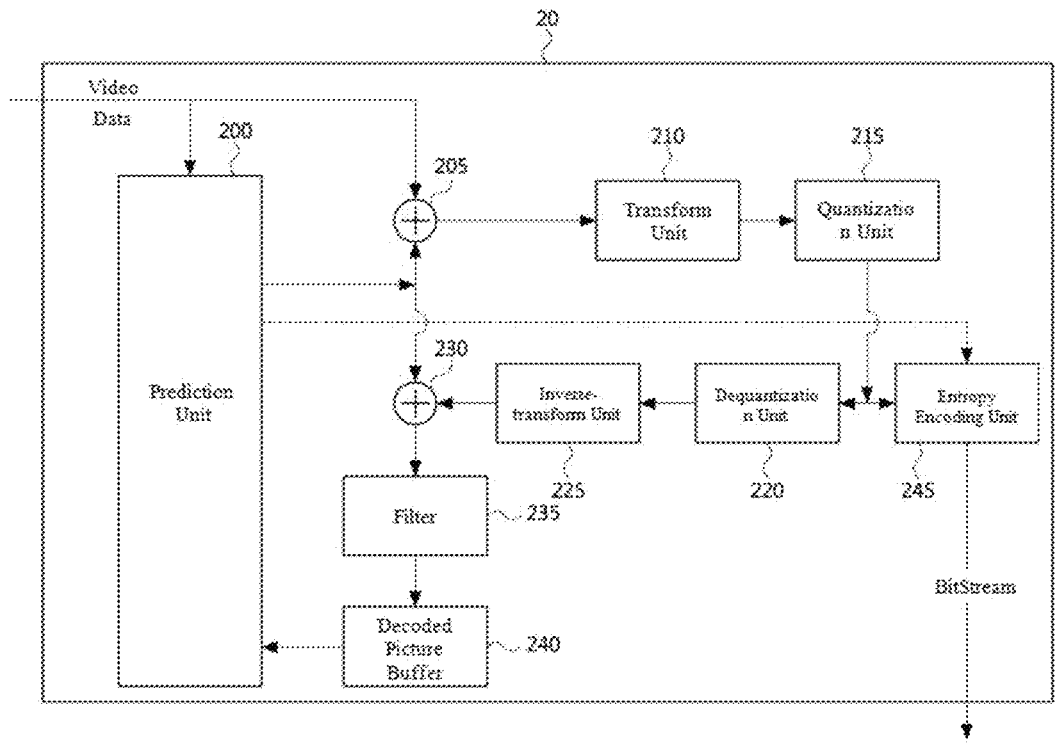
FIG. 2 is a construction view of an image encoding device according to an embodiment of the present invention.
Figure 3:
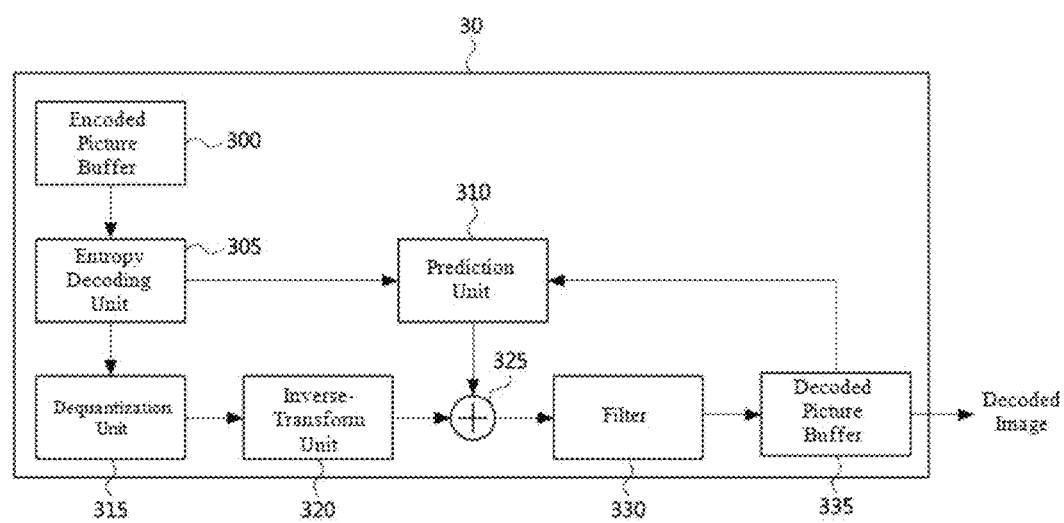
FIG. 3 is a construction view of an image decoding device according to an embodiment of the present invention.

FIG. 2 is a block diagram of an image encoding device according to an embodiment of the present invention. FIG. 3 is a block diagram of an image decoding device according to an embodiment of the present invention.

An image encoding device 20 according to the present embodiment includes a prediction unit 200, a subtract unit 205, a transform unit 210, a quantization unit 215, a dequantization unit 220, an inverse-transform unit 225, an adding unit 230, a filter 235, a decoded picture buffer 240, and an entropy encoding unit 245, as shown in FIG. 2.

An image decoding device 30 according to the present embodiment includes an entropy decoding unit 305, a prediction unit 310, a dequantization unit 315, an inverse-transform unit 320, an adding unit 325, a filter unit 330, and a decoded picture buffer 335, as shown in FIG. 3.

The image encoding device 20 and the image decoding device 30 may be separately configured, but they can be combined into one image encoding and decoding device according to the implementation. In this case, the prediction unit 200, the dequantization unit 220, the inverse-transform unit 225, the addition unit 230, the filter 235, and the memory 240 of the image encoding device 20 are substantially the same technical elements as the prediction unit 310, the dequantization unit 315, the inverse-transform unit 320, the adding unit 325, the filter unit 330, and the memory 335 of the image decoding device 30 in an order disclosed, in which they may include the same structure or may be implemented to perform at least the same function. In addition, the entropy encoding part 245 may correspond to the entropy decoding unit 305 when the entropy encoding part 245 performs its function reversely. Therefore, in the following description of the technical elements and their operating principles, a duplicate description of the corresponding technical elements will be omitted.

Since the image decoding device 30 corresponds to a computing device that applies the image encoding method performed in the image encoding device 20 to decoding, the following description will focus on the image encoding device 20.

The computing device may include a memory that stores a program or a software module implementing the image encoding method and/or the image decoding method, and a processor that is coupled to the memory and executes the program. The image encoding device may be referred to as an encoder, and the image decoding device may be referred to as a decoder.

Each component of the image encoding device of the present embodiment will be described in more detail as follows.

Here, the image encoding device 20 may further include a division unit. The division unit divides the input image into blocks (M×N) of a predetermined size. Here, M or N is any natural number greater than one. In detail, the division unit may be constructed with a picture division unit and a block division unit. A size or a type of the block can be determined according to characteristics and resolution of the image, and the size or the type of the block supported through the picture division unit may be an M×N square type (256×256, 128×128, 64×64, 32×32, 16×16, 8×8, 4×4, etc.) in which a horizontal length and a vertical length are represented as powers of 2, or an M×N rectangular type. For example, the input image can be divided into 256×256 for an 8 k UHD image having a high resolution, 128×128 for a 1080p HD image, 16×16 for a WVGA image, and the like.

Information on the size or the type of such a block can be set as units of a sequence, a picture, a slice, or the like, and related information can be transmitted to the decoder. That is, it may be set in units of a sequence parameter set, a picture parameter set, a slice header, or a combination thereof.

Here, a sequence indicates a constituent unit constituted by collecting a number of related scenes. A picture is referred to as a series of luminance (Y) components or a total of luminance+chrominance (Y, Cb, Cr) components in one scene or picture, and a range of one picture may be one frame or one field.

A slice can refer to one independent slice segment and a number of dependent slice segments that are in the same access unit. An access unit refers to as a set of network abstraction layer (NAL) units associated with a single coded picture. The NAL unit is a syntax structure in which video compressed bitstream is constructed in a network-friendly format in H.264/AVC and HEVC standards. Commonly, one slice unit is constructed as one NAL unit, and a set of NALs or NALs constituting one frame is considered as one access unit in system standards.

Returning to the description of the picture division unit, the information related to the size or the type (M×N) of the block can be made by an explicit flag, and specifically can include block type information, one length information when the block is a square, each length information when the block is a rectangular, or the difference value information between a width and a length. For example, if M and N are composed of powers of k (k is assumed to be 2) ($M=2^m$, $N=2^n$), information related to m and n can be encoded by various methods such as unary binarization and truncated-type unary binarization to cause related information to be transmitted to the decoding device. Alternatively, a division allowable minimum size Minblksize supported by the picture division unit can transmit information for I×J (assuming I=J for convenience of explanation, if $I=2^i$, $J=2^i$), m−I, or n−j. As another example, when M and N are different from each other, the difference value (|m−n|) between m and n can be transmitted. Alternatively, a maximum allowable division size Maxblksize supported by the picture division unit may transmit information for I×J, (assuming that I=J for convenience of explanation, if I=$2^i$, J=$2^j$), i–m, or n–j.

In the case of an implied situation, for example, when syntax of related information exists but cannot be verified by an encoder or decoder, the encoder or decoder may follow preset default settings. For example, when the related syntax cannot be confirmed when confirming the block type information, the block type may be set as a square type, which is a default setting. Alternatively, in the step of confirming the block size information, specifically, in the step of confirming the block size information through the difference value from the minimum allowable division size Minblksize as in the above example, when syntax related to the difference value can be identified but syntax related to the minimum allowable division size Minblksize may not be identified, the information may be obtained from a default value related to the minimum allowable division size Minblksize that is preset.

As described above, the size or the type of the block in the picture division unit can be explicitly transmitted as related information from the encoder or the decoder, or implicitly determined according to characteristics and resolution of the image, or the like.

As described above, the block that is divided and determined through the picture division unit can be used as a basic coding unit. The block divided and determined by the picture division unit may be a minimum unit constituting a high level unit such as a picture, a slice, and a tile, and may be a maximum unit of blocks such as a encoding block, a prediction block, a transform block, a quantization block, an entropy block, and an in-loop filtering block, but some blocks are not limited thereto and may be exceptional.

For example, some blocks such as an in-loop filtering block may be applied as a unit larger than the size of the block described above.

The block division unit performs division on the blocks such as coding, prediction, conversion, quantization, entropy, and in-loop filter. The division unit is included in each component to perform a function thereof. For example, the transform unit 210 may include a transform block division unit and the quantization unit 215 may include a quantization block division unit. The size or the type of an initial block in the block division unit may be determined by the division result of a block of a previous level or higher level. For example, in the case of an encoding block, a block obtained through a picture division unit which is a previous stage can be set as an initial block. Alternatively, in the case of a prediction block, a block obtained through a division process of an encoding block which is a higher level of the prediction block may be set as an initial block. Alternatively, in the case of a transform block, a block obtained through a dividing process of an encoding block, which is a higher level of the transform block, may be set as an initial block. The condition for determining the size or the type of the initial block is not always fixed, and a part may be changed or there are exceptional cases. In addition, it is also possible to affect the division process of the current level (for example, whether the division is possible or not, a type of divisible block, and the like), depending on a combination of at least one factors such as division state of block of previous level or upper level (for example, a size of the encoding block, a type of the encoding block, and the like) and a setting condition of the current level (for example, a size of the transform block supported, a type of the transform block, and the like).

The block division unit may support a quad tree based division scheme. That is, the block can be divided into four blocks each having a length of ½ in horizontal and vertical lines in the block before division. This means that the division may be repeatedly performed until it reaches a permissible division depth limit dep_k (dep_k means the number of permissible division, a size of the block in the permissible division depth limit is N/>>k, N>>k).

Further, it may support a binary tree based division scheme. This indicates that one of horizontal and vertical lines can be divided into two blocks having a length of ½ in comparison with the block before division. The cases of the quad tree division and the binary tree division may be a symmetric division or an asymmetric division, and it may be determined which division scheme is selected according to the setting of an encoder or a decoder. The symmetric division scheme will be mainly described in the image encoding method of the present invention.

The division flag (div_flag) may indicate whether or not each block is divided. If the corresponding value is 1, the division is performed, and if the value is 0, the division is not performed. Alternatively, if the corresponding value is 1, the division is performed and additional division is allowed, and if the value is 0, the division is not performed and additional division is not allowed. Depending on conditions such as a minimum allowable division size and an allowable division depth limit, the flag may consider only whether the division is performed and may not consider whether additional division is performed.

The division flag can be used in a quad tree division, and also in a binary tree division. In the binary tree division, the division direction may be determined according to a division depth, an encoding mode, a prediction mode, a size, a type, and a sort of the block (one of encoding, prediction, transform, quantization, entropy, in-loop filter, and the like, or one of luminance and chrominance) and at least one of factors such as a slice type, a division allowable depth limit, minimum and maximum allowable division sizes, or a combination thereof.

In this case, according to the corresponding division direction to the division flag, the block may be divided by ½ only in the horizontal direction of the block, or divided by ½ only in the vertical direction. For example, when it is assumed that the block supports M×N (M>N) and M is greater than N, the horizontal division is supported, and when it is assumed that the current division depth (dep_curr) is smaller than the allowable division depth limit to allow additional division to be performed, the division flag is allocated to 1 bit so that the horizontal division is performed when the corresponding value is 1 and further division is not performed when the value is 0. The division depth may be one division depth for the quad tree division and the binary tree division, and each division depth for the quad tree division and the binary tree division. The allowable division depth limit may be one allowable division depth limit for the quad tree division and the binary tree division, and each allowable division depth limit for the quad tree division and the binary tree division.

As another example, if the block is M×N (M>N) and N is equal to the predetermined minimum allowable division size and the horizontal division is not supported, the division flag is assigned to 1 bit so that the vertical division is performed when the value is 1 and further division is not performed if the value is 0.

Also, flags (div_h_flag, div_v_flag) for horizontal division or vertical division can be respectively supported, and binary division can be supported according to the flag. The horizontal division flag (div_h_flag) or the vertical division flag (div_v_flag) indicates whether or not to allow horizontal or vertical division of each block. The horizontal or vertical division is performed when the horizontal division flag (div_h_flag) or the vertical division flag is 1, and the horizontal or vertical division is not performed when the flag is 0. Or, when each flag is 1, the horizontal or vertical division is performed and additional horizontal or vertical division is allowed. When the value is 0, the horizontal or vertical division is not performed, and further horizontal or vertical division may not be allowed. The flag may consider whether or not to perform division, or may not consider whether or not to perform additional division, according to conditions such as the minimum allowable division size and the allowable division depth limit. Alternatively, flags (div_flag/h_v_flag) for horizontal division or vertical division may be supported and binary division may be supported according to the flag. The division flag (div_flag) may indicate whether or not perform horizontal or vertical division, and the division direction flag (h_v_flag) may indicate horizontal or vertical division direction. The division is performed and horizontal or vertical division is performed according to division direction flag (h_v_flag) when division flag (div_flag) is 1, and the horizontal or vertical division is not performed when the value is 0. If the value is 1, horizontal or vertical division is performed according to the horizontal division flag (h_v_flag) and additional horizontal or vertical division is allowed. When the value is 0, horizontal or vertical division is not performed, and it is considered that further horizontal or vertical division is not allowed. The flag may consider whether or not to perform division and not consider whether or not to perform additional division, according to conditions such as the minimum allowable division size and the allowable division depth limit.

These division flags can support horizontal and vertical division respectively, and also support the binary tree division in accordance with the flags. Also, when the division direction is predetermined, only one of the two division flags may be used as in the above example, or both of the division flags may be used.

For example, when the flags are all allowed, the possible types of blocks can be divided into any one of M×N, M/2×N, M×N/2, and M/2×N/2. In this case, the flags can be encoded as 00, 01, 10, and 11 (in order of div_h_flag/div_v_flag). The above case is an example of setting in which the division flags may be overlapped, but setting in which the division flags may not be overlapped. For example is also possible, a division block type may be divided into M×N, M/2×N, and M×N/2, and in this case the above flags are encoded as 00, 01, 10 (in order of div_h_flag/div_v_flag), or encoded as 00, 10, and 11 (in order of div_flag/h_v_flag, h_v_flag is a flag indicating the division direction is horizontal or vertical). Here, the overlap means that both horizontal division and vertical division are performed at the same time. The quad tree division and the binary tree division described above can be used either singly or in combination according to setting of the encoder or the decoder. For example, the quad tree or the binary tree division may be determined according to the block size or type. That is, the horizontal division is performed when the block type is M×N and M is larger than N, the binary division may be supported according to the vertical division when the block type is M×N and N is larger than M, and the quad tree division can be supported when the block type is M×N and N and M are the same.

As another example, if the size of block (M×M) is greater than or equal to the block division threshold (Thrblksize), then the binary tree division may be supported; if less, a quad tree division may be supported.

In another example, the quad tree division is supported when M or N of block (M×N) is greater than or equal to the first minimum allowable division size (Minblksize1), and the binary tree division may be supported when M or N of block (M×N) is greater than or equal to the second minimum allowable division size (Minblksize2). When the first division support range and the second division support range capable of being defined by the maximum allowable division size and the minimum allowable division size are overlapped, a priority may be given to the first or second division method according to setting of encoder or decoder. In this example, the first division method is the quad tree division, and the second division method is the binary tree division. For example, when the first minimum allowable division size (Minblksize1) is 16, the second maximum allowable division size (Maxblksize2) is 64, and the block before division is 64×64, it is possible to be within both of the first division support range and the second division support range so that the quad tree division and the binary tree division are allowed. When the priority is given to the first division method (quad tree division in this example) according to the setting, the quad tree division is performed and additional quad tree division is allowed when the division flag (div_flag) is 1 and it may be considered that the quad tree division is not performed and quad tree division is no longer performed when the division flag (div_flag) is 1. The flag may only consider whether or not perform division and may not consider whether or not perform further division depending on such conditions as the minimum allowable division size and the allowable division depth limit. When the division flag (div_flag) is 1, the quad tree division may be continued, since the block is divided into 4 blocks having a size of 32×32, which is greater than the first minimum allowable division size (Minblksize 1). If the flag is 0, no further quad tree division is performed, and the current block size (64×64) is within the second division support range, whereby it is possible to perform the binary tree division. If the division flag (in order of div_flag/h_v_flag) is 0, no further division is performed. If the division flag is 10 or 11, the horizontal division or vertical division can be performed. If the block before division is 32×32 and the division flag (div_flag) is 0 so that no further quad tree division is performed, and if the second maximum allowable division size (Maxblksize2) is 16, the size (32×32) of the current block is not within the second division support range so that division is no longer supported. In the above description, the priority of the division method may be determined according to at least one of a slice type, encoding mode, luminance and chrominance component, and the like, or a combination thereof.

As another example, various settings can be supported depending on luminance and chrominance components. For example, the quad tree or binary tree division structure determined by the luminance component can be also used in the chrominance component without encoding or decoding additional information. Alternatively, quad tree+binary tree division may be supported for the luminance component and quad tree division may be supported for the chrominance component when supporting independent division of the luminance component and the chrominance component. Alternatively, when the quad tree+the binary tree division are supported in the luminance and chrominance components, the division support range may be or not be the same or prounital to luminance and chrominance components. For example, if the color format is 4:2:0, division support range of the chrominance component may be N/2 of the division support range of luminance component.

As another example, different settings can be made depending on a type of the slice. For example, an I-slice can support the quad tree division, a P-slice can support the binary tree division, and a B-slice can support quad tree+the binary tree division.

The quad tree division and the binary tree division can be set and supported according to various conditions as in the above example. The above-described examples are not limited to the above-mentioned cases and may include cases where the conditions are reversed from each other, may include one or more factors mentioned in the above examples or a combination thereof, and may be also transformed into another example. The allowable division depth limit can be determined according to at least one factor of a division method (quad tree, binary tree), a slice type, luminance and chrominance components, an encoding mode, and the like, or a combination thereof. In addition, the division support range may be determined according to at least one factor of a division method (quad tree), a slice type, luminance and chrominance components, an encoding mode, and the like, or a combination thereof, and related information may be expressed as a maximum value and a minimum value of the division support range. When information related thereto is constructed with an explicit flag, length information of each of the maximum value and the minimum value, or difference value information between the minimum value and the maximum value can be expressed. For example, when the maximum value and the minimum value are composed of powers of k (assuming k is 2), the power information of the maximum and minimum values can be encoded through various binarization and transmitted to the decoding device. Alternatively, the difference value between powers of the maximum value and the minimum value can be transmitted. The information transmitted at this time may be power information of the minimum value and difference information of the powers.

In accordance with the above description, information related to flags can be generated and transmitted in units such as a sequence, a picture, a slice, a tile, a block, and the like.

The division flags shown in the above example can represent a block division information through a quad tree or a binary tree or a mixture of two tree schemes, and a division flag can be encoded by various methods such as unary binarization and truncated-type unary binarization, thereby transmitting the related information to the decoding device. The bitstream structure of the division flag for representing the division information of the block can be selected from one or more scanning methods. For example, you can construct a bitstream of division flags based on division depth order (from dep0 to dep_k), or you can construct a bitstream of division flags based on whether or not division is performed. The division depth order-based method allows division information at the current level depth to be obtained based on the initial block and then division information to be obtained at the next level. The method based on whether or not division is performed means that additional division information is preferentially obtained in a divided block based on the initial block, and other scanning methods not shown in the above examples may be included and selected.

Also, according to the implementation, the block division unit may generate and express index information for a block candidate group of a predefined type other than the division flag described above. The type of the block candidate may include M×N, M/2×N, M×N/2, M/4×N, 3M/4×N, M×N/4, M×3N/4, M/2×N/2, and the like, for example, as a type of division block that can be included in the block before division.

When the candidate group of the division block is determined as described above, the index information for the division block type can be encoded by various methods such as fixed length binarization, cut truncated-type binarization, truncated-type binarization, and the like. The candidate group of the division block may be determined according to at least one of factors such as division depth, encoding mode, prediction mode, size, type, sort and slice type, allowable division depth limit, and maximum and minimum allowable division sizes, and the like, or a combination thereof. For further description, (M×N, M/2×N/2) are assumed to be a candidate list 1, (M×N, M/2×N, M×N/2, and M/2×N/2) to a candidate list 2, (M×N, M/2×N, M×N/2) to a candidate list 3, M×N, M/2×N, M×N/2, M/4×N, 3M/4×N, M×N/4, M×3N/4, and M/2×N/2) to a candidate list 4. For example, in the case of M×N, division block candidates of the candidate list 2 may be supported when (M=N), and division block candidates of the candidate list 3 may be supported when M≠N.

As another example, it is possible to support a division block candidate of the candidate list 2 can be supported when M or N of M×N is greater than or equal to the boundary value blk_th, and a division block candidate of the candidate list 4 when the M or N is less than the boundary value blk_th. Alternatively, it is possible to support the division block candidate of the candidate list 1 when M or N is equal to or greater than or equal to the first boundary value blk_th_1, the division block candidate of the candidate list 2 when M or N is less than the first boundary value blk_th_1 and greater than or equal to the second boundary value blk_th_2, and the division block candidate of the candidate list 4 when M or N is smaller than the second boundary value blk_th_2.

As another example, when the encoding mode is an intra prediction, a division block candidate of the candidate list 2 can be supported, and when the encoding mode is inter prediction, a division block candidate of the candidate list 4 can be supported.

Even when the division block candidate is supported as described above, the bit construction according to binarization of each block may be the same or different. For example, when the division block candidates supported is limited according to the size or type of the block as in the case of the division flag, the bit construction according to the binarization of the block candidate may vary. For example, in the case of (M>N), it is possible to support block types according to the horizontal division, that is, M×N, M×N/2, and M/2×N/2, in which binary bits of index according to M×N/2 of division block candidate group M×N, M/2×N, M×N/2, M/2×N/2, and the M×N/2 of the current condition may be different from each other. Depending on a type of blocks used for coding, prediction, transform, quantization, entropy, and in-loop filtering, and the like, information related to division and type of the block can be represented using one of a division flag method or a division index method. Also, the block size limit and the allowable division depth limit for supporting types of division and block may be different depending on a type of each block.

The encoding or decoding process of the block unit may be performed according to the processes of the prediction block determination, the transform block determination, the quantization block determination, the entropy block determination, and the in-loop filter determination, after the encoding block is determined. The order of the encoding or decoding process is not always fixed, and some orders may be changed or excluded. The size and type of each block are determined according to the encoding cost of each candidate of the size and type of the block, and the division related information such as image data of each determined block and size and type of each determined block can be encoded.

The prediction unit 200 may be implemented using a prediction module which is a software module, and may generate a prediction block using an intra prediction scheme or an inter prediction scheme for a block to be encoded. Here, the prediction block is a block which is understood to closely match the block to be encoded with terms of pixel difference, and can be determined by various methods including sum of absolute difference (SAD) and sum of square difference (SSD). Also, at this time, various syntaxes that are used in decoding the image blocks may be generated. The prediction block can be classified into intra-frame block and inter-frame block depending on the encoding mode.

Intra prediction (intra prediction) is a prediction technique using spatial correlation. It refers to a method of predicting a current block using reference pixels of blocks that are reconstructed by being previously encoded and decoded in the current picture. In other words, the intra prediction can use the brightness value reconstructed by prediction and reconstruction as a reference pixel in the encoder and the decoder. Intra prediction can be effective for flat areas with continuity and areas with constant directionality, and it can be used for the purpose of guaranteeing random access and preventing error diffusion because it uses spatial correlation.

The inter prediction uses a compression technique that removes redundancy of data by using temporal correlation by referring to an image encoded with one or more past or future pictures. That is, inter prediction can generate a prediction signal having high similarity by referring to one or more past or future pictures. The encoder may search a block having a high correlation with a block to be encoded in a reference picture using the inter prediction and transmit the position information and residue signal of the selected block to a decoder, and the decoder may generate the same prediction block as the encoder using the selected information of the transmitted image and compensate the residual signal transmitted to construct the reconstructed image.

Figure 4:
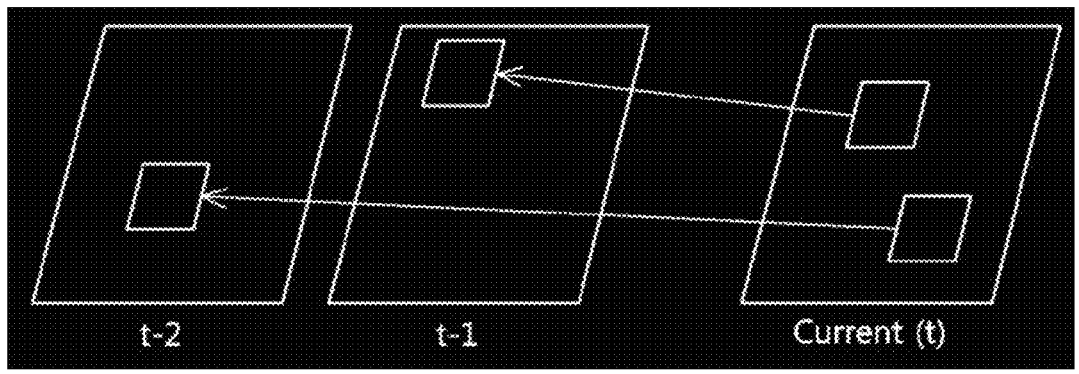
FIG. 4 is an exemplary view illustrating an inter prediction of a P-slice in an image encoding and decoding method according to an embodiment of the present invention.
Figure 5:
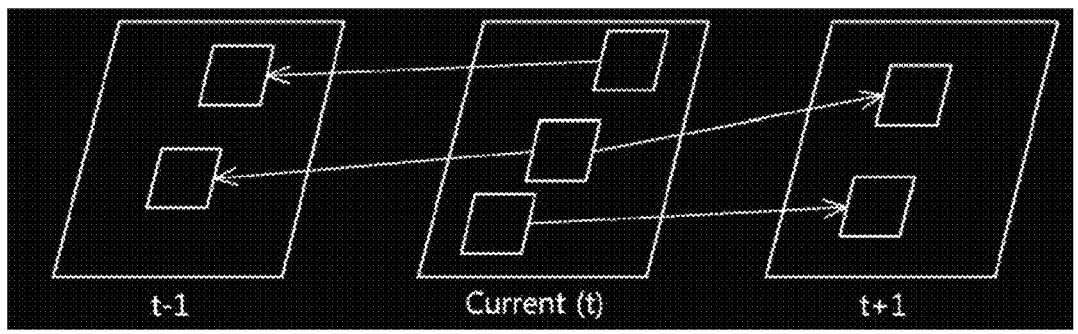
FIG. 5 is an exemplary view illustrating an inter prediction of a B-slice in the image encoding and decoding method according to the embodiment of the present invention.

FIG. 4 is an exemplary view illustrating an inter prediction of a P-slice in an image encoding and decoding method according to an embodiment of the present invention. FIG. 5 is an exemplary view illustrating an inter prediction of a B-slice in the image encoding and decoding method according to an embodiment of the present invention.

In the video encoding method of the present embodiment, since the inter prediction generates a prediction block from a previously encoded picture having a high temporal correlation, the encoded efficiency can be increased. Current (t) may refer to a current picture to be encoded and may include a first reference picture t−1 having a first temporal distance (t−1) earlier than the POC of the current picture and a second reference picture t−2 earlier than the first temporal distance based on a temporal flow of the picture or a picture order count POC.

As shown in FIG. 4, with an inter prediction that can be employed in the video encoding method of the present embodiment, on a block having a high correlation through block matching of the current block of the current picture current (t) and the reference blocks of the reference pictures t−1 and t−2, a motion prediction is performed to find a optimal prediction block from reference pictures t−1 and t−2 which are encoded earlier. In order to perform accurate prediction, an interpolation process is performed based on a structure in which at least one sub-pixel is arranged between two adjacent pixels, the optimal prediction block is found, and then a motion compensation is performed, thereby finding resulting prediction block.

As shown in FIG. 5, the inter prediction that can be employed in the video encoding method of the present embodiment allows the prediction blocks to be generated from reference pictures t−1 and t+1 already encoded in both directions temporally based on the current picture current (t). In addition, two prediction blocks can be generated from one or more reference pictures.

When encoding the image through the inter prediction, the motion vector information and reference picture information for the optimal prediction block are encoded. In this embodiment, when the prediction block is generated in a unidirectional or bidirectional direction, the reference block list is constructed differently so that the prediction block may be generated from the corresponding reference picture list. Basically, the reference pictures present previous to the current picture are allocated to the list 0, and the reference pictures existing subsequent to the current picture are allocated to the list 1. The reference pictures existing later than the current picture can be allocated when the reference picture list 0 may not be filled up to the allowable reference picture number of the reference picture list 0. Similarly, the reference pictures existing later than the current picture may be allocated when the reference picture list 1 cannot be filled up to the allowable reference picture number of the reference picture list 1. Similarly, when the reference picture list 1 is constructed, when the reference picture list 1 does not satisfy the reference picture list, the reference pictures existing before the current picture may be allocated.

Figure 6:
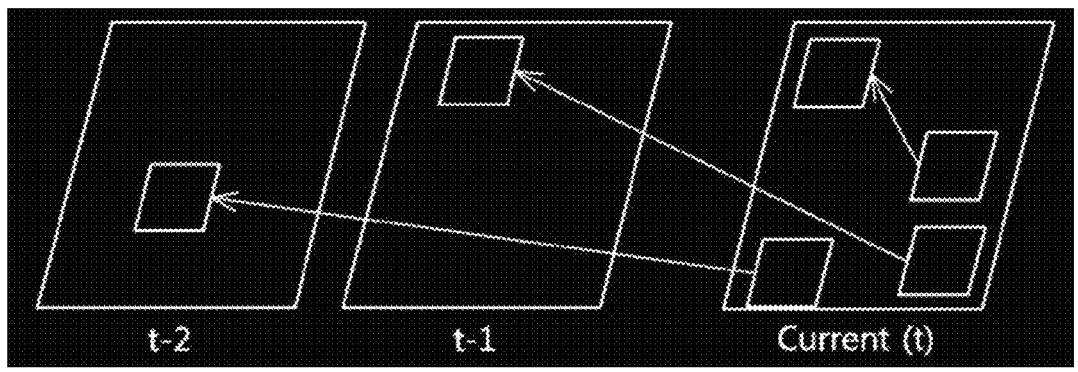
FIG. 6 is an exemplary view illustrating a case where a prediction block is generated in a single direction in the image encoding and decoding method according to an embodiment of the present invention.

FIG. 6 is an exemplary view illustrating a case where a prediction block is generated in a single direction in an image encoding and decoding method according to an embodiment of the present invention.

Referring to FIG. 6, in the image encoding and decoding method according to the present embodiment, a prediction block can be found from a previously encoded reference picture t−1, t−2, and the prediction block may be also found from the areas that have been already encoded in the current picture current (t).

That is, the image encoding and decoding method according to the present embodiment may be implemented such that not only the prediction block is generated from a previously encoded picture t−1, t−2 with temporally high correlation, but also the prediction block having a spatially high correlation is found. Finding the prediction block having such a spatially correlation can correspond to finding the prediction block in the intra prediction manner. In order to perform block matching from the area where encoding is completed in the current picture, the image encoding method of the present embodiment can construct a syntax for information related to the prediction candidate that mixed with an intra prediction mode.

For example, when n (n is an arbitrary natural number) intra prediction modes are supported, one mode is added to the intra prediction candidate group to support n+1 modes and the prediction mode may be encoded using M fixed bits satisfying 2M−1≤n+1<2M. In addition, it can be implemented to select one of the candidate groups of the prediction modes having a high probability such as most probable mode MPM of high efficiency video coding HEVC. It may also be preferentially encoded at a higher level of prediction mode encoding.

When a prediction block is generated through block matching in the current picture, the video encoding method of the present embodiment may construct a syntax for related information mixed with an inter prediction mode. Additional related prediction mode information may be motion or displacement related information. The motion or displacement related information may include optimal candidate information among various vector candidates, a difference value between an optimal candidate vector and an actual vector, a reference direction, reference picture information, and the like.

Figure 7:
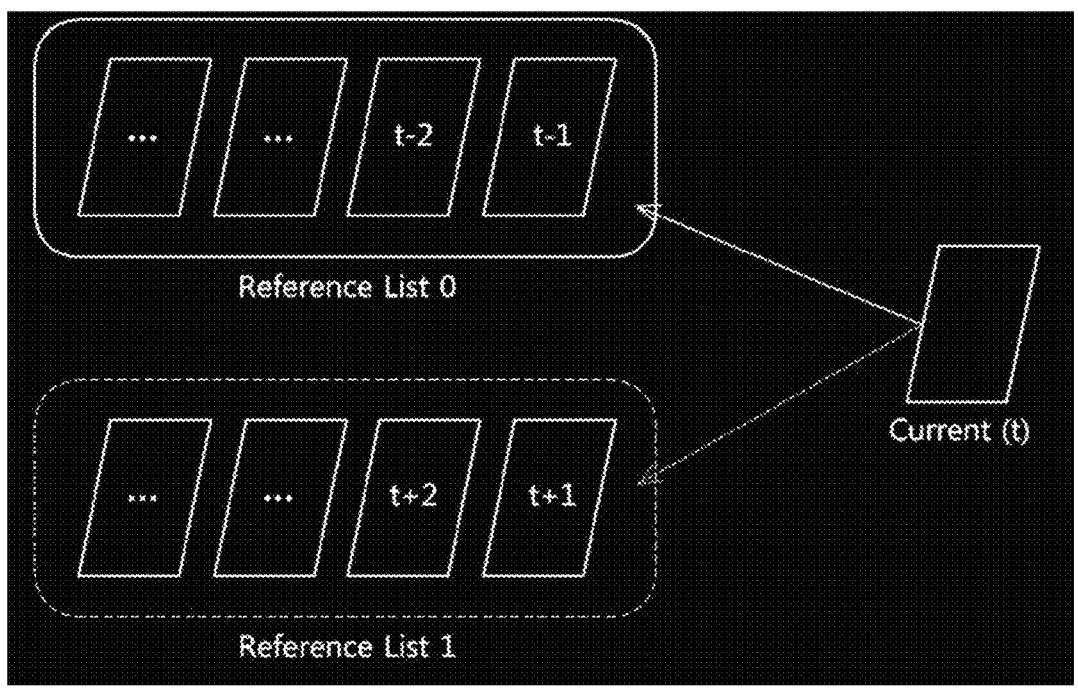
FIG. 7 is an exemplary view of construction of a reference picture list in the image encoding and decoding method according to an embodiment of the present invention.
Figure 8:
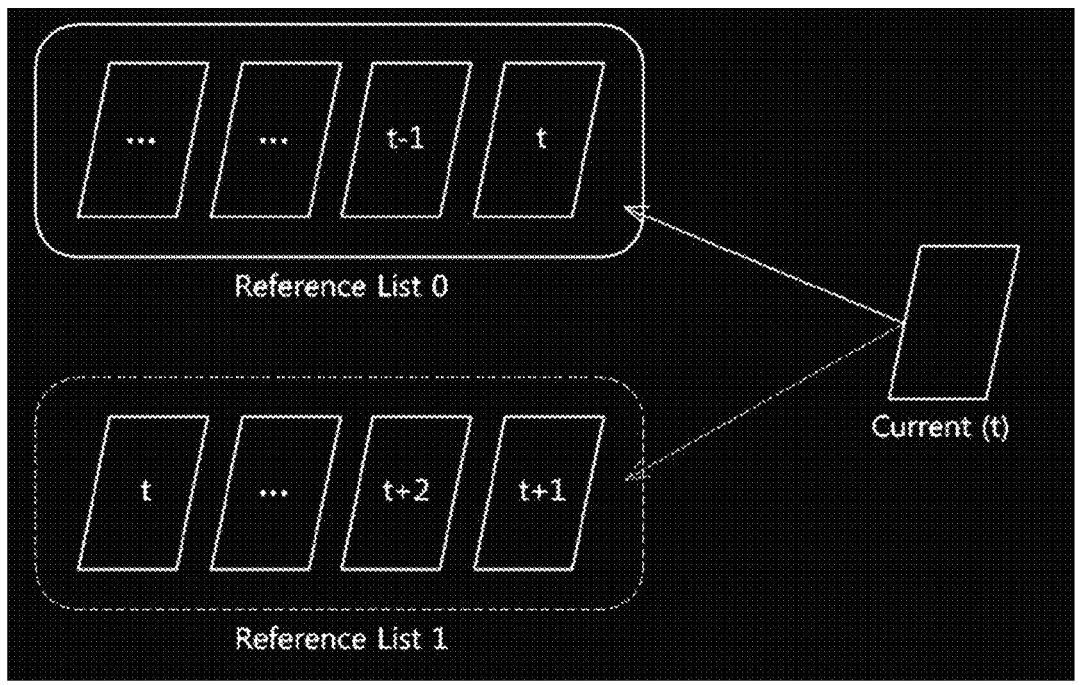
FIG. 8 is an exemplary view for illustrating another example of a case where a inter prediction is performed from a reference picture list in the image encoding and decoding method according to an embodiment of the present invention.

FIG. 7 is an exemplary view constructed from a reference picture list in an image encoding and decoding method according to an embodiment of the present invention. FIG. 8 is an exemplary view for illustrating another example of a case where an inter prediction is performed from a reference picture list in an image encoding and decoding method according to an embodiment of the present invention.

Referring to FIG. 7, an image encoding method according to an embodiment of the present invention may perform inter prediction on a current block of a current picture current (t) from a reference picture list (reference list 0, reference list 1).

Referring to FIGS. 7 and 8, the reference picture list 0 may be constructed of a reference picture earlier than the current picture (t), in which t−1 and t−2 indicate reference pictures having a first temporal distance (t−1) and a second temporal distance (t−2) that are earlier than picture order count POC of the current picture (t) respectively. Further, the reference picture list 1 can be composed of a reference picture later than the current picture (t), in which t+1 and t+2 indicate reference pictures having the first temporal distance (t+1) and the second temporal distance (t+2) that are later than the POC of the current picture (t) respectively.

The above-described examples of the reference picture list construction show an example in which a reference picture list is composed of reference pictures having 1 of a difference of temporal distance (based on POC in this example), but may be constructed such that the difference in temporal distance between reference pictures is different. This can be confirmed in an example of a reference picture list construction to be described later.

Prediction can be performed from the reference picture in the list according to the slice type (I, P, or B). When a prediction block is generated via block matching in the current picture (current (t)), the current picture can be added to the reference picture lists (reference list 0, reference list 1) to perform inter prediction encoding.

As shown in FIG. 8, it is possible to add the current picture (t) to the reference picture list 0 or the current picture (t) to the reference picture list 1. That is, the reference picture list 0 may be constructed by adding a reference picture of temporal distance (t) to the reference picture earlier than the current picture (t), and the reference picture list 1 may be constructed by adding a reference picture of temporal distance (t) to the reference picture later than the current picture (t).

For example, when constructing the reference picture list 0, the reference picture previous to the current picture can be assigned to the reference picture list 0 and then the current picture (t) can be allocated to the reference picture list 0. When constructing the reference picture list 1, the reference picture can be assigned to the reference picture list 1 and then the current picture (t) can be allocated to the reference picture list 1. Alternatively, when constructing the reference picture list 0, the current picture (t) is allocated and then the reference picture previous to the current picture can be allocated. When constructing the reference picture list 1, the current picture (t) is allocated and then the reference picture subsequent to the current picture can be allocated. Alternatively, when constructing the reference picture list 0, the reference picture previous to the current picture may be allocated, the reference picture subsequent to the current picture may be allocated, and then the current picture (t) may be allocated. Similarly, when constructing the reference picture list 1, the reference picture subsequent to the current picture can be allocated, the reference picture previous to the current picture can be allocated, and then the current picture (t) can be allocated. The above examples are not limited to the cases described above, but may include cases where the conditions are reversed from each other, and may be transformed to examples of other cases.

Whether or not to include the current picture in each reference picture list (for example, add to no list, add only to list 0, add only to list 1, or add to lists 0 and 1) can be set in the encoder or decoder, and the information related thereto may be transmitted in units of a sequence, a picture, a slice, and the like. The information can be encoded by methods such as fixed length binarization, cut truncated-type binarization, truncated-type binarization, and the like.

The image encoding and decoding method of the present embodiment allows a prediction block to be selected by performing block matching on the current picture (t), reference picture lists including related information about the prediction block to be configured, and encoding and decoding to be performed on the image by using the reference picture lists, unlike the method of FIG. 7.

In the reference picture list construction, construction order and rules of each list, and allowable number of reference pictures of each list may be differently set, in which they may be determined according to at least one factor of whether the current picture is included in a list or not (including a current picture as a reference picture in inter prediction), a slice type, a list reconstruction parameter (which may be applied to lists 0 and 1 respectively, and may be applied to lists 0 and 1 together), a position in a group of pictures (GOP), temporal layer information (temporal id), and the like, or a combination of at least one of them, and the related information can be explicitly transmitted in a unit such as sequence, picture, and the like. For example, in case of P-slice, the reference picture list 0 can follow a list construction rule A regardless of whether the current picture is included in the list, and in case of B-slice, the reference picture list 0 which includes current picture in the list may follow a list construction rule B, the reference picture list 1 can follow a list construction rule C, and reference picture list 0 that does not include the current picture can follow a list construction rule D, and a reference picture list 1 may follow a list construction rule E, in which B and D, and C and E of the list construction rules may be the same. The list construction rules may be constructed in the same or modified manner as described in the reference picture list construction example. As another example, when the current picture is included in the list, the first allowable reference picture number can be set, and when the current picture is not included in the list, the second allowable reference picture number can be set. The first allowable reference picture number and the second allowable reference picture number may be the same or different from each other and the difference between the first allowable reference picture number and the second allowable reference picture number may be set to 1 by default. As another example, when the current picture is included in the list and the list reconstruction parameter is applied, all reference pictures in slice A may be a list reconstruction candidate group, and only some reference pictures in slice B may be included in a list reconstruction candidate group. In this case, the slice A or B can be classified according to whether or not the current picture is included in a list, temporal layer information, a slice type, a position in a group of pictures (GOP), and the like. A factor of whether or not to be included in the candidate group may be determined according to a picture order count (POC) of a reference picture or reference picture index, a reference prediction direction (earlier and later than the current picture), whether or not there is the current picture, and the like.

According to the above-described construction, since a reference block encoded with inter prediction in the current picture can be used, the inter prediction can be allowed or used even in the motion estimation of the I-slice.

Also, when constructing the reference picture list, index assignment or list construction order may be different according to the slice type. In the case of an I-slice, a lower index (for example, idx=0, 1, 2) is used by increasing a priority level in the current picture (t), and the amount of the bit may be reduced in the image encoding through binarization (fixed length binarization, cut truncated-type binarization, truncated-type binarization, etc.) that causes an allowable reference picture number C of the reference picture list to be maximum. In the case of a P-slice or a B-slice, when it is determined that probability of selecting a reference picture of a current block as a prediction candidate by performing block matching in the current picture is less than the probability of selecting a prediction candidate through other reference picture, the amount of bits in the image encoding may be reduced via various methods in which the allowable number of the reference picture of the corresponding reference picture list is set to be maximum using a higher index (for example, idx=C, C−1) by setting the priority for block matching of the current picture backward. In the above example, the priority setting of the current picture may be constructed in the same or modified manner as described in the example of the reference picture list construction. Information related to the reference picture may be omitted by not constructing a reference picture list according to the slice type (for example, I-slice). For example, a prediction block may be generated through existing inter prediction, but the inter prediction information may be represented with information obtained by excluding the reference picture information from the motion information in the inter prediction mode.

The method of performing block matching in the current picture can determine whether or not to support the block matching depending on the slice type. For example, block matching in the current block is supported by I-slice, but not P-slice or B-slice, or other variations are possible. In addition, the method of supporting block matching in the current picture may determine whether or not to support the block matching in units of a picture, a slice, a tile, etc., or based on a position in a group of pictures (GOP), temporal layer information (temporal ID), and the like. Such setting information can be transmitted in units of a sequence, a picture, a slice, etc., from an image encoding process or an encoder to a decoder. Further, even in a situation where the above-mentioned setting information or syntax exists in an upper level unit and the setting related operation is turned on, when the same setting information or syntax is present in a lower level unit, the setting information in the lower level unit may have a priority over the setting information in the upper level unit. For example, when the same or similar setting information is processed in a sequence, a picture, or a slice, the picture unit may have priority over the sequence unit, and the slice unit may have a priority over the picture unit.

Figure 9:
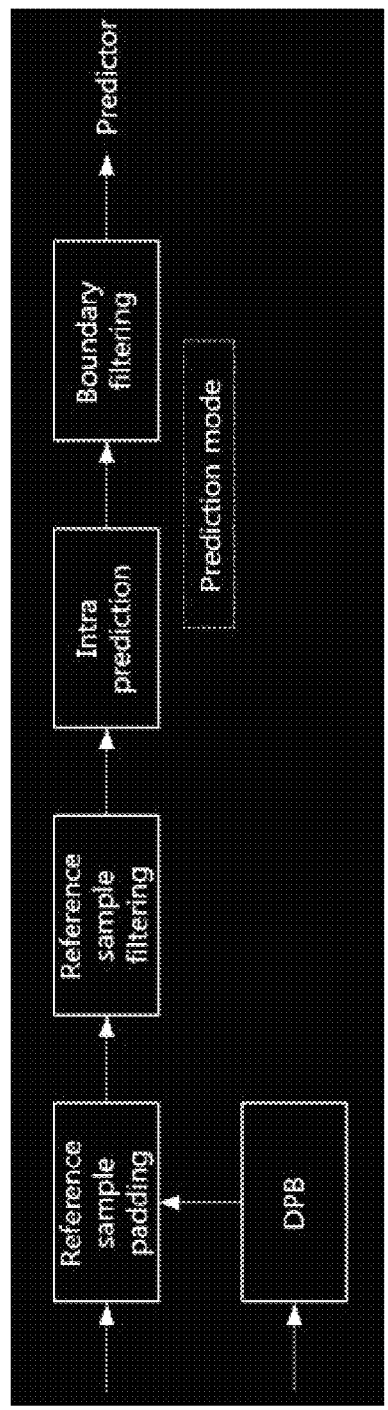
FIG. 9 is an exemplary view illustrating intra prediction in the image encoding method according to an embodiment of the present invention.

FIG. 9 is an exemplary view illustrating intra prediction in an image encoding method according to an embodiment of the present invention.

Referring to FIG. 9, the intra prediction method according to an embodiment of the present invention includes reference sample padding, reference sample filtering, intra prediction, and boundary filtering.

The reference pixel padding step may be an example of a reference pixel construction step, the reference pixel filtering step may be referred to as a reference pixel filter unit, the intra prediction may include a prediction block generating step and a prediction mode encoding step, and the boundary filtering may be an embodiment of the post-processing filter step.

That is, the intra prediction performed in the image encoding device of the present embodiment may include a reference pixel construction step, a reference pixel filtering step, a prediction block generation step, a prediction mode encoding step, and a post-processing filtering step. One or some of the above processes may be omitted and other processes may be added depending on various environmental factors such as a block size, a block type, a block location, a prediction mode, a prediction method, a quantization parameter, and the order described above may be changed into a different order.

The reference pixel construction step, the reference pixel filtering step, the prediction block generation step, the prediction mode encoding step, and the post-processing filtering step may be implemented such that a software modules stored in a memory are executed by a processor connected to a memory. Therefore, in the following description, for convenience of description, as a function unit generated by a combination of a software module implementing each step and a processor executing it or a construction unit performing the function of the function unit, a reference pixel construction unit, a prediction block generation unit, a prediction mode encoding unit, and a post-processing filter unit will be referred to as an execution subject of each step.

More specifically, the reference pixel construction unit constructs a reference pixel used for predicting the current block through the reference pixel padding. When the reference pixel does not exist or is not available, the reference pixel padding may perform a method such as copying a value from the nearest available pixel to cause the value to be used as the reference pixel. A decoded picture buffer (DPB) may be used for copying the value.

That is, the intra prediction performs prediction using reference pixels of previously encoded blocks of the current picture. To this end, adjacent pixels of the current block, adjacent pixels of blocks such as left, upper left, lower left, upper, and upper right are mainly used as reference pixels in the reference pixel construction step. The candidate group of the adjacent block for the reference pixel is only an example in which the encoding order of the block follows a raster scan or a z-scan, and adjacent pixels of blocks such as right, lower right, and lower may be also used as reference pixels in addition to the above blocks, when a scan such as a reverse z-scan is used as an encoding order scan method.

Further, depending on the implementation, additional pixels other than immediately adjacent pixels may be mixed with the alternative or existing reference pixels according to a stepwise construction of the intra prediction.

In addition, when prediction is made in a mode having a direction among intra prediction modes, reference pixels in a decimal unit can be generated by performing linear interpolation on the reference pixels in a integer unit. The mode for performing the prediction through the reference pixels existing in a position of an integer unit includes some modes having vertical, horizontal, 45 degrees, and 135 degrees, and the process of generating reference pixels in a decimal unit for the above prediction modes is not required. The prediction modes having other direction except for the above prediction mode are interpolated with interpolation accuracy of powers of ½ such as ½, ¼, ⅛, 1/16, 1/32, and 1/64, and may have an accuracy of a multiple of ½. This is because the interpolation accuracy can be determined depending on the number of the prediction modes supported or the prediction direction of the prediction mode. A fixed interpolation accuracy may be always supported in pictures, slices, tiles, blocks, etc., and an adaptive interpolation accuracy may be supported depending on size of block, type of block, prediction direction of supported modes. At this time, the prediction direction of the mode can be represented by inclination information or angle information in a direction indicated by the mode based on a specific line (for example, x axis of the positive <+> on a coordinate plane).

As the interpolation method, linear interpolation can be performed through immediately adjacent integer pixels, but other interpolation methods can be supported. For the purpose of interpolation, one or more filter sorts and the number of taps, for example, a 6-tap Wiener filter, an 8-tap Kalman filter, and the like may be supported and which interpolation is to be performed may be determined depending on a block size, a prediction direction, and the like. In addition, the related information can be transmitted in units of a sequence, a picture, a slice, a block, and the like.

The reference pixel filter unit can perform filtering on the reference pixels for the purpose of improving a prediction efficiency by reducing remaining deterioration in the encoding process after the reference pixels are constructed. The reference pixel filter unit can implicitly or explicitly determine the type of the filter and which or not apply the filtering depending on a size, a type and a prediction mode of the block. That is, even in a filter of the same tap, the filter coefficient can be determined differently depending on the filter type. For example, it is possible to use a 3-tap filter such as [1,2,1]/4 and [1,6,1]/8.

In addition, the reference pixel filter unit may determine whether or not the filtering is applied by determining whether or not to send bit additionally. For example, in an implied case, the reference pixel filter unit can determine whether or not the filtering is applied depending on characteristics (dispersion, standard deviation, and the like) of the pixels in peripheral reference blocks.

In addition, the reference pixel filter unit can determine whether or not the filtering is applied when a related flag satisfies a hiding condition predetermined in a residual coefficient, an intra prediction mode, and the like. For example, the number of taps of the filter is 3-tap such as [1,2,1]/4 for a small block (blk) and 5-tap such as [2,3,6,3,2]/16 for a large block (blk), the number of times of application may be determined depending on whether or not the filtering is performed, whether or not the filtering is performed once, or whether or not filtering is performed twice.

Also, the reference pixel filter unit can basically apply the filtering to the reference pixel that is the most adjacent to the current block. Additional reference pixels other than the most adjacent reference pixel may also be considered in the filtering process. For example, the filtering may be applied to additional reference pixels by replacing the nearest reference pixels, or the filtering may be applied by mixing additional reference pixels with the nearest reference pixels.

The filtering may be applied either fixedly or adaptively, and this may be determined depending on at least one factor of a size of the current block or a size of the adjacent block, an encoding mode of the current block or the adjacent block, a block boundary property of the current block and the adjacent block (e.g., which is a boundary of a coding unit or a boundary of a transform unit), a prediction mode or direction of the current block or the adjacent block, a prediction method of the current block or the adjacent block, a quantization parameter, and the like, or a combination thereof. The determination may be made such that the encoder or decoder have the same settings (implicitly), or encoding cost is considered (explicitly). Generally, the filter applied is a low pass filter. Depending on various factors mentioned above, the number of filter taps, the filter coefficient, whether or not a filter flag is encoded, and the number of filter application can be determined. The information thereof is set in units of a sequence, a slice, a block, and the like, and related information can be transmitted to the decoder.

The prediction block generating unit may generate a prediction block via an extrapolation method using a reference pixel in intra prediction, an interpolation method such as an average value DC of the reference pixels or a planar mode, and copying method of the reference pixel. Upon copying a reference pixel, one reference pixel may be copied to generate one or more prediction pixels, or one or more reference pixels may be copied to generate one or more prediction pixels, and the number of copied reference pixels may be equal to or less than the number of prediction pixels.

The directional prediction method and the non-directional prediction method can be classified according to the prediction method. In particular, the directional prediction method can be classified into a linear directional method and a curved directional method. The linear directional method uses an extrapolation method to cause the pixels of the prediction block to be generated through the reference pixels located on the prediction direction line. The curved directional method uses an extrapolation method to cause the pixels of the prediction block to be generated through the reference pixels located on the prediction direction line, and refers to a method in which a partial prediction direction of a pixel unit is allowed to be changed in consideration of a detailed directionality of a block (for example, edge <Edge>). In the case of the directional prediction mode in the image encoding and decoding method of the present invention, a linear directional method will be mainly described. Also, in the case of the directional prediction method, intervals between adjacent prediction modes may be equal or unequal, which may be determined according to the size or type of the block. For example, when the current block obtains a block with a size and type of M×N through a block division unit, the intervals between the prediction modes may be uniform if the M and N are the same, and the intervals between prediction modes may be non-uniform if M and N are different. As another example, when M is greater than N, the modes with vertical directionality may allow a finer interval to be allocated between prediction modes close to a vertical mode (90 degrees), and a wider interval to be allocated to modes not close to the vertical mode. When N is greater than M, the mode with horizontal directionality may allow a finer interval to be allocated between the prediction modes close to a horizontal mode (180 degrees), and a wider interval to be allocated to the prediction mode not close to the horizontal mode. The above examples are not limited to the above case, but may include cases where the conditions are reversed from each other, and examples of other cases are also allowed. In this case, the intervals between the prediction modes can be calculated on the basis of the numerical value indicating the directionality of each mode, and the directionality of the prediction mode may be numerically expressed by inclination information or angle information of the direction.

In addition, the prediction block can also be generated by other methods using spatial correlation other than the above method. For example, the reference block can be generated as the prediction block by using an inter prediction method such as motion search and compensation using a current picture as a reference picture. The prediction block generation step may generate the prediction block using the reference pixels according to the prediction method. That is, the prediction block can be generated through directional prediction or non-directional prediction such as extrapolation, interpolation, copying, and averaging of an existing intra prediction method according to the prediction method, the prediction block can be generated using an inter prediction method, and the prediction block may generated by other additional methods.

The intra prediction method can be supported under the same settings of an encoder or a decoder, and can be determined according to a slice type, a block size, a block type, and the like. The intra prediction method can be supported according to at least one of the above-mentioned prediction methods or a combination thereof. The intra prediction mode can be constructed according to the supported prediction method. The number of intra prediction modes supported may be determined according to the prediction method, the slice type, the block size, the block type, and the like. The related information can be set and transmitted in units of a sequence, a picture, a slice, a block, and the like.

The prediction mode encoding step performed via the prediction mode encoding may determine the mode in which the encoding cost according to each prediction mode is optimal in terms of encoding cost, as the prediction mode of the current block.

As an example, the prediction mode encoding unit may use one or more adjacent block modes for predicting the current block mode for the purpose of reducing the prediction mode bits. The prediction modes may be included in a candidate group of the most probable mode (MPM) that is likely to be the same to the candidate block mode, and the modes of adjacent blocks can be included in the candidate group. For example, the prediction modes of the blocks such as left, upper left, lower left, upper, and upper right blocks of the current block can be included in the above candidate group.

The candidate group of the prediction mode may be constructed depending on at least one factor of a location of the adjacent block, a priority of the adjacent block, a priority of the division block, a size or type of the adjacent block, the preset specific mode (in case of chrominance block), and the prediction mode of the luminance block, and the like, or a combination thereof, and related information may be transmitted in units of a sequence, a picture, a slice, a block, and the like.

For example, when a block adjacent to the current block is divided into two or more blocks, it is possible to determine which block mode among the divided blocks is included as the mode prediction candidate of the current block under the same setting of the encoder or decoder. For example, the left block of adjacent blocks of the current block (M×M) performs a quad tree division in the block division unit to make the division block to be three blocks, and the prediction mode of M/2×M/2 block can be included as a mode prediction candidate of the current block based on the block size when including M/2×M/2, M/4×M/4, and M/4×M/4 blocks in top to bottom direction. As another example, the upper block among the neighbor blocks of the current block (N×N) performs a binary tree division in the block division unit to make the division blocks to be three, and the prediction mode of the first N/4×N block from the left may be included as a mode prediction candidate of the current block according to a predetermined order (priority assigned from left to right) when including N/4×N, N/4×N, and N/2×N blocks from left to right direction.

As another example, when the prediction mode of the block adjacent to the current block is directional prediction mode, the prediction mode adjacent to the prediction direction of the corresponding mode (in terms of inclination information or the angle information of mode direction) may be included in the mode prediction candidate group of the current block. In addition, predetermined modes (planar, DC, vertical, horizontal, etc.) may be preferentially included according to the prediction mode construction or combination of adjacent blocks. In addition, a prediction mode having a high frequency of occurrence among the prediction modes of adjacent blocks may be preferentially included. The priority order means not only a possibility of being included in the mode prediction candidate group of the current block, but also a possibility of being allocated a higher priority or index (that is, higher probability of being allocated fewer bits in the binarization process) in the candidate group construction.

As another example, when the maximum number of mode prediction candidate groups of the current block is k, in which the left block is composed of m blocks whose length is smaller than a vertical length of the current block and the upper block is composed of n blocks whose length is shorter than a horizontal length of the current block, it is possible to fill the candidate group according to a predetermined order (left to right, top to bottom) if a sum (m+n) of division blocks of the adjacent blocks is greater than k, and a prediction mode of a block such as a adjacent block (left block, upper block, etc.) other than the adjacent block in the prediction mode of the adjacent block may be included in the mode prediction candidate group of the current block if a sum (m+n) of the division blocks of the adjacent blocks is greater than the maximum value k of the candidate group. The above examples are not limited to the above case, but may include cases where the conditions are reversed from each other, and examples of other cases are also allowed.

In this way, the candidate block for predicting the current block mode is not limited to a specific block position but can utilize prediction mode information from at least one block of the blocks located on the left, upper left, lower left, upper and upper right. As in the above example, the prediction mode candidate group of the current block can be constructed considering various factors.

The prediction mode encoding unit may classify a most probable mode (MPM) candidate group (referred to as candidate group 1 in this example) that is likely to be the same to the mode of the current block and a mode candidate group (referred to as candidate group 2 in this example) that is otherwise. The prediction mode encoding process may be changed depending on which candidate group of the candidate groups the prediction mode of the current block belongs to. The all prediction modes can be composed of the sum of the prediction mode of the candidate group 1 and the prediction mode of the candidate group 2. The number of the prediction mode of the candidate group 1 and the number of the prediction modes of the candidate group 2 are determined depending on at least one factor of a total number of the prediction modes, a block type, and the like, or a combination thereof. The same binarization or other binarization may be applied according to the candidate group. For example, a fixed length binarization may be applied to the candidate group 1, and a cut truncated-type binarization may be applied to the candidate group 2. In the above description, although the number of candidate groups is exemplified as two, it is possible to extend to, for example, a first mode candidate group having a high probability of being the same as the mode of the current block, a second mode candidate group having a high probability of being the same as the current block, and a mode candidate group that is otherwise, and also variations thereof are allowed.

In the post-processing filtering step executed by the post-processing filter unit, some prediction pixels of the prediction blocks generated in the previous process may be replaced with values generated by filtering one or more reference pixels adjacent to the boundary and one or more of the prediction pixels, and the predictive pixels may be replaced with a value generated by applying a value (for example, a difference in pixel values, inclination information, etc.) obtained by digitizing characteristics between reference pixels adjacent to the block boundary to a filtering process, considering a high correlation between the reference pixel adjacent to the boundary between the current block and the adjacent block and the pixel in the current block, and other methods other than the above method and having a similar purpose (correcting some prediction pixels of a prediction block through reference pixels) may be added. In the post-processing filter unit, a kind of filter and whether or not the filtering is applied can be implicitly or explicitly determined. The position and the number of the reference pixels and the current pixels used in the post-processing filter, a kind of prediction mode applied, and the like may be set in the encoder or the decoder, and related information can be transmitted in units of a sequence, a picture, a slice, and the like.

Further, in the post-processing filtering step, an additional post-processing process may be performed after the prediction block generation as in the block boundary filtering. In addition, after obtaining a residual signal, the post-processing filtering step may be performed on the current block reconstructed by adding the residual signal and the prediction signal that is obtained through transform process, quantization process, and dequantization process, considering the characteristics of the adjacent prediction pixels, similarly to the boundary filtering.

Finally, the prediction block is selected or obtained through the above-described processes. Information obtained from the processes may include information related to the prediction mode, and may be transmitted to the transform unit 210 for encoding the residual signal after the prediction block is obtained.

Figure 10:
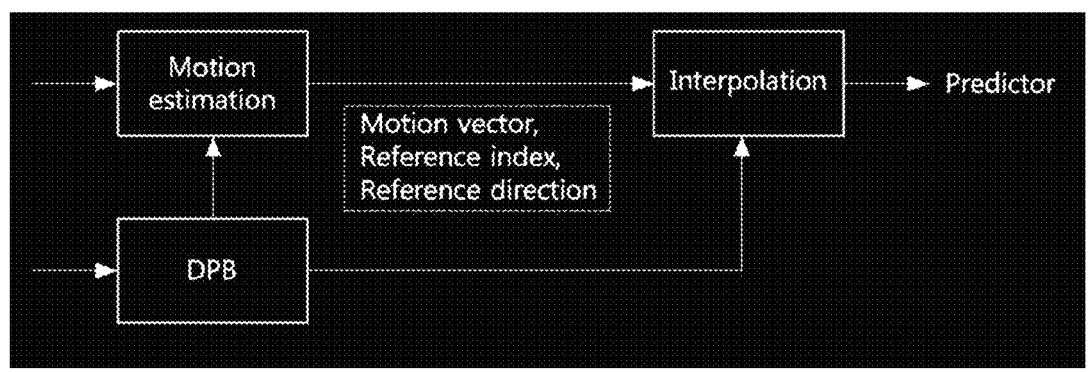
FIG. 10 is an exemplary view illustrating a prediction principle in a P-slice or a B-slice in the image encoding method according to an embodiment of the present invention.

FIG. 10 is an exemplary view illustrating a prediction principle in a P-slice or a B-slice in an image encoding method according to an embodiment of the present invention.

Referring to FIG. 10, the image encoding method according to the present embodiment may include a motion estimation step and an interpolation step. Information on a motion vector, a reference picture index, and a reference direction generated in the motion estimation step may be transmitted to the interpolation step. In the motion estimation step and the interpolation step, a value stored in the decoded picture buffer (DPB) can be used.

That is, the image encoding device can perform the motion estimation to find a block similar to the current block in the previous encoded pictures. In addition, the image encoding device can perform interpolation on the reference pictures for finer prediction than precision in decimal unit. Finally, the image encoding device obtains the prediction block through a predictor in which information obtained in this process includes a motion vector, a reference picture index or a reference index, reference direction, and the like, and then the residual signal encoding can proceed.

In this embodiment, intra prediction is performed in a P-slice or B-slice, so that it is possible to implement a combination method as shown in FIG. 9 that supports inter prediction and intra prediction.

Figure 11:
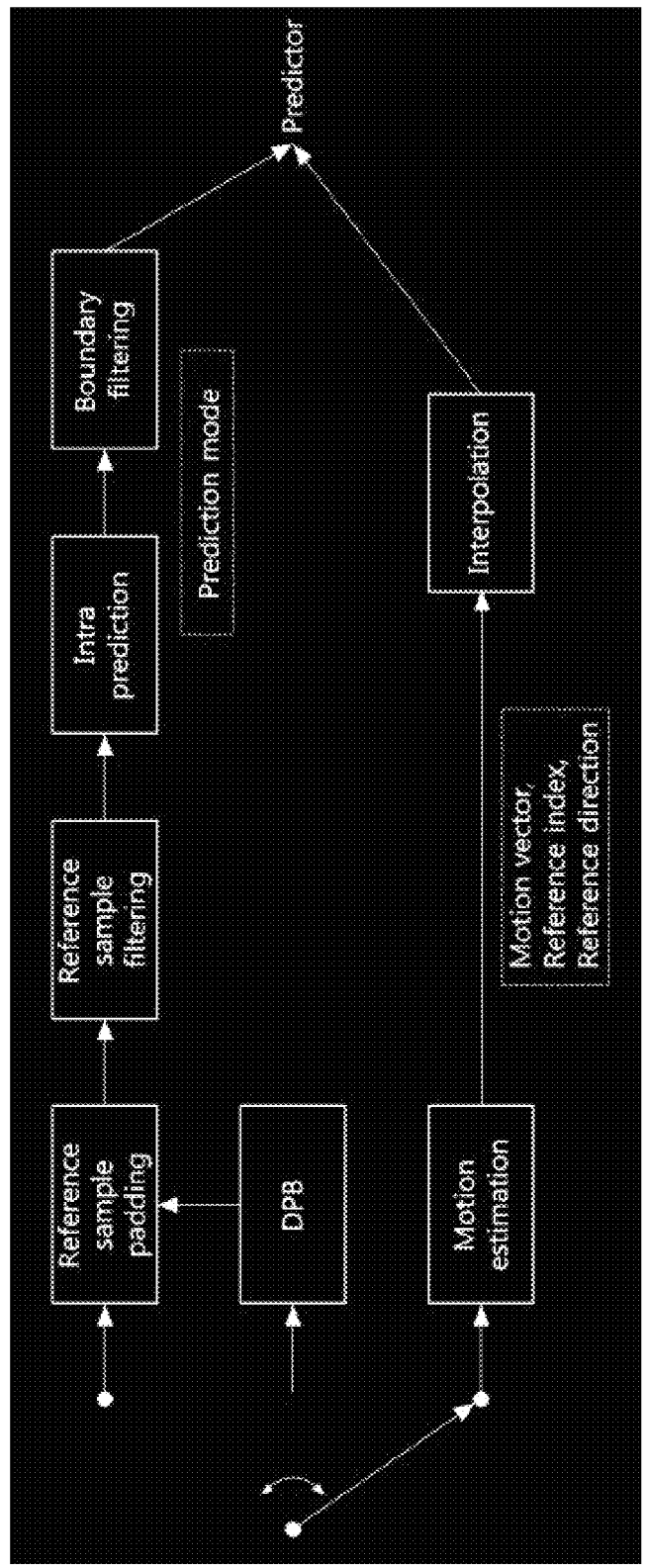
FIG. 11 is an exemplary view illustrating a process of obtaining a prediction block.

FIG. 11 is an exemplary view illustrating a process of obtaining a prediction block.

Referring to FIG. 11, an image encoding method according to an exemplary embodiment of the present invention includes steps of reference sample padding, reference sample filtering, intra prediction, a boundary filtering, motion estimation, and interpolation.

In the case where the image encoding device supports block matching in the current picture, the prediction method in the I-slice can be implemented by the construction shown in FIG. 11, not the construction shown in FIG. 9. That is, the image encoding device can use not only the prediction mode in a I-slice, but also information such as a motion vector, a reference picture index, and a reference direction that occur only in a P-slice or B-slice, to generate the prediction block. However, there may exist information that can be partially omitted due to the characteristic that the reference picture is the current picture. For example, when the reference picture is the current picture, the reference picture index and the reference direction can be omitted.

In addition, in the image encoding device, when interpolation is applied, since the block matching up to the decimal unit may not be necessary due to a nature of an artificial image such as a computer graphic, whether or not to perform the block matching is set in the encoder, and a unit such as a sequence, a picture, and a slice can be set.

For example, the image encoding device may not perform interpolation on reference pictures used for inter prediction according to the setting of an encoder, and may perform various settings such as not interpolating only when block matching is performed in the current picture. That is, the image encoding device of the present embodiment can be set according to whether interpolation of reference pictures is performed or not. At this time, it is possible to determine whether or not to perform interpolation on all the reference pictures or some reference pictures constituting the reference picture list. For example, the image encoding device does not perform interpolation when it is unnecessary to perform block matching in a decimal unit because the characteristic of an image of the reference block is an artificial image, and perform interpolation when it is necessary to perform block matching in a decimal unit because of natural image, for a specific current block.

Also, the image encoding device can set whether or not block matching is applied to the reference picture on which interpolation is performed in a block unit. For example, when a natural image and an artificial image are mixed, interpolation is performed on the reference picture. When an optimal motion vector can be obtained by searching a part of an artificial image, motion vector can be represented in a specific unit (here, an integer unit is assumed), and when the optimal motion vector can be obtained by selectively searching a part of a natural image, a motion vector can be expressed in other specific unit (here, assuming ¼ unit).

Figure 12:
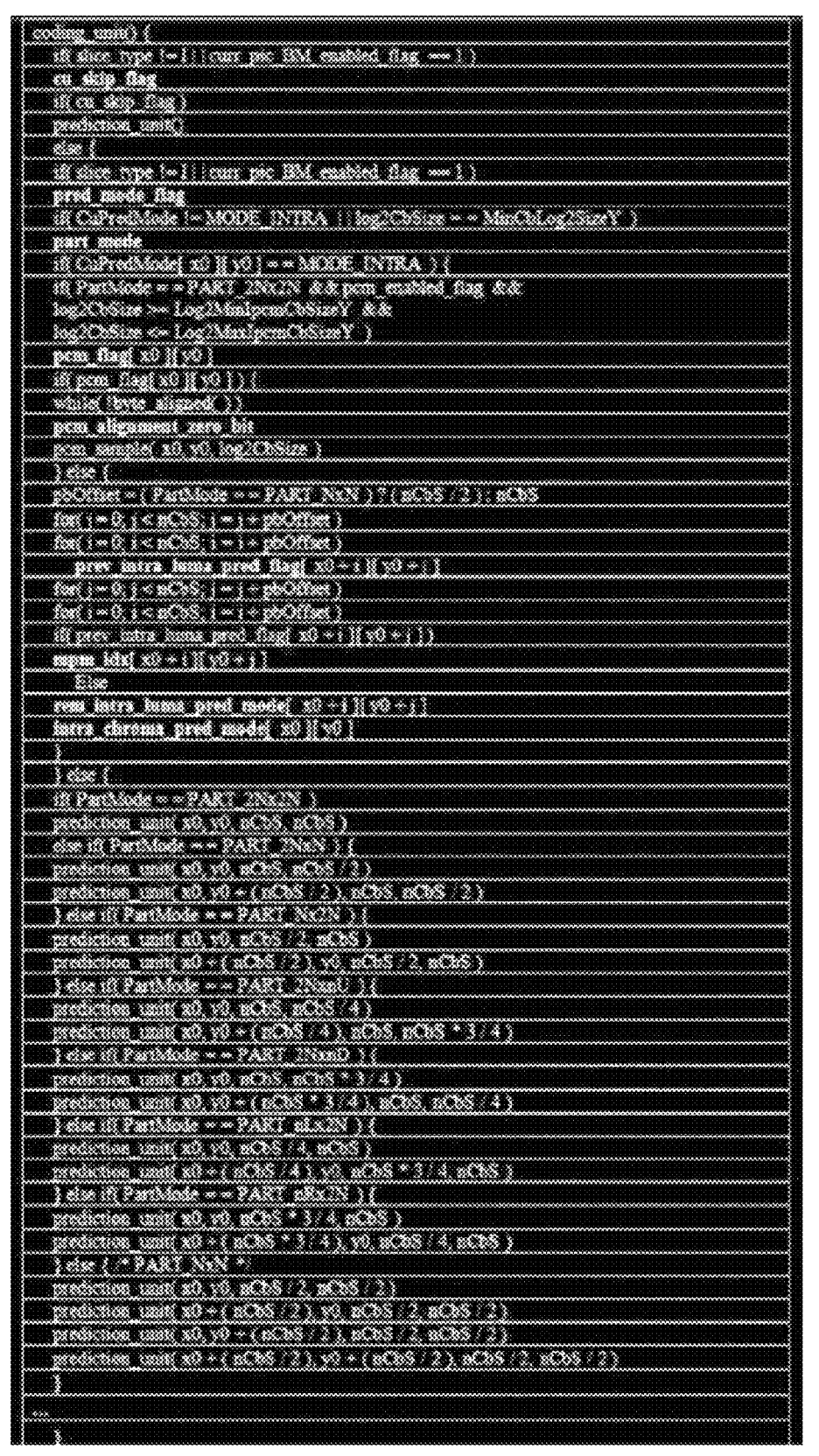

FIG. 12 is an exemplary view illustrating a main procedure of an image encoding method according to an embodiment of the present invention, using syntax in a coding unit.

Referring to FIG. 12, curr_pic_BM_enabled_flag means a flag that allows block matching in the current picture and may be defined and transmitted in units of a sequence and a picture. At this time, a process of generating a prediction block by performing block matching on the current picture may mean a case of operating through inter prediction. It can be assumed that cu_skip_flag, which is an inter-frame technique that does not encode the residual signal, is a flag that is supported only by a P-slice or a B-slice except for an I-slice. In this case, the I-slice can also support block matching (BM) in the inter prediction mode when curr_pic_BM_enabled_flag is on.

That is, the image encoding device of this embodiment can support skipping when generating a prediction block on the current picture through block matching, and can support skipping in the case of on-screen techniques other than block matching. Depending on the condition, skipping may not be supported in the I-slice. Whether or not to perform skipping can be determined depending on the encoder setting.

For example, when the I-slice supports skipping, the prediction block can be directly reconstructed as a reconstruction block through block matching without encoding the residual signal by linking to prediction_unit( ) which is a prediction unit through if (cu_skip_flag) that is a specific flag. In addition, the image encoding device classifies the method of using the prediction block through block matching in the current picture into an inter prediction technique, and such classification can be processed through a pred_mode_flag that is a specific flag.

That is, if the pred_mode_flag is 0, the image encoding device sets the prediction mode as the inter prediction mode (MODE_INTER), and if the pred_mode_flag is 1, it can set the prediction mode as the intra prediction mode (MODE_INTRA). This is an intra-frame technology similar to the existing one, but it can be classified into an intra-frame technique or an inter-frame technique in an I-slice to distinguish it from the existing structure. That is, the image encoding device of the present embodiment can use a temporal correlation structure without using temporal correlation in the I-slice. The part_mode means information about the size and type of a block divided in a coding unit.

Figures 13, 14:
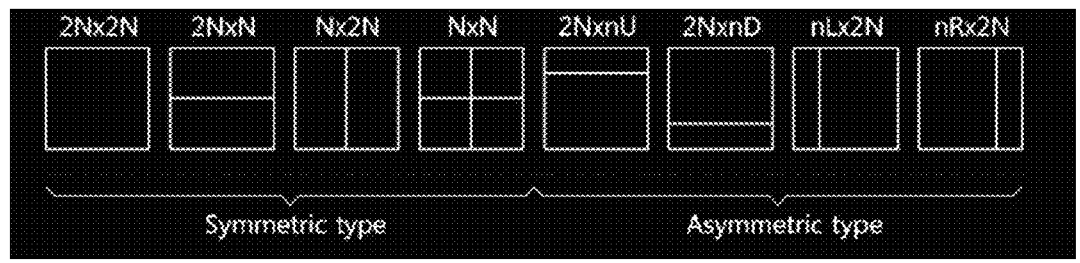
FIG. 13 is an exemplary view illustrating an example in which a symmetric type division or asymmetric type division is supported as inter prediction when a prediction block is generated through block matching in the current picture.
FIG. 14 is an exemplary view illustrating that 2N×2N and N×N can be supported in inter prediction.

FIG. 13 is an exemplary view illustrating an example in which a symmetric type division or asymmetric type division is supported as in inter prediction when a prediction block is generated through block matching in the current picture.

Referring to FIG. 13, in the case of generating a prediction block through block matching in the current picture, the image encoding method according to the present exemplary embodiment may support a symmetric type such as 2N×2N, 2N×N, and N×2N, and an asymmetric division such as nL×2N, nR×2N, 2N×nU, and 2N×nD, as in the inter prediction. Various block sizes and types can be determined according to the division method of the block division unit FIG. 14 is an exemplary view illustrating that 2N×2N and N×N can be supported in inter prediction.

Referring to FIG. 14, the image encoding method according to the present embodiment can support 2N×2N and N×N as in the prediction block type used in the conventional intra prediction. This is an example in which a square shape is supported through quad tree division method in a block division unit or division method according to predefined block candidate group, and other block types may be supported by adding a rectangular shape to binary tree division method or predefined block candidate group in intra prediction, in which the setting may be set in the encoder. The encoder may also set whether skipping is applied only when performing block matching on the current picture, whether skipping is also applied to the existing intra prediction, or whether skipping is applied to the new intra prediction. Information related thereto can be transmitted in units of a sequence, a picture, a slice, and the like.

A subtraction unit 205 can generate the residual block by subtracting the pixel value of the prediction block generated from the prediction unit 200 from the pixel value of the current block to be encoded to derive the pixel difference value.

A transform unit 210 receives the residual block, which is the difference value between the current block and the prediction block generated through intra prediction or inter prediction from the subtraction unit 205, and transforms the residual block into the frequency domain. Through the transform process, each pixel of the residual block corresponds to the transform coefficient of the transform block. The size and type of the conversion block can have a size equal to or smaller than a coding unit. Also, the size and type of the transform block may be the same as or smaller than the prediction unit. The image encoding device can perform transform processing by grouping several prediction units.

The size or type of the transform block can be determined through the block division unit, and can support transform of square or rectangular shape according to block division. The block division operation can be affected by the transform related settings (size, type, and the like of the transform block supported) supported by the encoder or decoder.

The size and type of each transform block are determined depending on the cost for each candidate of size and type of each transform block, and the division information such as the image data of each transform block determined and the size and type of each transform block determined may be encoded.

The transform can be performed by a one-dimensional transform matrix (DCT, DST, etc.). Each transform matrix can be adaptively used in horizontal and vertical units. Examples of adaptive use can be determined by various factors such as size of block, type of block, sorts of block (luminance and chrominance), an encoding mode, prediction mode information, a quantization parameter, and encoding information of the adjacent block.

For example, in the case of intra prediction, when the prediction mode is horizontal, a DCT-based transform matrix may be used in a vertical direction and a DST-based transform matrix may be used in a horizontal direction. When the prediction mode is vertical, a DCT-based transform matrix may be used in the horizontal direction and a DST-based transform matrix may be used in the vertical direction. The transform matrix is not limited to that explained in the above description. Information related thereto may be determined using implicit or explicit methods and may be determined depending on one or more factors of a block size, a block type, an encoding mode, a prediction mode, a quantization parameter, encoding information of adjacent block, and the like, or a combination thereof, and the related information can be transmitted in units of a sequence, a picture, a slice, a block, and the like.

Here, considering the case of using an explicit method, when two or more transform matrices for horizontal and vertical directions are used as a candidate group, information on which transform matrix is used for each direction may be respectively sent or information on which transform matrix is used for each of the horizontal and vertical directions, and information on which transform matrix is used for the horizontal and vertical directions using two or more pairs as a candidate group may be sent.

In addition, the partial transform or the overall transform can be omitted in consideration of the characteristics of the image. For example, one or both of the horizontal or vertical components may be omitted. Since intra prediction or inter prediction is not performed well, the encoding loss due to transform may be increased when the difference between the current block and the prediction block is large (that is, when the residual component is large). This may be determined according to at least one factor of encoding mode, prediction mode information, size of a block, type of a block, sort of a block (luminance and chrominance), quantization parameter, encoding information of an adjacent block, or a combination thereof. The above conditions can be expressed using an implicit or explicit method, and information related thereto can be transmitted in units of sequence, picture, slice, and the like.

A quantization unit 215 performs quantization of the residual component transformed by the transform unit 210. The quantization parameter is determined on a block basis, and the quantization parameter can be set in units of a sequence, a picture, a slice, a block, and the like.

For example, the quantization unit 215 may predict the current quantization parameters using one or more quantization parameters derived from adjacent blocks such as left, top left, top, top right, and bottom left of the current block.

When the quantization parameter predicted from the adjacent block does not exist, that is, when the block is located at the boundary of a picture, a slice, or the like, the quantization unit 215 may output or transmit a difference value from a basic parameter transmitted in units of a sequence, a picture, slice, and the like. When the quantization parameter estimated from the adjacent block exists, the difference value may be transmitted using the quantization parameter of the corresponding block.

The priority of the block which is to derive the quantization parameter may be preset or may be transmitted in units of a sequence, a picture, a slice, or the like. The residual block can be quantized through a dead zone uniform threshold quantization (DZUTQ), a quantization weighted matrix, or an improved scheme. It is possible to use one or more quantization schemes as candidates and the schemes may be determined by encoding mode, prediction mode information, and the like.

For example, the quantization unit 215 may set a quantization weighted matrix to apply to inter-frame encoding, intra-frame coding unit, or the like, and may also set a different weighted matrix according to the intra prediction mode. The quantization weighted matrix can be constructed by varying the quantization coefficients for each position of each frequency component, assuming that the size of the block is equal to the quantization block size with a size of M×N. The quantization unit 215 may select one of various existing quantization methods, and may be used under the same setting of an encoder or a decoder. Information related thereto can be transmitted in units of a sequence, a picture, a slice, and the like.

Meanwhile, dequantization units 220 and 315 and inverse-transform units 225 and 320 shown in FIGS. 2 and 3 may be implemented by reversely performing the processes in the transform unit 210 and the quantization unit 215. That is, the dequantization unit 220 can dequantize the quantized transform coefficients generated by the quantization unit 215, and the inverse-transform unit 225 can reversely transform the dequantized transform coefficients to generate a reconstructed residual block.

The adding unit 230 and 324 shown in FIGS. 2 and 3 may generate a reconstruction block by adding the pixel values of the prediction block generated from the predictor to the pixel values of the reconstructed residual block. The reconstruction block may be stored in the encoding and decoded picture buffers 240 and 335 and provided to the prediction unit and the filter unit.

An in-loop filter such as a deblocking filter, a sample adaptive offset (SAO), an adaptive loop filter (ALF), and the like can be applied to the reconstruction block. The deblocking filter can filter the reconstruction block to eliminate distortion between block boundaries that occur during encoding and decoding. The SAO is a filter process that reconstructs the difference between the original image and the reconstructed image with offset, on a pixel-by-pixel basis, with respect to the residual block. The ALF can perform filtering to minimize the difference between the prediction block and the reconstruction block. The ALF can perform filtering based on a comparison value between the reconstruction block and the current block through the deblocking filter.

The entropy encoding unit 245 can entropy-encode the transform coefficients quantized through the quantization unit 215. For example, techniques such as context adaptive variable length coding (CAVLC), context adaptive binary arithmetic coding (CABAC), syntax-based context adaptive binary arithmetic coding (SBAC), probability interval partitioning entropy (PIPE) coding, and the like may be performed.

The entropy encoding part 245 may include a bitstream obtained by encoding a quantization coefficient and various information necessary for decoding the encoded bitstream as the encoded data. The encoded data may include an encoded block type, a quantization coefficient, a bitstream in which the quantization block is encoded, and information necessary for prediction. In the case of the quantization coefficient, the two-dimensional quantization coefficient can be scanned in one dimension. The quantization coefficient may vary depending on the characteristics of the image. In particular, in the case of intra prediction, since the distribution of coefficients can have a specific distribution depending on the prediction mode, the scanning method can be set differently.

In addition, the entropy encoding part 245 may be set differently according to the size of a block to be encoded. The scan pattern may be preset or set as a candidate with at least one of various patterns such as zigzag, diagonal, and raster, may be determined by encoding mode, prediction mode information, and the like, and may be used under the same setting of the encoder and the decoder. Information related thereto can be transmitted in units of sequence, picture, slice, and the like.

The size of a quantized block (hereinafter referred to as a quantization block) inputted to the entropy encoding part 245 may be equal to or smaller than the size of the transform block. In addition, the quantization block can be divided into two or more sub-blocks. When the quantization block is divided, a scan pattern in the division block can be set to be the same as or different from a scan pattern of the existing quantization block.

For example, when the scan pattern of an existing quantization block is referred to as a zigzag, the zigzag may be applied to all sub-blocks, or the zigzag pattern may be applied to sub-blocks located at an upper left of a block including a DC component and a diagonal pattern can be applied to the other blocks. This can also be determined according to encoding mode, prediction mode information, and the like.

The starting position of the scan pattern in the entropy encoding part 245 is basically from an upper left corner, but may be from an upper right corner, a lower right corner, or a lower left corner depending on the characteristics of the image. Information on which one or more candidate groups have been selected can be transmitted in units of a sequence, a picture, a slice, or the like. The entropy encoding technique may be used as an encoding technique, but is not limited thereto.

Meanwhile, dequantization of the dequantization unit 220 and an inverse-transform of the inverse-transform unit 225 shown in FIGS. 2 and 3 are reversely constructed from the quantization of the quantization unit 215 and the transform of the transform unit 210, and may be implemented by combining basic filter 235 and 330.

Hereinafter, the forming of the reference pixel described above will be described in more detail.

When performing intra prediction according to the embodiment of the present invention, an availability of the reference pixels of adjacent blocks must be checked. The availability of the reference pixel may be determined based on at least one factor of a position of the adjacent block, a position of the current block in the division block, boundary characteristics of adjacent blocks, and the like, or a combination thereof. For example, when an M×M block is divided into four M/2×M/2 blocks (in this example, allocation of 0, 1, 2, and 3 index in the raster scan direction) through a block division unit, and the current block is M/2×M/2 block of number 3, although a adjacent block located in a specific direction (in this example, the upper right corner and the lower left corner in the present example) belongs to the unit of picture, slice, or tile as the current block, the corresponding block is not yet encoded so that it is determined that the block is not available, whereby the reference pixel of the block may not be used. As another example, whether or not to use the reference pixels of the adjacent block can be determined according to the boundary characteristics (boundary of slices, tiles, etc.) between the current block and the adjacent block.

Another example of the use of reference pixels in adjacent block may support the setting for determining whether or not to use data with a high probability of error propagation in the encoder/decoder in order to avoid error propagation over time in case of P-slice or B-slice. According to this setting information, it is possible to determine whether or not to use data with high probability of error propagation for generating the prediction block, and a flag such as constrained_intra_pred_flag (CIP) of HEVC can perform a similar role. The flag can determine whether or not to use the adjacent blocks encoded with inter prediction mode with high probability of error propagation among adjacent blocks referenced in intra prediction block generation are used. If the flag is 0, the reference pixel of the block encoded with the inter prediction may not be used, and if the flag is 1, the reference pixel of the block encoded with the inter prediction may be used.

The following example illustrates a case where a prediction block is generated when the flag is not zero. An additional setting of the flag causes the reference pixel to be not available regardless of the error propagation possibility, whereby any reference pixel may not be used for prediction. In this case, since a prediction block may not use any reference pixel, a prediction block may be generated by filling a preset value (for example, a middle value of a pixel value range of a bit depth). Alternatively, it is possible to generate a prediction block that applies edge information based on a predefined value. For example, if the predefined value is A, a right area including an arbitrary pixel is filled with (A+B) and the other area is filled with (A−C) on the basis of the arbitrary pixel in a M×N block to generate the prediction block, and B and C mean parameters used to represent the edge information.

In addition, with an additional setting of the flag, it is possible to determine the error propagation probability through the number of adjacent blocks encoded with inter prediction, the number of reference pixels of adjacent blocks, and the like. According to the determination, it is possible to determine whether to use the reference pixel of the block encoded through the intra prediction. For example, if less than N blocks of M adjacent blocks adjacent to the current block are blocks encoded with inter prediction, the reference pixels of the block may not be used for generating the prediction block, and the reference pixels of (M−N) blocks encoded with intra prediction may also not used for generating the prediction block. Since the number of blocks that is the determination criterion may be influenced by the size or type of the block, it may be replaced with the number of reference pixels existing at a position to be used for predicting the current block, and other factors may be considered.

The prediction block generated may be influenced depending on whether or not use the reference pixel. For example, if at least one of the adjacent blocks of the current block is available depending on whether or not use the reference pixel, the reference pixels of unavailable blocks may be replaced with the pixel derived (for example, copying, average, and the like) from the reference pixel of the available block. As another example, when there is no available block depending on whether or not use the reference pixel, the reference pixels of unavailable block may be replaced with a predefined value (for example, a middle value of a pixel value range of a bit depth).

The substitute of the values derived from the available blocks may be inhibited according to the setting of the encoder or the decoder. In this case, the prediction mode derived from the corresponding block may not be used.

Hereinafter, these contents will be described in more detail with reference to the drawings.

Figure 15:
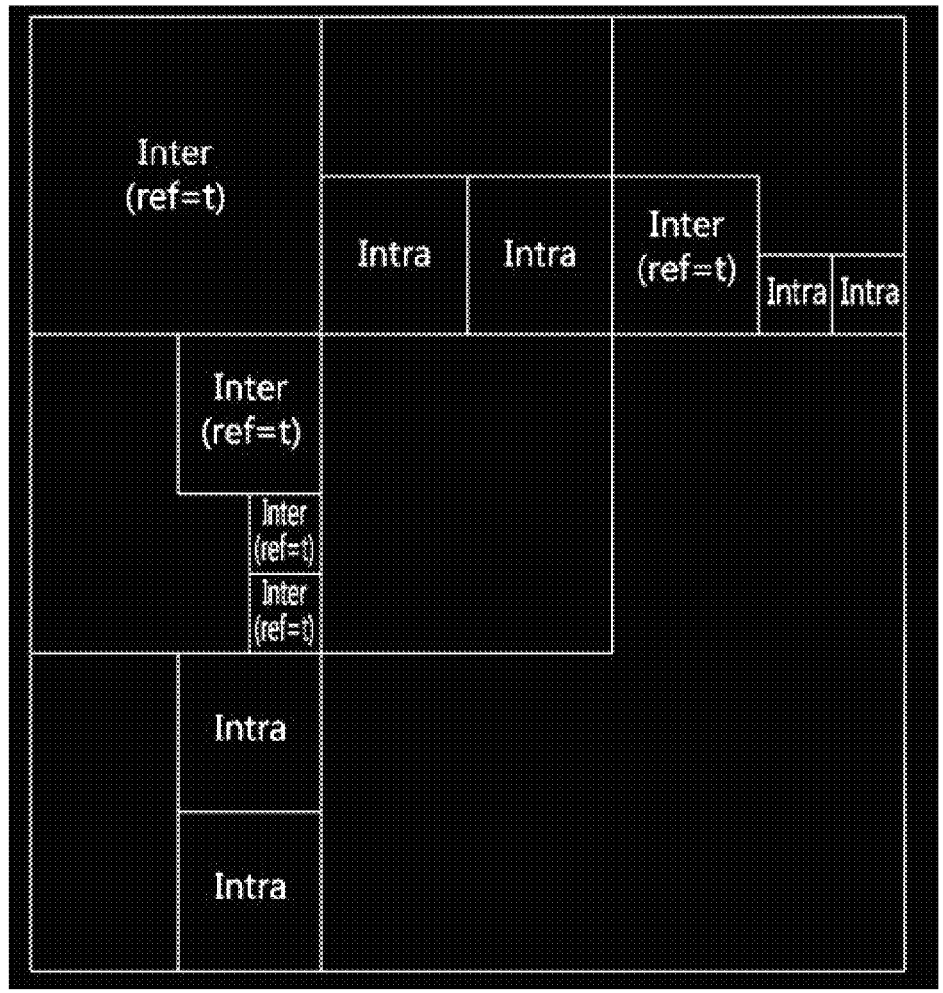
FIG. 15 is an exemplary view illustrating an encoding mode of adjacent blocks in intra prediction according to an embodiment of the present invention.

FIG. 15 is an exemplary view illustrating an encoding mode of adjacent blocks in intra prediction according to an embodiment of the present invention.

Referring to FIG. 15, it is possible to determine whether a reference pixel of a corresponding block is used for generating a prediction block according to an encoding mode of an adjacent block of the current block. In this case, the adjacent block may be a square shape of M×M obtained through a block division unit or a rectangular shape of M×N and may be encoded with one of intra prediction or inter prediction according to an encoding mode. As shown in FIG. 15, when the current block is the middle block, a block located at an upper left is encoded with inter prediction (Inter), two blocks located at an upper end are encoded with intra prediction (Intra), and a block located at an upper right is encoded with inter prediction, intra prediction, and intra prediction from a left side therein.

The blocks encoded with the inter prediction may be further classified according to the reference picture. A expression ref=t of blocks encoded with the inter prediction of FIG. 15 indicates that the reference picture is the current picture.

Figure 16A:
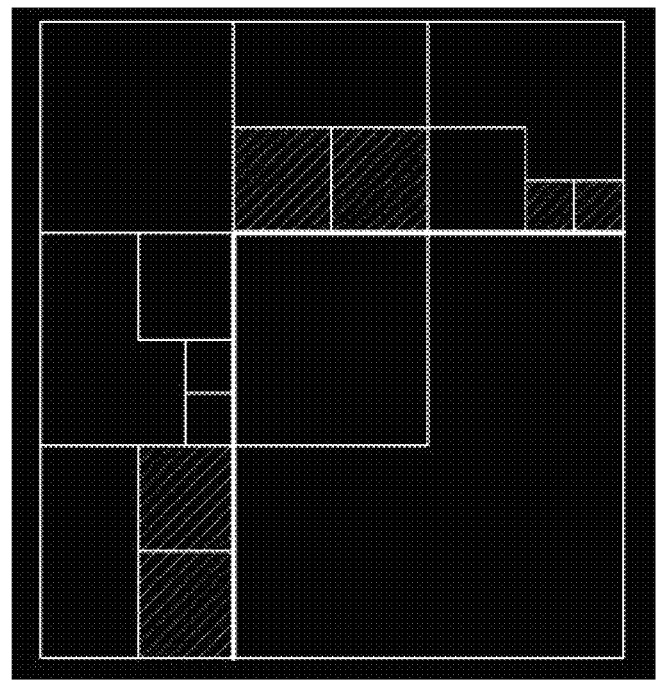
FIG. 16a is an exemplary view illustrating whether a reference pixel is used or not considering an encoding mode of adjacent blocks in intra prediction according to an embodiment of the present invention.
Figure 16B:
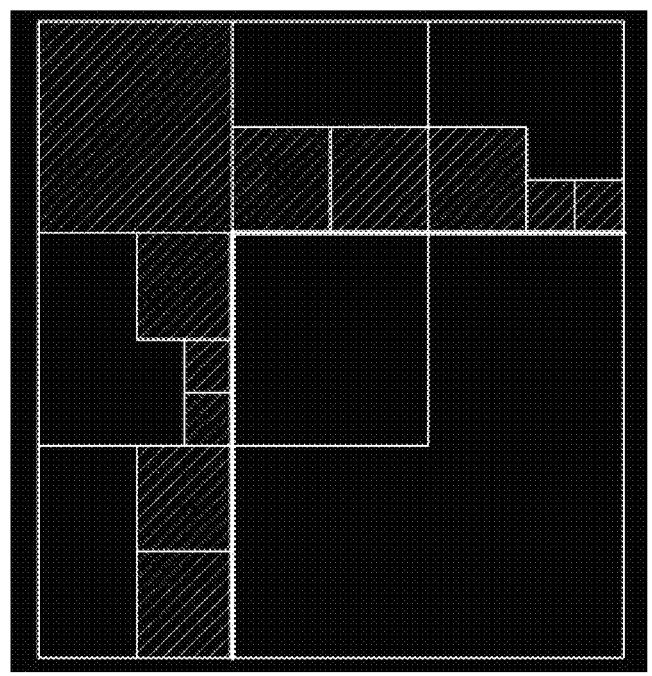
FIG. 16b is an exemplary diagram illustrating whether a reference pixel is used or not without considering a coding mode of adjacent blocks in intra prediction according to an embodiment of the present invention.

FIGS. 16a and 16b will be described under the above assumption.

FIG. 16a is an exemplary diagram for explaining whether or not to use the reference pixel considering the encoding mode of adjacent blocks in intra prediction according to an embodiment of the present invention. FIG. 16b is an exemplary view for explaining whether or not to use the reference pixel without considering the encoding mode of adjacent blocks in intra prediction according to an embodiment of the present invention.

In the following example, whether to consider the encoding mode of adjacent blocks will be explained using a CIP flag. Specifically, when the CIP flag indicates 1, a block encoded with a specific encoding mode (in this example, an inter prediction) may not be used for predicting the current block, and when the flag indicates 0, the block encoded with a specific encoding mode may be used for predicting the current block.

Referring to FIG. 16a, if a CIP flag is 1 and an adjacent block is encoded with inter prediction (Inter), a reference pixel of the corresponding block may not be used for predicting the current block. The reference block of an adjacent block of a block encoded with intra prediction (Intra) that is indicated by a hatched line can be used for predicting the current block.

Here, pixels adjacent to the current block within a block capable of being used as a reference pixel may be used as the reference pixel, and other additional pixels may be included.

Referring to FIG. 16b, if the CIP flag is 0, the reference pixel of an encoded block can be used for predicting the current block. That is, pixels adjacent to the current block within upper left, upper right, upper left, left, and lower left of the current block can be used as a reference pixel.

Figure 17:
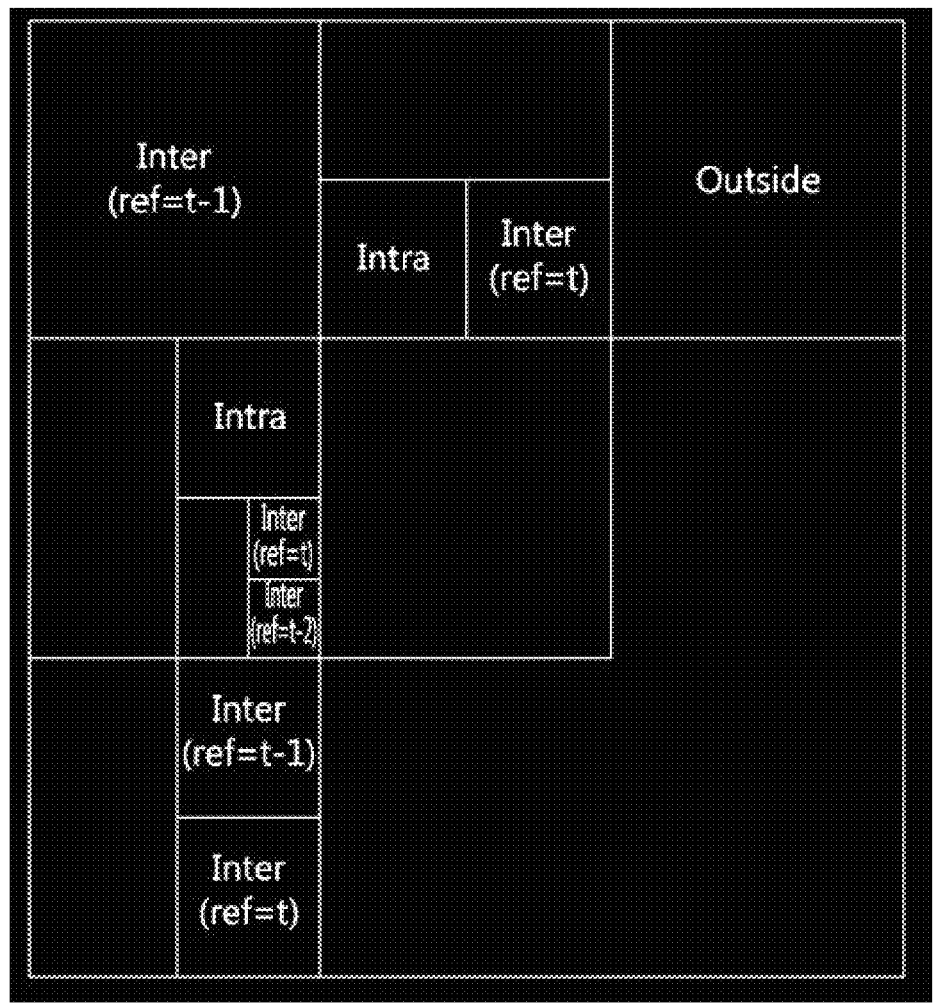
FIG. 17 is another exemplary view illustrating an encoding mode of adjacent blocks in intra prediction according to an embodiment of the present invention.

FIG. 17 is other exemplary view illustrating an encoding mode of adjacent blocks in intra prediction according to an embodiment of the present invention.

Referring to FIG. 17, an adjacent block is encoded with one of intra prediction and inter prediction. When adjacent blocks are encoded with inter prediction, ref=t indicates that the reference picture is the current picture, ref=t−1 indicates that the reference picture is a picture immediately earlier than the current picture, ref=t−2 indicates that the reference picture is a picture secondly earlier than the current picture, and another reference picture may be added according to the reference direction of the inter prediction. A block at upper right means a block located outside the picture range.

Under the encoded state as shown in FIG. 17, an example of determining availability as a reference pixel will be described with reference to FIGS. 18a to 18c.

Figure 18A:
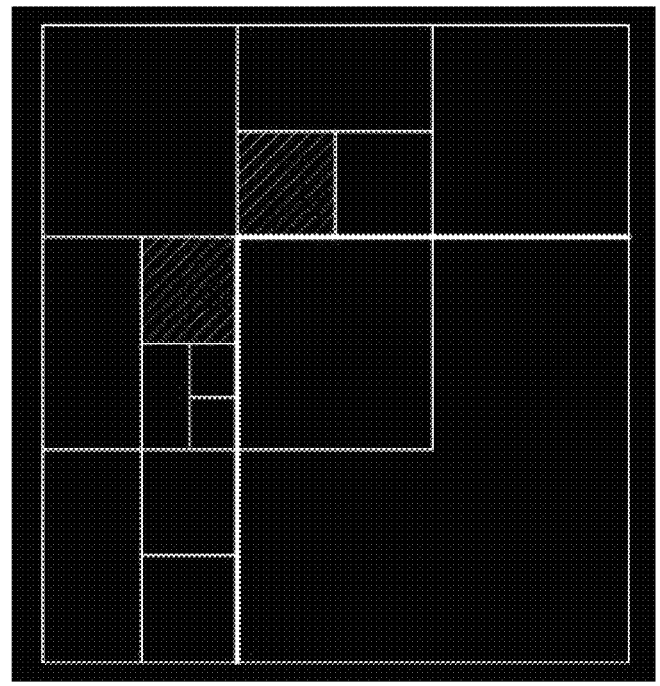
FIG. 18a is an exemplary view illustrating a case in which an encoding mode of adjacent blocks is intra prediction in intra prediction according to an embodiment of the present invention.

FIG. 18a is an exemplary view for explaining a case in which an encoding mode of adjacent blocks is intra prediction according to an embodiment of the present invention. FIG. 18b is an exemplary view for explaining a case in which an encoding mode and a reference picture of adjacent blocks are considered, in intra prediction according to an exemplary embodiment of the present invention. FIG. 18c is another exemplary view for explaining a case in which an encoding mode of adjacent blocks is not considered, in intra prediction according to an embodiment of the present invention.

Referring to FIG. 18a, adjacent blocks encoded with intra prediction in the encoding mode of FIG. 17 may be displayed in a hatched area.

Since the hatched blocks are encoded with intra prediction, the pixels in the corresponding blocks can be used as reference pixels.

Also in this case, whether or not to consider the encoding mode of the adjacent block can be indicated according to a CIP flag, and it may be an example of the case where the CIP flag is 1.

Figure 18B:
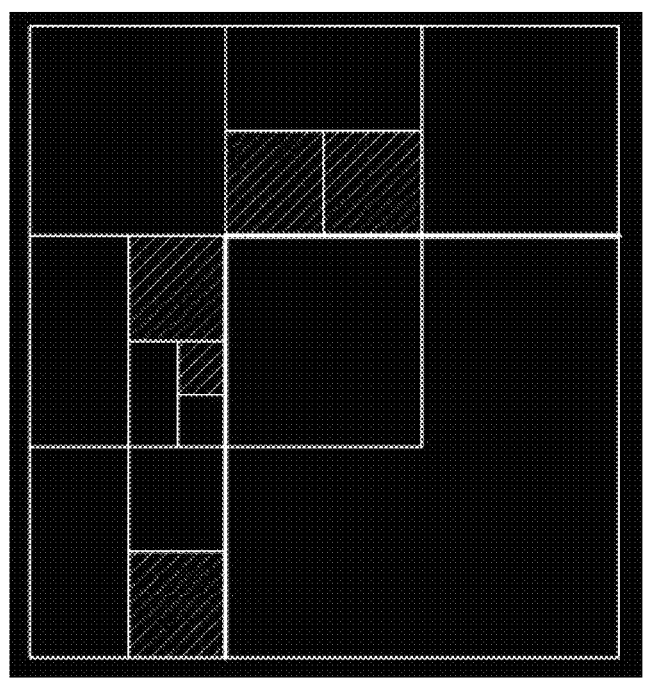
FIG. 18b is an exemplary view illustrating a case in which an encoding mode of adjacent blocks and a reference picture are considered, in intra prediction according to an exemplary embodiment of the present invention.

Referring to FIG. 18b, pixels in blocks encoded with intra prediction in the encoding mode state of FIG. 17 can be used as reference pixels as described above.

However, in FIG. 18b, even if the adjacent block is encoded with inter prediction, when reference picture of the adjacent block is the current picture, pixels in such a block can be used as the reference pixel. Alternatively, when the reference picture of the adjacent block is the current picture, pixels of the corresponding block may not be used as the reference pixel.

The pixels may be used because an error propagation does not occur over time between pictures when the reference picture of the adjacent block is a current picture. Conversely, the pixels may be not used because the error propagation may occur when the block referenced in the current picture is a block encoded from a previous or a subsequent picture.

As described above, whether or not to use a reference pixel can be determined depending on at least one factor of a position of adjacent block, an encoding mode of an adjacent block, a position of a current block in a division block, a boundary characteristic of a current block and an adjacent block, or a combination thereof, and a reference picture can be added to the above factors. In detail, it is possible to determine whether or not to use a reference pixel of a corresponding block for predicting the current block in consideration of an index of a reference picture of adjacent blocks or a picture order count (POC). In the above example, although the reference picture is specified as the current picture, it may be expanded to a reference picture having a different index or a picture order count (POC). Also, various settings for the reference picture indexes L0 and L1 may be constructed even when the reference direction of inter prediction is an unidirectional prediction (L0, L1) and a bidirectional prediction.

Accordingly, not only pixels within blocks (intra-frame predicted block) hatched in FIG. 18a, but also pixels within blocks that are encoded with inter prediction and have the current picture as the reference picture may be used as the reference pixel.

Also in this case, since whether or not to consider the encoding mode of a adjacent block can be indicated according to the CIP flag, it may be an example for explaining a case where the flag is one.

Figure 18C:
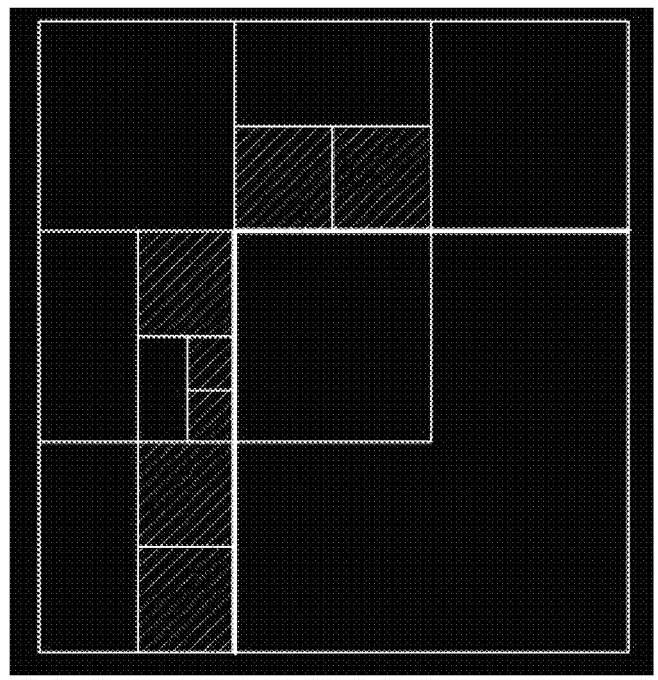
FIG. 18c is another exemplary view illustrating a case in which an encoding mode of adjacent blocks is not considered, in intra prediction according to an embodiment of the present invention.

Referring to FIG. 18c, all adjacent pixels in the adjacent block can be used as a reference pixel in principle.

However, since an area at an upper right of the current block positioned at the center is an area without image data or an area outside the image, it may correspond to an area that is not available in any cases.

The examples described above with reference to FIGS. 15 to 18c are summarized as follows.

First, the availability for a reference pixel of an adjacent block of the current block can be determined.

When it is determined that reference pixels in all adjacent blocks are not available, a reference pixel made up of a predefined pixel value may be obtained. For example, the reference pixel can be composed by an intermediate value of a representation range of the pixel. More specifically, since values can be assigned to the reference pixels with 1<<(bit depth-1) and the bit depth means the number of bits used to represent the pixel, the exemplified value may mean an intermediate value of the representation value of the pixel.

When it is determined that at least one adjacent block is available, the encoding mode of adjacent blocks (left, top, left top, top right, bottom left block, etc.) may be considered.

In addition, it is possible to use a preset flag indicating whether encoding mode is considered.

For example, all pixels in adjacent blocks can be used as reference pixels without considering the encoding mode, and at this time the preset flag may indicate not to consider the encoding mode.

Here, if the encoding mode of the adjacent block is the inter prediction, it is determined that the adjacent block is unavailable so that pixels in the adjacent block may not be used for the reference pixel.

Also, even if the encoding mode of the adjacent block is an inter prediction, the pixels may be used as a reference pixel when a reference picture of the adjacent block is the current picture by checking the reference picture.

Here, the reference picture is selected from a list 0 that stores data for reference pictures earlier than the current picture and a list 1 that stores data for reference pictures later than the current picture, and the current picture may be included in the list 0 or the list 1.

Also, even if the encoding mode of the adjacent block is inter prediction, the pixels may be used as a reference pixel when a reference picture of the adjacent block is an I picture (except for P or B) by checking the reference picture.

However, the above constraint conditions should be understood as an example of determining whether a pixel in an adjacent block can be used as a reference pixel in consideration of a specific condition. That is, the encoding mode of the adjacent block is an inter prediction, and it is possible to determine availability as a reference pixel by referring to motion vectors of motion information, reference picture information, and the like on that adjacent block. In this case, the conditions exemplified above can be set in units of a sequence, a picture, a slice, and the like.

The availability determination for the reference pixel according to an embodiment of the present invention may be performed according to the following flow.

First, whether the block adjacent to the current block is located beyond a boundary of the picture, slice, or tile is confirmed. Then, whether the adjacent block is encoded may be confirmed. And then, the slice type of the adjacent block is checked, and if the type is an I-slice, the boundary pixel within the adjacent block can be set to be available as a reference pixel of the current block. If the type is a P-slice, the mode is a unidirectional prediction. Therefore, the reference picture is confirmed by checking the reference picture list 0 (ref_idx_l0). When the reference picture is the current picture, a reference pixel of the current picture may be set to be available. However, this should be understood as an example. When the current picture is not a reference picture, the reference pixel may be set to be unavailable. If the type is a B-slice, after confirming whether the current picture is used as the reference picture by confirming whether the prediction mode is unidirectional_L0, unidirectional_L1, or bidirectional, whether or not the reference picture is available may be confirmed.

Figure 19A:
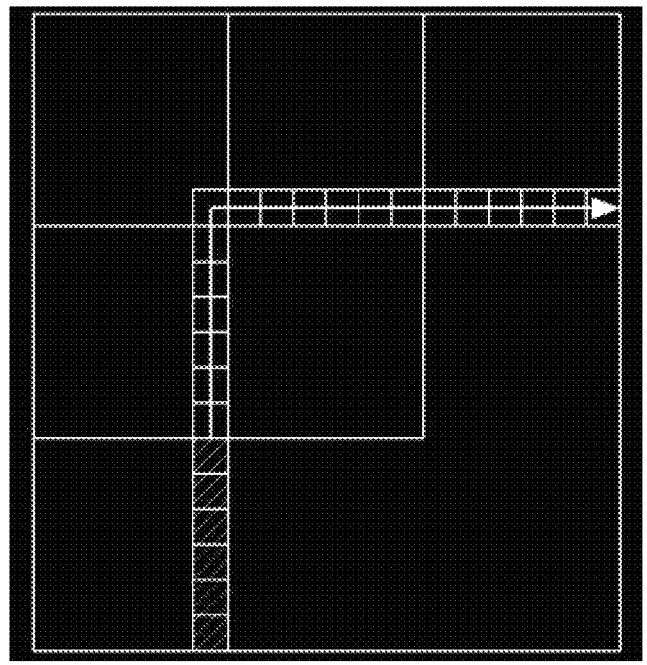
FIG. 19a is an exemplary view illustrating a method of obtaining a reference pixel when available adjacent blocks are at a lower left end.
Figure 19B:
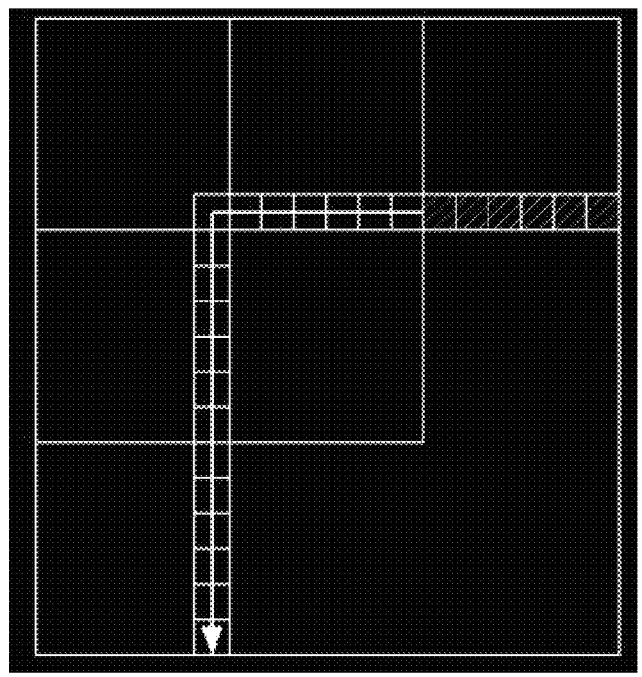
FIG. 19b is an exemplary view illustrating a method of obtaining a reference pixel when available adjacent blocks are at an upper right end.
Figure 19C:
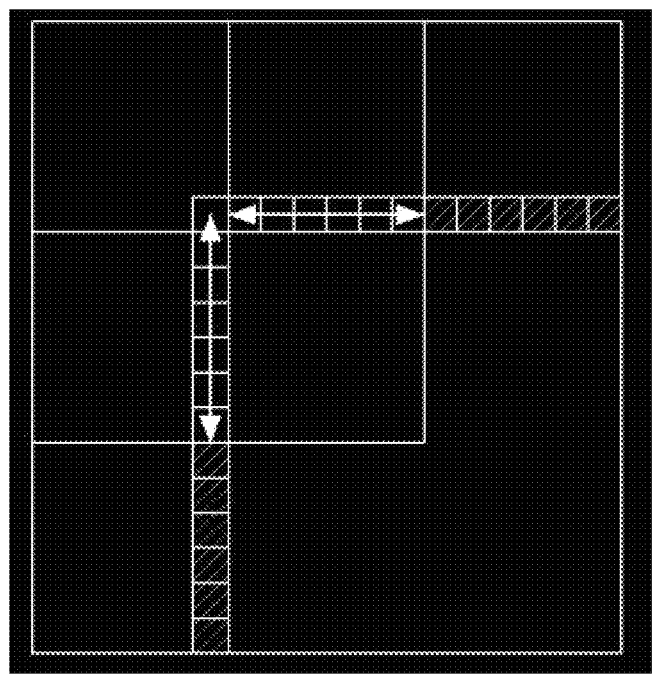
FIG. 19c is an exemplary view illustrating a method of obtaining a reference pixel when available adjacent blocks are at a lower left end and an upper right end.
Figure 19D:
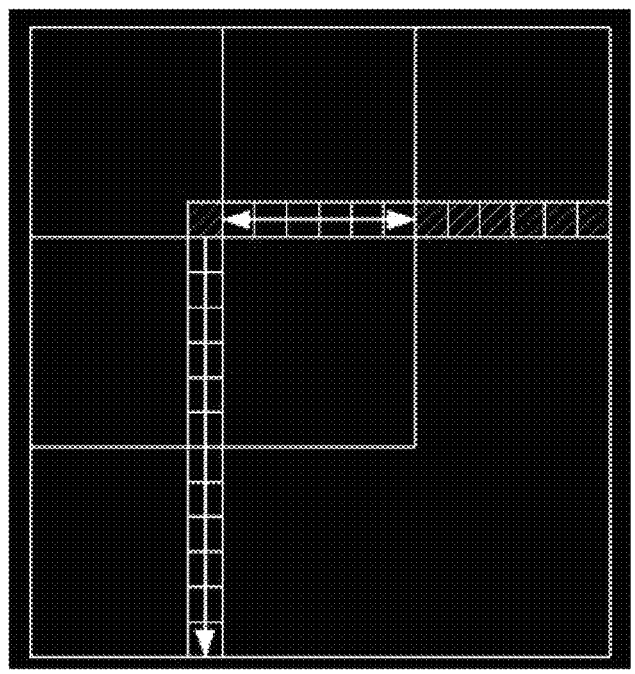
FIG. 19d is an exemplary view illustrating a method of obtaining a reference pixel when available adjacent blocks are at a lower left end and an upper right end.

FIG. 19*a* is an exemplary view for explaining a method of obtaining a reference pixel when available adjacent blocks are located at lower left. FIG. 19*b* is an exemplary view for explaining a method of obtaining a reference pixel when available adjacent block are located at upper right end. FIG. 19*c* is an exemplary view for explaining a method of obtaining reference pixels when available adjacent blocks are located at lower left end and upper right end. FIG. 19*d* is an exemplary view for explaining a method of obtaining a reference pixel when the available adjacent blocks are located at upper left end and upper right end.

Referring to FIGS. 19*a* to 19*d*, hatched pixels may mean adjacent pixels within the block that is determined that the adjacent blocks are available, and arrow directions may indicate directions constituted by reference pixels.

As described above, although the adjacent block may be determined to be available, it may be also determined to be unavailable. Thus, the pixels in a block that are determined to be unavailable may not be used as reference pixels, and in such case, how to construct adjacent pixels in unavailable blocks may be problematic.

Referring to FIGS. 19*a* and 19*b*, when only pixels located at upper right or lower left of the current block are available as a reference pixel, pixels in contact with an unavailable area are copied and filled in pixels adjacent to the current block among unavailable areas.

Referring to FIG. 19*c*, when there are available areas in both upper right and lower left of the current block, the pixels may be filled by copying pixels of any one available area, by obtaining the average value of pixels on both sides (such as <down to up and left to right>, <left to right and top to bottom>, or <bottom to top and right to left>), or by a linear interpolation.

Referring to FIG. 19*d*, when areas available as a reference pixel are mixed, the pixels may be filled with pixel values via copy in either one direction (left direction, down direction); the pixels may be filled with values generated by using pixels on both sides such as interpolation and average when there are available areas on both sides such as an upper end of the current block; and the pixels may be filled with the value obtained via copy when there is an available area on one side such as left or lower left end of the current block.

More specifically, referring to FIG. 19*d*, pixels located at right, including P (−1, −1) and P (blk_size, −1) located at upper right of the current block, may be available. Values from P (0, −1) to P (blk_size−1, −1) may not be available. In this case, if an average value is assigned, it is possible to be assigned as P(x, y){x is 0 to blk_size−1, y is 1}={P(−1, −1)+P(blk_size, −1)}+1/2. At this time, blk_size may mean a block size.

Pixels located at a bottom including P (−1,0) may not be available. At this time, P(x, y){x is 1, y is 0 to 2*blk_size−1} may be assigned with P(−1, −1).

In addition, it is possible to determine whether to perform the interpolation according to a position of the reference pixel. As shown in FIG. 19*c*, even if there are available areas on both sides, the interpolation may be restricted when the positions of available areas are not connected by a vertical line. Specifically, when the coordinates of both ends of the available areas are compared, the interpolation may be restricted when both of x and y do not match, such as P(−1, a) and P(b, −1). When one of x and y matches with each other, such as P(a, −1), P(b, −1), the interpolation can be performed.

In addition, even if there are available areas on both sides as shown in FIG. 19*d*, the interpolation can be performed when the position of an available area is located on a vertical line.

Figure 20:
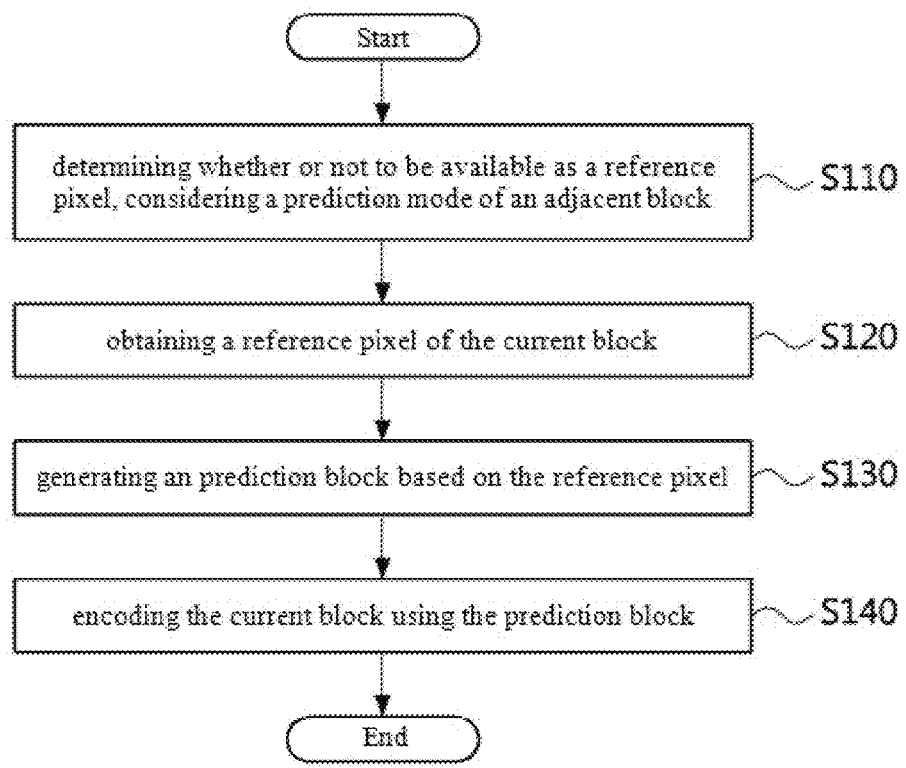
FIG. 20 is a flowchart of an image encoding method according to an embodiment of the present invention.

FIG. 20 is a flowchart of an image encoding method according to an embodiment of the present invention.

Referring to FIG. 20, an image encoding method for performing intra prediction includes determining whether a boundary pixel within the adjacent block is available as a reference pixel of a current block, considering a prediction mode of each of the current block and the adjacent block (Step S110); obtaining a reference pixel of the current block according to the determined result (S120); generating an prediction block through intra prediction based on the obtained reference pixel (S130); and encoding the current block using the generated prediction block (S140).

The description of each step in this case can be referred to FIG. 15 to FIG. 18c, and thus a detailed description thereof will be omitted.

An image decoding method for performing intra prediction according to an embodiment of the present invention includes steps of receiving a bitstream including data on a prediction mode of the current block and a block adjacent to the current block, extracting data from the bitstream received to confirm a prediction mode of the adjacent block, determining whether a boundary pixel within the adjacent block is available as a reference pixel of the current block in consideration of the prediction mode of the adjacent block, obtaining the reference pixel of the current block depending on the determined result, generating intra-frame predicted prediction block based on the obtained reference pixel, and decoding the current block using the prediction block generated.

Here, the obtaining the reference pixel may obtain the reference pixel constituted by the preset pixel value when the boundary pixel is determined to be unavailable as the reference pixel of the current block.

Here, the determining whether the boundary pixel is available as the reference pixel may indicate whether a preset flag takes into consideration the prediction mode of the adjacent block Here, the determining whether the boundary pixel is available as the reference pixel may determine that the boundary pixel is available as a reference pixel of the current picture when the prediction mode of the adjacent block is intra prediction.

Here, the determining whether the boundary pixel is available as the reference pixel may determine that the boundary pixel is unavailable as a reference pixel of the current picture when the prediction mode of the adjacent block is inter prediction.

Here, the determining whether the boundary pixel is available as the reference pixel may determine whether the boundary pixel is available as a reference pixel of the current picture in consideration of the reference picture of the adjacent block when the prediction mode of the adjacent block is inter prediction.

Here, the reference picture is selected from a list 0 storing data for reference pictures earlier than the current picture and a list 1 storing data for reference pictures later than the current picture, and the current picture may be included in the list 0 or the list 1.

Here, it may be determined that the boundary pixel is available as the reference picture of the current picture, when the reference picture of the adjacent block is the current picture.

Here, it may be determined that the pixel in the adjacent block is unavailable as the reference picture of the current picture when the reference picture of the adjacent block is not the current picture.

Here, it may be determined that the pixel in the adjacent block is available as the reference picture of the current picture, when the reference picture of the adjacent block is an I-picture.

In the image decoding device including one or more processors according to an embodiment of the present invention, one or more processors may receive a bitstream including data on a prediction mode of a current block and a block adjacent to the current block and, confirm the prediction mode of the adjacent block by extracting the data from the received bitstream, determine whether the boundary pixel within the adjacent block is available as the reference pixel of the current block in consideration of the prediction mode of the adjacent block, obtain the reference pixel of the current block based on the determined result, generate intra-frame predicted prediction block based on the obtained reference pixel, and decode the current block using the generated prediction block.

Figure 21:
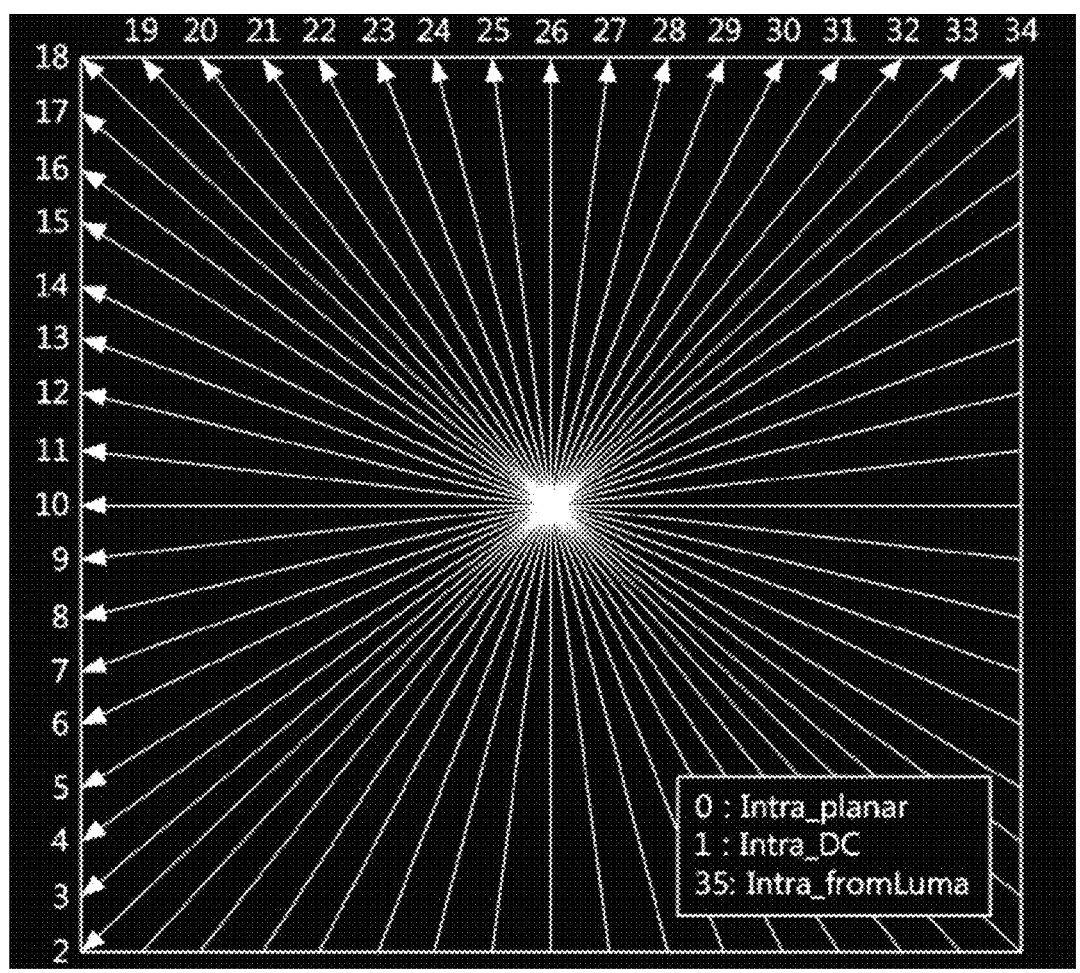
FIG. 21 is an exemplary diagram illustrating an intra prediction mode of HEVC.

FIG. 21 is an exemplary diagram illustrating an intra prediction mode of HEVC.

Referring to FIG. 21, there are a total of 35 prediction modes for a luminance component (Intra_fromLuma, 35). There may be prediction modes having various directions including a planer (Intra_planar, 0) and an average (Intra_DC, 1). For each prediction mode, the direction of each arrow can indicate the direction in which a prediction block is constructed using reference pixels.

Figure 22A:
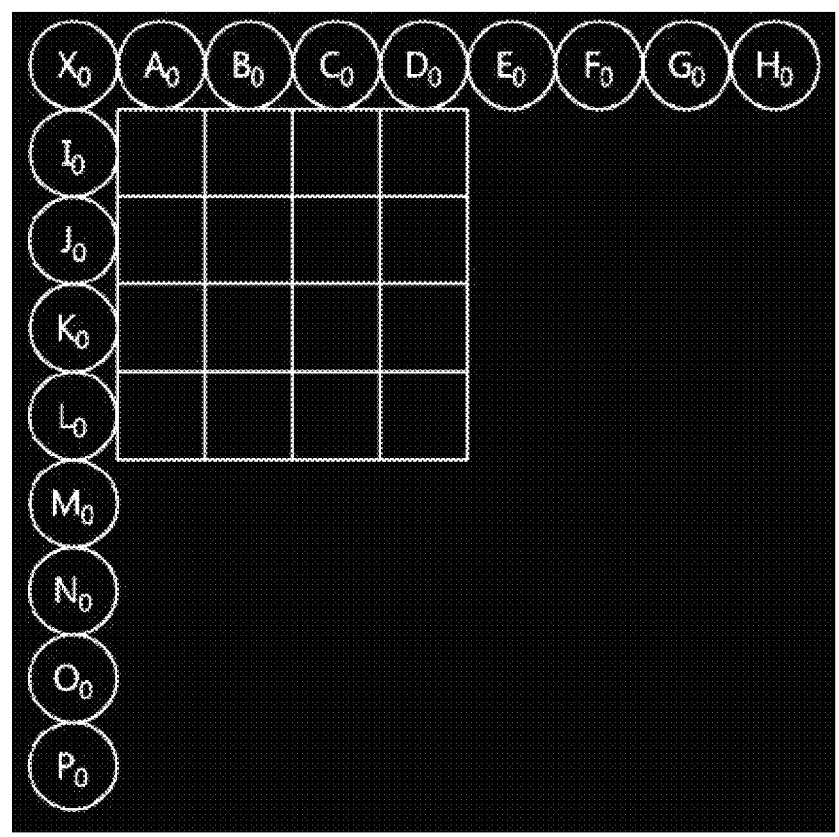
FIG. 22a is an exemplary view illustrating reference pixels used for predicting the current block in a reference pixel construction step.

FIG. 22a is an exemplary diagram for explaining reference pixels used for current block prediction in the reference pixel construction step.

Referring to FIG. 22a, pixels ($A_0$~$P_0$, $X_0$) of blocks on left, upper left, lower left, upper, and upper right based on the current block may be included in the reference pixel candidate group. For example, in the case of an M×N block, pixels of p[0, −1]~p[(2×M) −1, −1], p[−1,0]~p[−1,(2×N)−1], and p[−1, −1] based on an upper left coordinate may be included in the candidate group. Here, p[0, −1] corresponds to $A_0$, p[2×M−1, −1] corresponds to $H_0$, and p[−1, −1] corresponds to $X_0$. In the above example, 2×(M+N)+1 reference pixels may be included in the candidate group, and may be determined depending on at least one factors of a size of block, a type of block, a prediction mode, a prediction method, a slice type, and the like, a combination thereof. For example, some reference pixels may be added to the candidate group or excluded from it depending on the prediction mode. As another example, some reference pixels may be added to the candidate group or excluded therefrom depending on the prediction scheme.

Figure 22B:
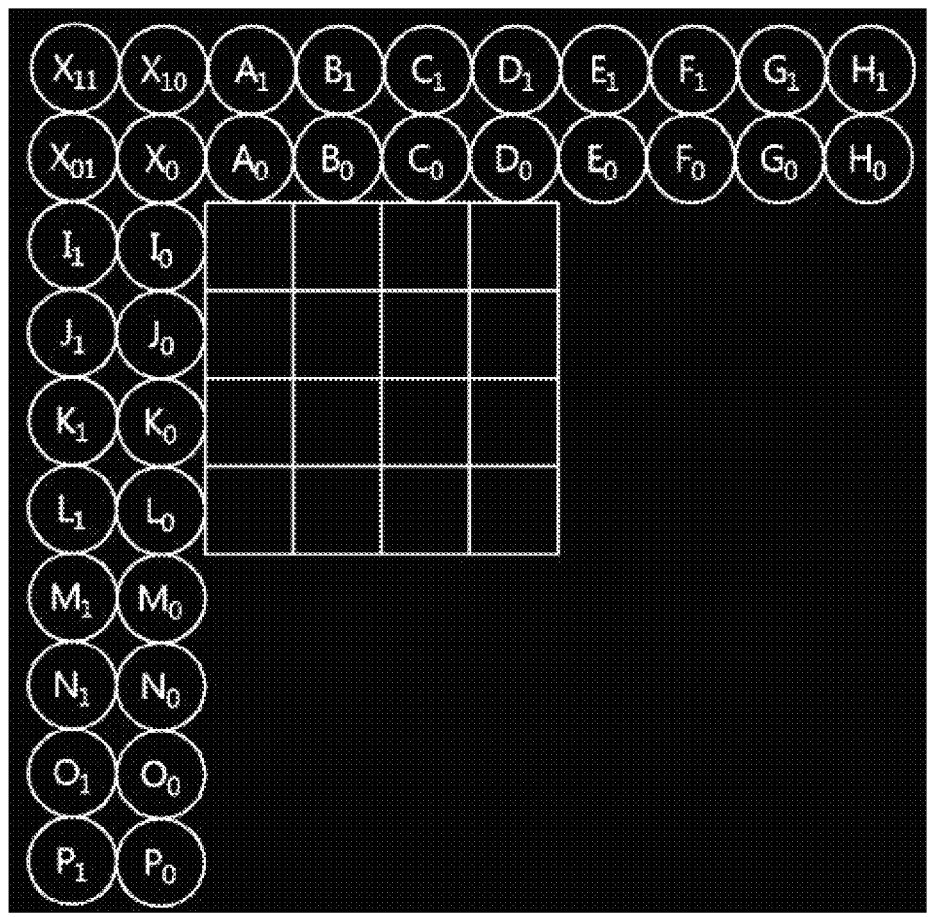
FIG. 22b is an exemplary view illustrating that additional pixels of an adjacent block are included in a reference pixel candidate group.

FIG. 22b is an exemplary view for explaining that additional pixels of an adjacent block are included in a reference pixel candidate group.

Referring to FIG. 22b, for example, in the case of an M×N block, pixels of p[−1, −2]~p[(2×M)−1, −2], p[−2, −1]~p[−2, (2×N)−1], and p[−1, −1] based on an upper left coordinate of the block can be included in a new reference pixel candidate group. The pixels may be classified into the first reference pixel line (A0~P0, X0) and an additional reference pixel line to represent the difference from the existing reference pixel, and other additional reference pixel line may be included as the new reference pixel candidate group. The order of the reference pixel lines may be determined based on the distance between the reference pixel and the current block.

The reference pixel line may be collectively applied to the pixels of blocks on left, upper left, lower left, upper and upper right, and may be constructed by one adjacent block or two or more adjacent block units. For example, when constructing a pixel line with respect to the pixels of block on left, the pixel of the corresponding block can be constructed on the reference pixel line L. When constructing a pixel line with respect to blocks on upper left, upper and upper right, pixels of the corresponding blocks may be constructed in the reference pixel line U. This example will be described based on the reference pixel line that is collectively applied to adjacent blocks.

Whether or not to add an additional reference pixel line other than the existing reference pixel line may be determined depending on one or more factors of a block, a type of a block, a prediction mode, and a prediction method, or a combination thereof. Further, whether or not an existing reference pixel line is used and whether an additional reference pixel line is used may have various combinations of constructions. For example, the existing reference pixel line is always used, whether the additional pixel line is used or not may be determined, and whether each of the existing reference pixel line is used or not and the additional pixel line is used or not may be determined respectively. In addition, when there are more than two additional pixel lines, various combinations are possible with respect to the above settings. Also, when the reference pixel line is not collectively but partially applied to the adjacent blocks, it is possible to have various combinations related to the above settings.

In addition, an allowable range of the reference pixel line may be set. That is, information (maximum value) about how much the reference pixel line is to be added can be set in the encoder/decoder, and this may be determined depending on one factor of a type of the current or adjacent block, a size of the current or adjacent block, and the like, or a combination thereof. If an order of the reference pixel line is a small number, a priority may be high, but the assumption thereon may not lead to the binarization process of the related information. Index information or identifier information of the reference pixel line may be generated under predetermined conditions. The reference pixel line index or identifier information may be binarized by various methods such as unary binarization, cutting unary binarization, and the like, and the binarization may be determined according to allowable maximum value information in the reference pixel line.

Various combinations are possible with respect to the above settings when the adjacent block is collectively applied to the reference pixel line construction or otherwise. The information related to the reference pixel line may be transmitted in units of a sequence, a picture, a slice, a block, and the like. The encoded/decoded information may be included in prediction mode information in a prediction mode encoding step.

After the reference pixel candidate group is constructed through the above process, the process of checking whether or not to use the reference pixel of the adjacent block is performed. Whether or not to use the reference pixel may be determined by at least one of factors such as adjacent block position, encoding mode of adjacent block, reference picture of adjacent block, position of current block in division block, and boundary characteristic of current block and adjacent block, or a combination thereof. The prediction of the current block can be performed using the pixels determined to be available through the process and the replaced pixel values of the pixel position determined to be unavailable through the process among the reference pixel candidate group.

In case of predicting in a mode having directionality among the intra prediction modes, the reference pixels may be generated in a decimal unit by using various interpolation methods on the reference pixel of an integer pixel. When the reference pixel line is added as in the above example, the reference pixels of two or more reference pixel lines may be supported in the interpolation process. Not only 1D-filtering that interpolates fractional pixels between the existing two pixels, but also 2D-filtering that interpolates fractional pixels between the four pixels may also be applied.

In the reference pixel filtering step, a process of applying the filtering to the reference pixels obtained from the reference pixel construction step will be described according to the case of having the wider reference pixel.

FIGS. 23a, 23b, 24a, and 24b are diagrams illustrating various mode directions, for the current block having a wider reference pixel obtainable in the reference pixel construction step. This is for the purpose of explaining the directions of the various prediction modes described above and is not limited thereto. The explanation may be made under the assumption that the first reference pixel line (A0~P0, X0) and the second reference pixel line (A1~P1, X0, X10, X01, X11) are constructed as reference pixel candidate groups.

When only the first reference pixel line is included in the reference pixel candidate group, the filtering can be applied to the pixels included in the reference pixel candidate group, that is, the most adjacent pixels of the current block. When an additional reference pixel line is included in the reference pixel candidate group, filtering considering the additional reference pixels may be applied.

Figure 23A:
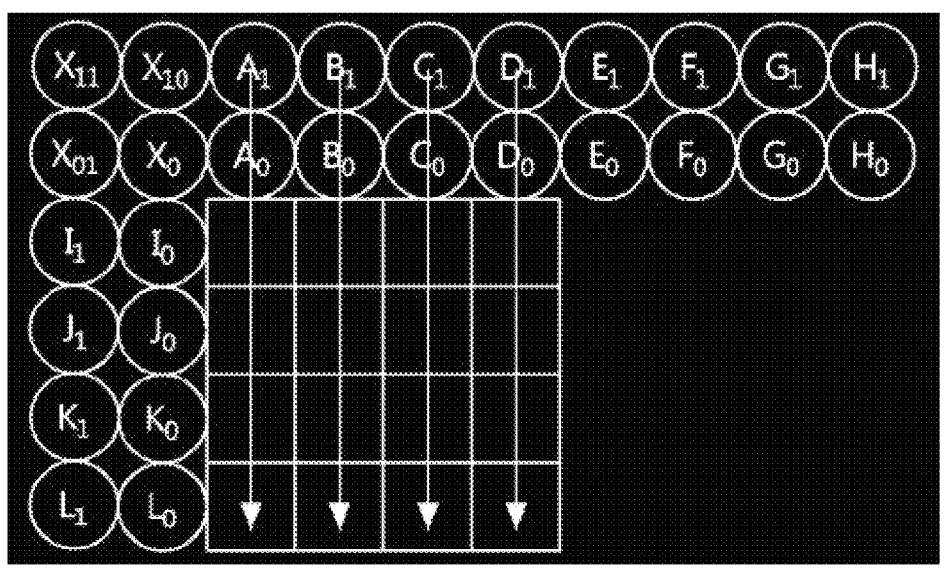
FIGS. 23a, 23b, 24a, and 24b are exemplary views illustrating various mode directions for the current block having a wider reference pixel capable of being obtained in a reference pixel construction step.

FIG. 23a illustrates an exemplary view of a mode (vertical) in which the reference pixels of the second reference pixel line, more specifically, the reference pixels A1, B1, C1, and D1 located on the second row from a top of the current block are referenced to cause pixels generated by applying filtering to the reference pixels to be applied to the prediction, and a mode in which the reference pixels of the first reference pixel line, specifically, the reference pixels A0, B0, C0, and D0 located on the first row cause pixels generated by applying filtering to the reference pixels to be applied to the prediction.

Figure 23B:
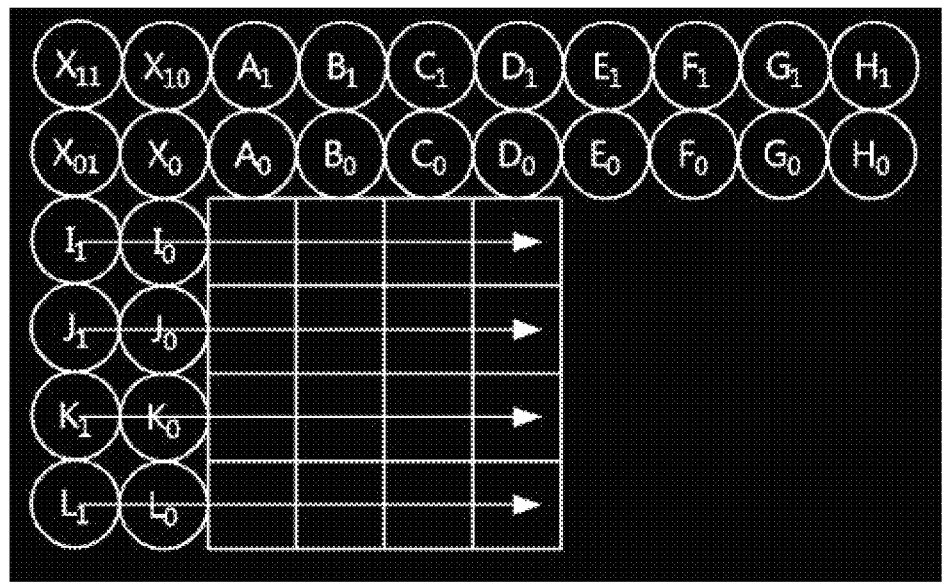

FIG. 23b illustrates an exemplary view of a mode (horizontal) in which the reference pixels of the second reference pixel line, specifically, the reference pixels I1, J1, K1, and L1 located on the second row from the left of the current block are referenced to cause pixels generated by applying the generated reference pixel to be applied to the prediction, and a mode in which reference pixels of the first reference pixel line, specifically, reference pixels I0, J0, K0, and L0 causes pixels generated by applying filtering to the reference pixels to be applied to a prediction.

Figure 24A:
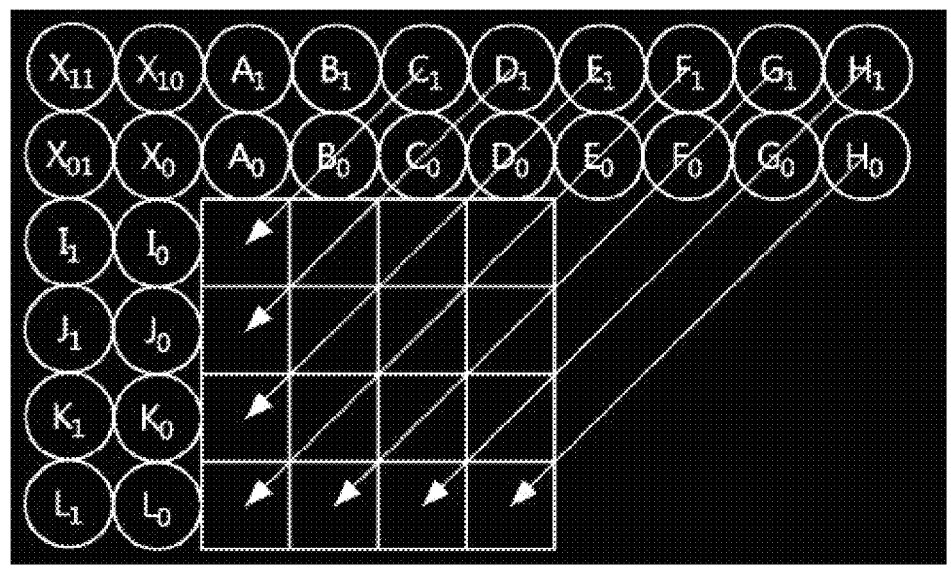

FIG. 24a illustrates an exemplary view of a mode (directional mode leading to the lower left end) in which the reference pixels of the second reference pixel line, specifically, reference pixels C1, D1, E1, F1, G1, and H1 located on the second row from the upper right end of the current block are referenced to cause the pixels generated by applying filtering to the reference pixels to be applied to the prediction, and a mode in which the reference pixels of the first reference pixel line, more specifically, the reference pixels B0, C0, D0, E0, F0, G0, and H0 located on the first row of the upper right end of the current block are also referenced to cause the pixels generated by applying filtering to the reference pixels to be applied to the prediction.

Figure 24B:
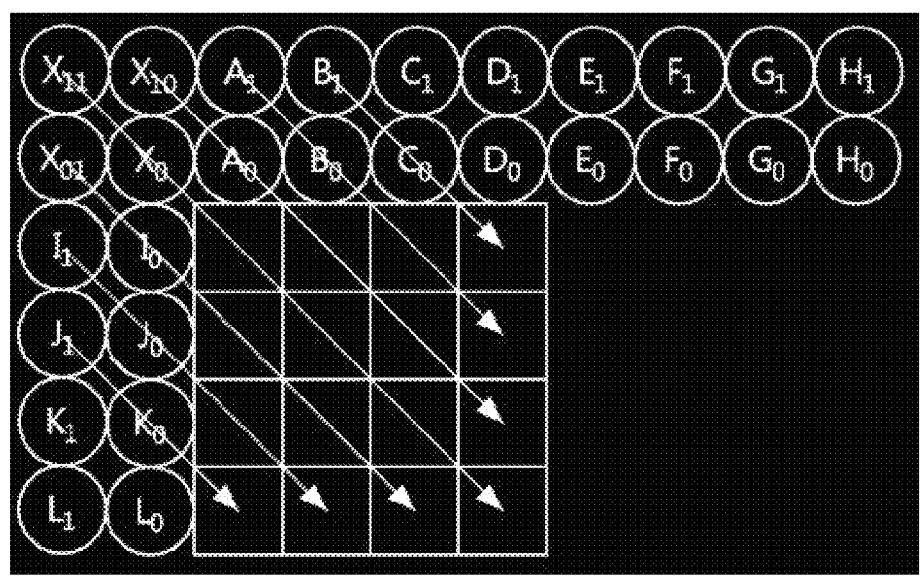

FIG. 24b illustrates an exemplary view of a mode (directional mode leading to the lower right end) in which the reference pixels of the second reference pixel line, specifically, reference pixels J1, I1, X01, X11, X10, A1, and B1 are referenced to cause pixels generated by applying the filtering to the reference pixels to be applied to the prediction, and a mode in which the reference pixels of the first reference pixel line, specifically, the reference pixels (K0, J0, I0, X0, A0, B0, and C0 located at the upper left corner of the current block cause pixels generated by applying the filtering to the reference pixels to be applied to the prediction.

When filtering is applied to the reference pixels of the first reference pixel line, adaptive filtering can be performed according to the mode of the current block. When the reference pixel of the second reference pixel line is also applied to filtering, not only the adaptive filtering is performed according to the mode of the current block, but the reference pixel applied to the filtering may also be adaptive. That is, the filtering on the adjacent pixels of the current block may be independent of the prediction mode direction, and the pixels on the directional line of the mode as shown in FIGS. 22a, 22b, 23a, and 23b can be applied to filtering when the reference pixels of the second reference pixel line are also included in the filtering process.

In the prediction block generation step, the process of applying the filtering to the reference pixels obtained from the reference pixel construction step will be described according to the case of having the wider reference pixels.

In the case of the directional prediction method having the first reference pixel line as a reference pixel candidate group, the most adjacent reference pixel can be used for generating the prediction block. If an additional reference pixel line other than the first reference pixel line is supported, a reference pixel used for generating the prediction block generation can be determined. For example, according to a prediction mode, the prediction block may be generated as the first reference pixel, the prediction block may be generated as the second reference pixel, and the prediction block may be generated as prediction pixels of the first reference pixel line and the second reference pixel line.

Hereinafter, the prediction mode encoding step will be described in more detail.

In this case, following examples will be described in a HEVC standard, and the related settings (the number of prediction modes, a prediction mode direction, and the like) are not limited to the examples described below. Since there are 35 modes in the case of the HEVC, it is necessary to encode efficient mode information after determining optimal mode. In general, when the image is divided into several blocks, adjacent blocks often have similar characteristics. Therefore, when the mode of the current block is encoded, the adjacent block information is utilized. The HEVC encodes the prediction mode of the current block based on the prediction mode of the left and top blocks.

Figure 25:
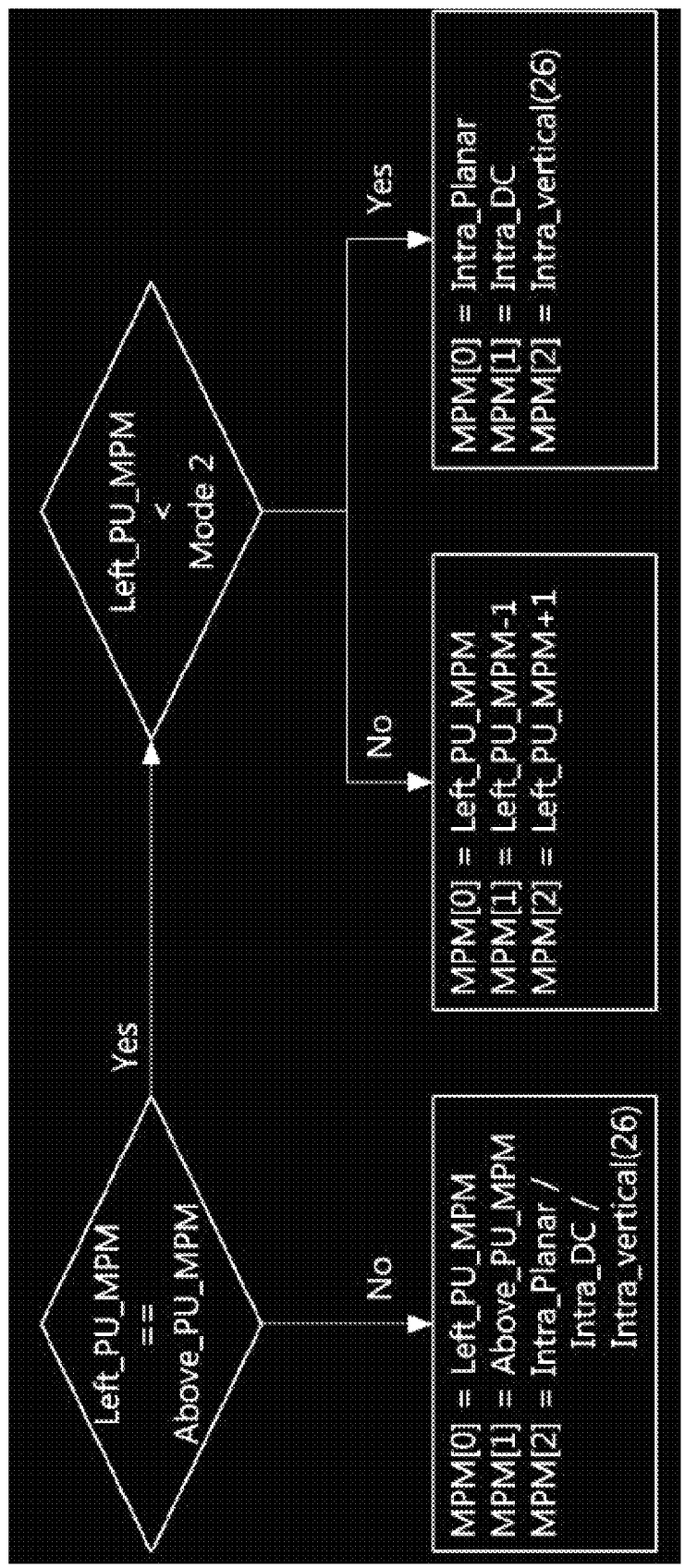
FIG. 25 is a flowchart illustrating processes in which the most probable mode is determined for a general current prediction unit (or prediction block).

FIG. 25 is a flowchart illustrating an optimal mode determination process for a general current prediction unit (or prediction block). Herein, the most probable mode (MPM) is a prediction mode having a high possibility of being a prediction mode of the current prediction unit. Since it is likely that a prediction unit around the current prediction unit has a mode similar to the mode of the current prediction unit, the mode can be selected from the modes of peripheral blocks.

Referring to FIG. 25, the prediction mode of the prediction unit on the left side is referred to as left_PU_MPM, and the prediction mode of the prediction unit on the upper side is expressed as Above_PU_MPM, based on the current prediction unit (PU). Specifically, when the prediction mode of the left prediction unit is different from the prediction mode of the upper prediction unit, the first most probable mode MPM[0] is determined as the prediction mode of the left prediction unit, the second most probable mode MPM[1] is determined as the prediction mode of the upper prediction unit, and the third most probable mode MPM[2] is determined as one of the planar, DC, and vertical modes without overlapping. On the other hand, when the prediction mode of the left prediction unit is the same as the prediction mode of the upper prediction unit, it is determined whether the same prediction mode is smaller than the mode 2. If the prediction mode is smaller than the mode 2, planar, DC, and vertical mode are set as the most probable mode, and when the prediction mode is larger or the same, the prediction mode of the left prediction unit, one smaller mode than it, and one larger mode than it may be set as the first, the second, and the third most probable modes (MPM) respectively.

In summary, as shown in FIG. 25, modes having a high possibility as a prediction mode of the current block may be classified into the most probable mode (MPM) set or group and encoded. When the current block has the same characteristics as the adjacent block so that a case occurs in which the prediction mode of the adjacent block is the same as or similar to the prediction mode of the current block, the probability of selecting one mode of the MPM group is high so that short bit may be assigned, thereby performing efficient encoding. If the case does not occur, the prediction mode of the current block can be encoded by binarizing the remaining modes except for the most probable mode (MPM) among all the modes and selecting one of them. In case of HEVC, the number of modes in the group of optimal mode (MPM) is three so that the encoding is performed using one or two bits. If it is not selected in the most probable mode (MPM) group, the encoding is performed using 5 bits of fixed length. The embodiment according to the present invention does not limit the mode to be used as the most probable mode (MPM) to the left and upper prediction units, and may utilize the mode information from one or more blocks of blocks in the left, upper left, and upper, upper right, and lower left. Also, when one of these is divided into two or more blocks, it is possible to set a priority on information of which block among the divided blocks is referenced. For example, when the current block is 2N×2N and two divided blocks of N×N are located in left, then a mode of an upper N×N may be used or a mode of a lower N×N may be used according to the set rule.

The number of modes selected by the most probable mode (MPM) can also be preset in the encoding/decoding device, or transmitted in units of sequences, pictures, slices, and the like. In addition, the binarization for the number of modes may be expressed by using various binarization methods such as a fixed length or variable lengths. In addition, for the binarization of modes not classified as the most probable mode (MPM), various binarization methods may be used. Further, for the purpose of efficient binarization of modes not classified as the most probable mode (MPM), MPM candidate group may be set. For example, M−$2^N$ of M modes can be binarized as the most probable mode (MPM) group, and 2N modes can be binarized as candidate groups that are not classified as the most probable mode (MPM). For example, if there are 19 modes, N can be selected as one of 1, 2, 3, and 4, and the modes in the most probable mode (MPM) group may be represented as variable lengths (three if N is four), and candidate group not classified as the most probable mode (MPM) can be expressed as a fixed length (4 bits).

Hereinafter, a specific example for determining the most probable mode (MPM) for a current prediction unit (or block) according to an embodiment of the present invention will be described. For convenience of explanation, it is assumed that a block having the same block type and size as the current block is located in an adjacent block. It is also assumed that the mode of the block determined to be unavailable according to the availability of reference pixels of the adjacent block is DC.

First, in order to obtain the mode information of the adjacent block, it is necessary to check availability of the sub-boundary pixel of the corresponding block as a reference pixel. For example, it is necessary to check whether the mode is located at a boundary line of a picture or slice, or whether the encoding mode is the same. In this example, whatever the reference picture is, if the encoding mode is the inter prediction mode, the reference pixel of the corresponding block is set as unavailable. (Left and upper modes are used as MPM as in HEVC) When the left block generates a prediction block in the current picture through block matching and is encoded with the inter prediction method, the reference pixel of the corresponding block can be determined as unavailable. When the upper block is encoded with intra prediction, the mode (Vertical) of the corresponding block can be included in the MPM candidate. Since the reference pixel of the left block is unavailable, the mode of the corresponding block can be set as DC and included in the MPM candidate.

Available reference pixels and unavailable reference pixels may be classified through the process of checking the availability of reference pixels for adjacent blocks. The reference pixel determined to be unavailable may be filled with the predefined value (for example, a middle value of a range of pixel values of bit depth) or a substitute value derived from a reference pixel determined to be available. The prediction block can be generated by using the pixel value of the reference pixel available for intra prediction and the substitute value of the unavailable reference pixel.

Figure 26:
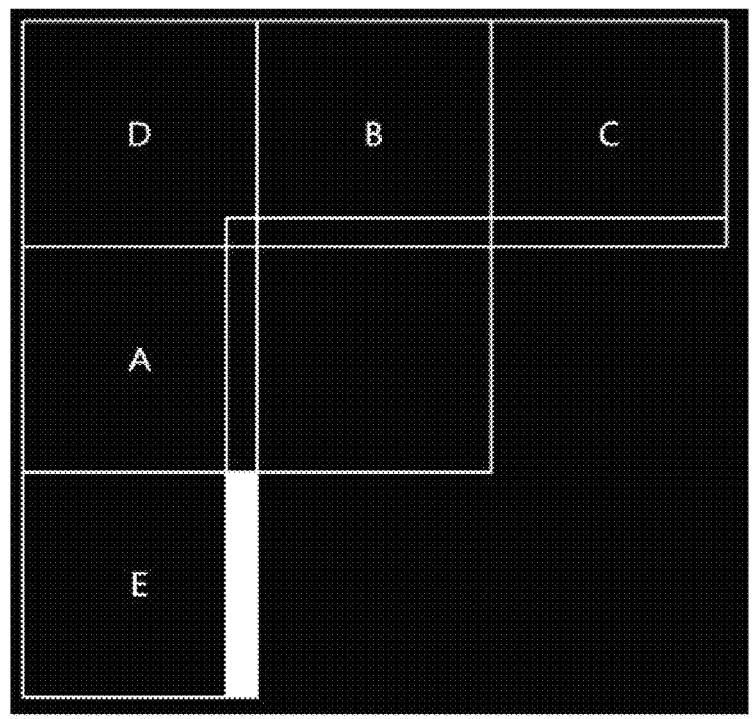
FIG. 26 is an exemplary view of determining a prediction mode for the current prediction unit (or block).

FIG. 26 is an exemplary view for determining a prediction mode for the current prediction unit (or block).

Referring to FIG. 26, the available reference pixels may be displayed in black, while the reference pixels that are unavailable may be displayed in colorless. The unavailable reference pixel may be replaced by a predefined value or a value derived from the available pixel. In FIG. 26, the pixel values of the unavailable reference pixels of the blocks A, B, C, and D may be filled with the value obtained by copying the pixel value in the upper right of the block E. That is, all the reference pixels of blocks A, B, C, and D may be the same value as the pixel in the upper right of block E. For example, all the modes for generating a prediction block using blocks B and C as reference pixels can construct all prediction pixels of the prediction block as the same pixel value (pixel value in the upper right of block E).

Here, since the block A or the block B is determined to be unavailable, the blocks may have DC mode as previously assumed. In this case, since the prediction mode of the block A is set as DC and the mode of the block B is also set as DC, it is possible to reduce a probability that the modes determined as the most probable mode (MPM) (two DCs occur) is the prediction mode of the current block. Therefore, the mode may be used by replacing with the prediction mode of the available block adjacent to the current block.

Referring to FIG. 26, the mode of the block A may be substituted for the prediction mode of block E. By using the DC which is a prediction mode of a block E and a prediction mode of a block B, it is possible to increase a probability that the prediction mode of the current block is selected as one mode of MPM. It is possible to set as MPM[0]=planar mode, MPM[1]=DC mode, and MPM[2]=vertical mode according to the flowchart of FIG. 25 which is a general method. Assuming that pixels in right boundary of the block E (black units in the figure) are available and the pixel value at the top of the boundary pixels is copied to the boundary pixels of the above unavailable block to perform intra prediction, all the same prediction blocks are generated from planar, DC, and vertical, whereby mode redundancy may occur. Therefore, as described above, using the prediction mode of the substitute block may have a more advantageous effect.

Referring to FIG. 26 again, if a constrained intra prediction is performed, the upper right pixel value of boundary pixels of block E shown black in FIG. 26 is copy to the boundary pixels of block A to perform intra prediction. It is also assumed that the mode of block E is not DC. Under this assumption, if the prediction block is generated with modes of vertical, horizontal, group 2, group 3, and group 4 (referring FIG. 27 described below for each prediction mode group) including planar and DC, it is possible to generate the prediction block in which a pixel value of all the prediction blocks generated with the prediction mode is one value (upper right pixel value of the block E). This may be because all are copied to the same pixel value. Accordingly, referring to the flowchart of FIG. 25 when the prediction mode of the block E is selected by replacing the block A and encoded according to the most probable mode (MPM), the candidate group may be classified into the left_PU_MPM as the prediction mode of the block E, and the Above_PU_MPM as the prediction mode (that, is, DC) of the block B, MPM[0]=prediction mode of the block E, MPM [1]=DC, MPM [2]=planar or vertical (determined according to the mode of the block E) since Left_PU_MPM and Above_PU_MPM are different from each other.

When the prediction mode of block E is one of planar, DC, vertical, horizontal, and groups 2 to 4, MPM [0] is one of Planar, DC, vertical, horizontal, and groups 2 to 4, MPM [1] is DC, and MPM[2] is planar if the mode of the block E is not planar and vertical if it is planar. However, when the prediction block is generated with the modes of planar, DC, vertical, horizontal, and groups 2, 3, and 4 as described above, the same prediction block (if the reference pixel is constructed with a pixel value of 100, all the pixel values are 100 whatever mode is used to generate the prediction block) are generated so that the MPM is managed with overlapping mode.

Therefore, when the prediction mode of the block E is one of planar, DC, vertical, horizontal, and groups 2 to 4 (group, 2, 3, 4), MPM[0] is determined to be one of planar, DC, vertical, horizontal, groups 2 to 4, MPM [1] is determined to be one of modes belonging to Group 1, and MPM [2] is determined to be one of blocks not overlapped with MPM [1] belonging to group 1. This is because the prediction block may be slightly different (at least one pixel) for each mode unless the reference pixels at the boundary of the block E are all composed of the same pixel values. Here, the encoding may be performed via binarization with the existing fixed 5 bits for the prediction mode not selected as the most probable mode (MPM) or the via binarization only for the modes in group 1. For example, since there are 8 modes of modes 2 through 9 (group 1) (reduced to 6 by subtracting 2 included in the MPM), the encoding may be performed via various binarization methods with bits shorter than the fixed 5 bits.

When the mode of the block E is one of the modes of group 1, MPM[0] is the prediction mode of the block E, MPM[1] is DC, and MPM[2] is one mode not overlapped with the prediction mode of the block E of group 1 (from the group 1 since the prediction block generated by DC or the prediction block generated by planar, vertical, horizontal, groups 2, 3, and 4 are the same). In this case, the encoding may be performed by binarization as described above.

Figure 27:
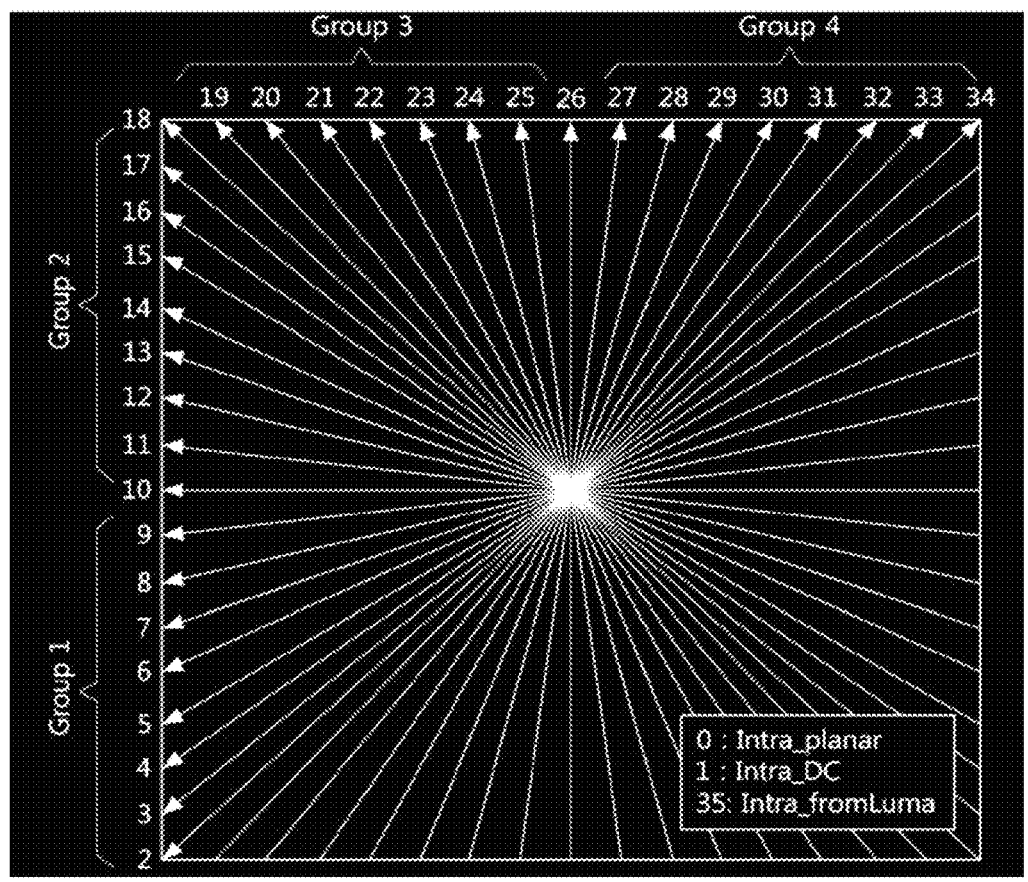
FIG. 27 is an exemplary view of grouping prediction modes

FIG. 27 is a diagram showing an example of grouping for the prediction mode.

Referring to FIG. 27, it may be assumed that the prediction mode is classified into a planar, a DC, a vertical, a horizontal, a group 1, a group 2, a group 3, and a group 4. A variety of settings are allowed to group the prediction modes into 2 or more groups, and groupings below are classified under settings with similar directionality.

In this case, the prediction modes 2 to 9 are for the group 1, the prediction modes 11 to 17 are for the group 2, the prediction modes 18 to 25 are for the group 3, and prediction modes 27 to 34 are for the group 4. Further, the prediction mode 0 may mean planar, the prediction mode 1 may mean DC, the prediction mode 10 may mean horizontal, and the prediction mode 26 may mean vertical.

Under a premise of such prediction mode, the embodiment will be further described hereinafter.

FIGS. 28 to 32 are exemplary views of a case in which a MPM is constructed for a prediction mode using adjacent blocks other than the upper and left blocks.

Figure 28:
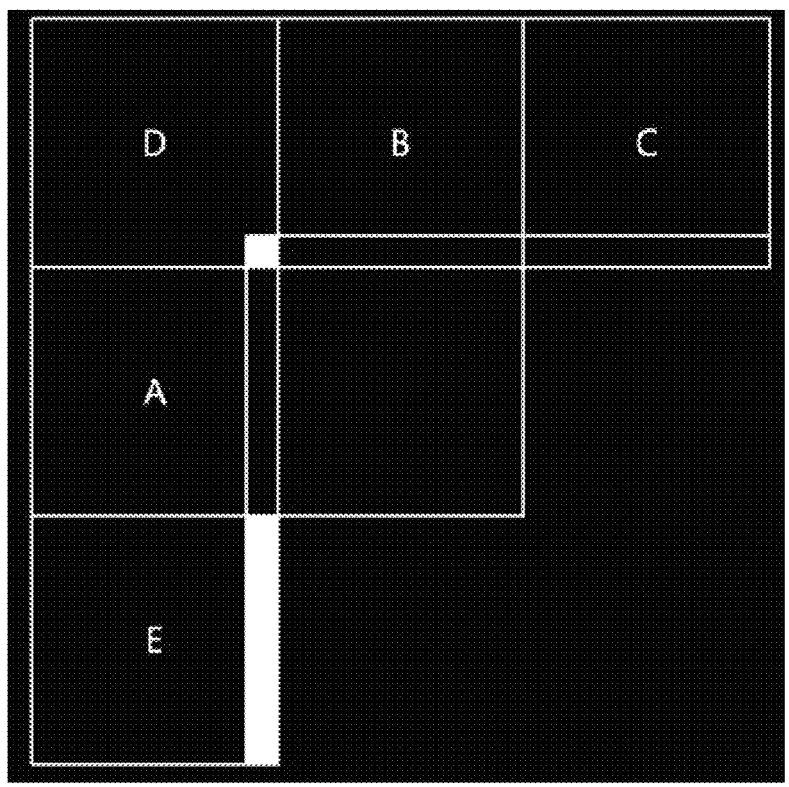
FIGS. 28 to 32 are exemplary views of a case in which a MPM is constructed for a prediction mode using adjacent blocks other than the upper and left blocks.

Referring to FIG. 28, the prediction mode of block E may be used by substituting block A, and the prediction mode of block D may be used by substituting block B.

Figure 29:
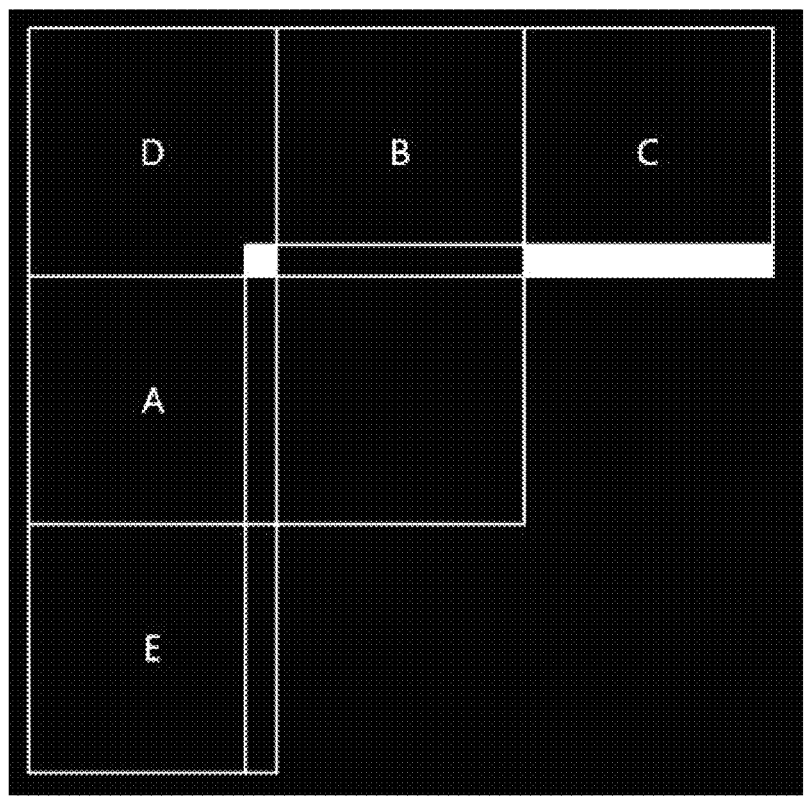

Referring to FIG. 29, the prediction mode of block D may be used by substituting block A, and the prediction mode of block C may be used by substituting block B.

Figure 30:
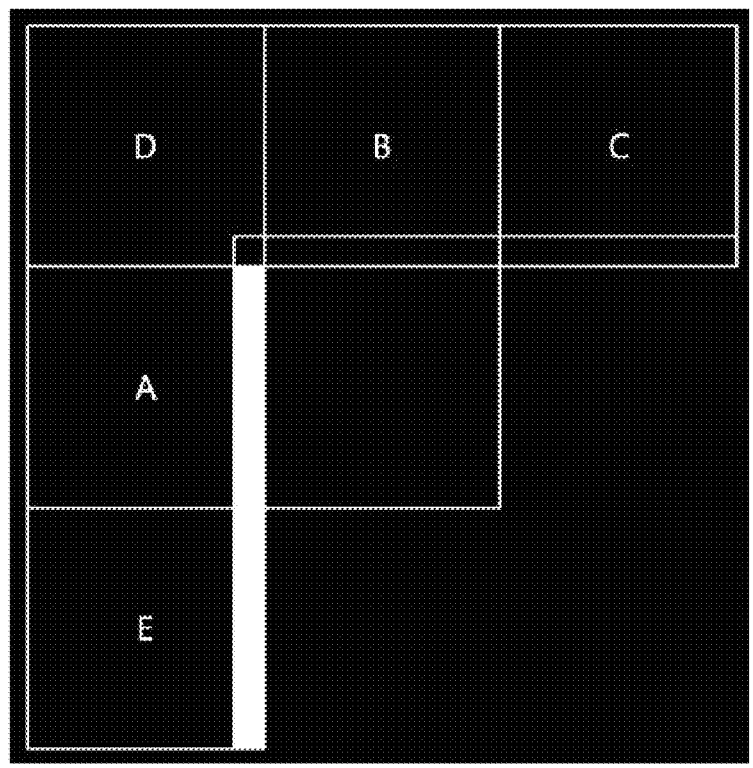

Referring to FIG. 30, the prediction mode of the block A is used as it is, and the prediction mode of block E may be used by substituting block B.

Figure 31:
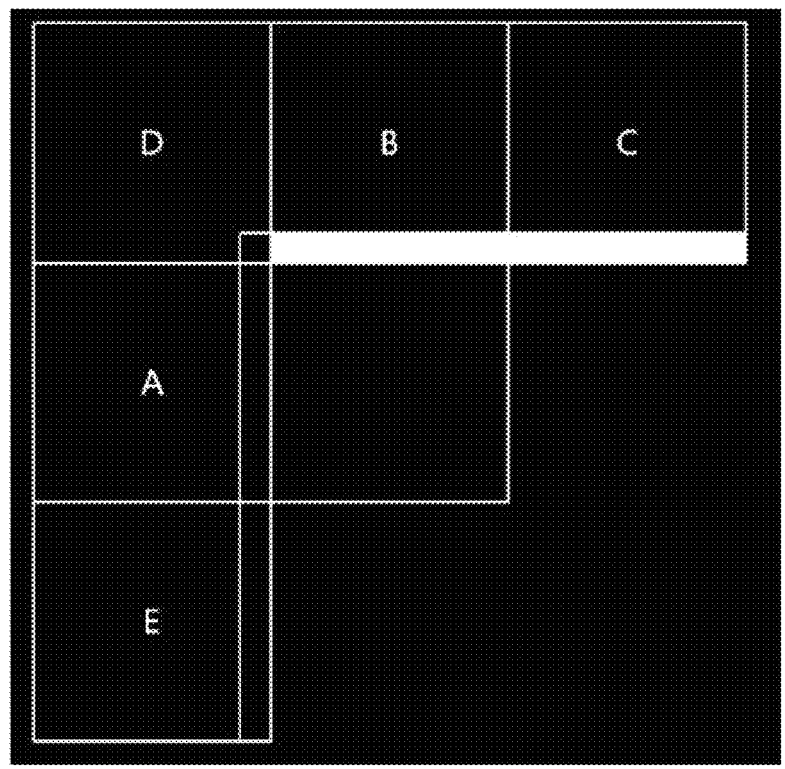

Referring to FIG. 31, the prediction mode of the block B is used as it is, and the prediction mode of block C may be used by substituting block B.

Figure 32:
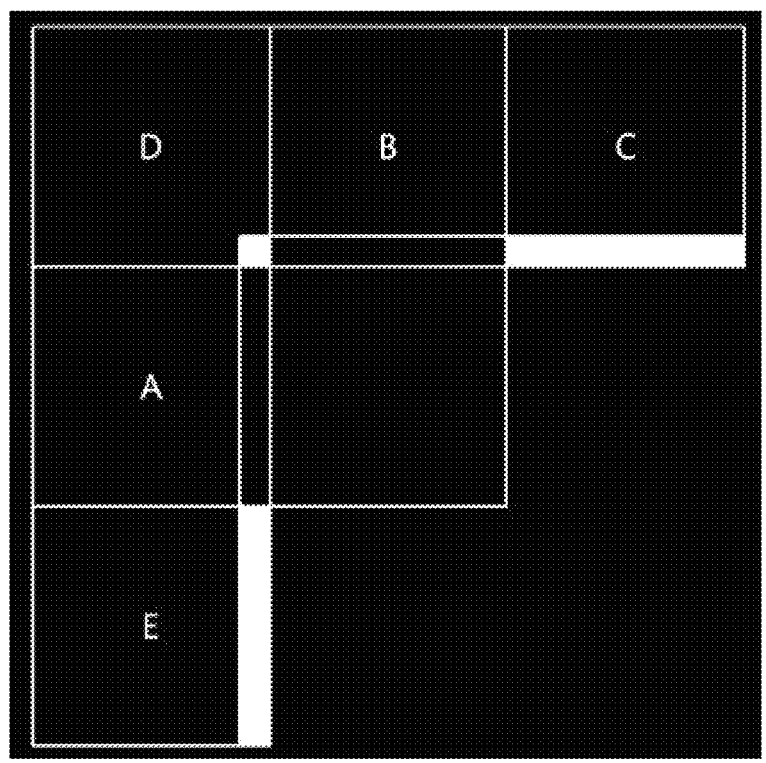

Referring to FIG. 32, a block A can be replaced with a prediction mode of block E, a block B with a prediction mode of block D, a block A with a prediction mode of block D, and a block B with a prediction mode of block C, and a block A can be replaced with the prediction mode of block E, and block B can be replaced with the prediction mode of block C. That is, the prediction mode of the available blocks can be replaced by various combinations.

The above examples are described as an example when a block is not available due to constrained intra prediction, but it can also be applied when all adjacent blocks are available. If the reference pixels of adjacent blocks are similar or identical (for example, in the case of a computer capture screen), the encoding is also possible by varying candidate group settings of the most probable mode (MPM). This case will be described below.

Figure 33:
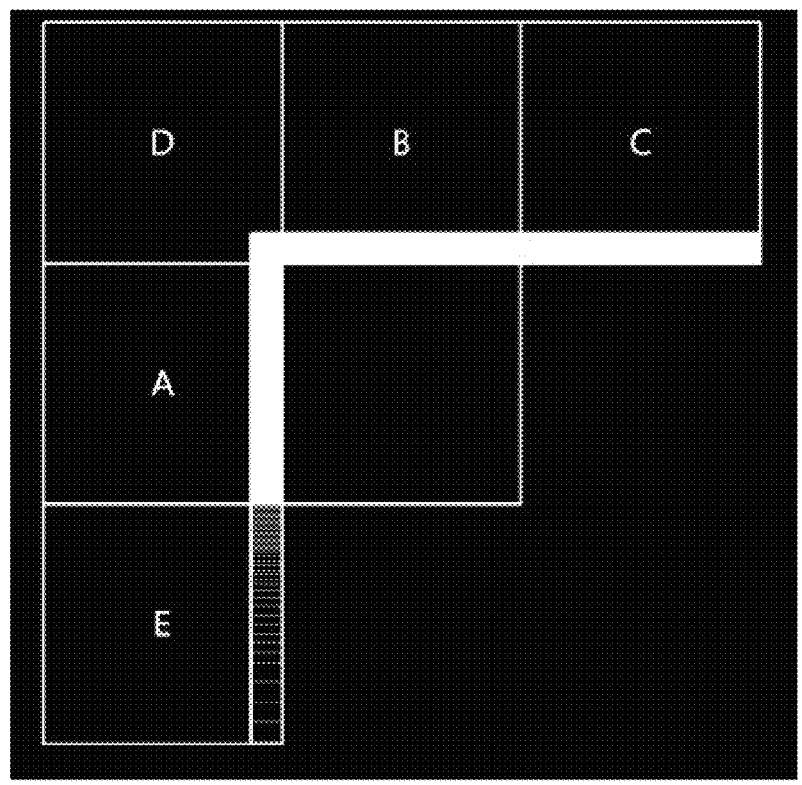
FIG. 33 is an exemplary view of a case in which the most probable mode (MPM) is constructed as a substitute block when both the current block and adjacent blocks are available.

FIG. 33 is an exemplary view of a case in which the most probable mode (MPM) is constructed as a substitute block when both the current block and the adjacent blocks are available.

Referring to FIG. 33, black pixels are used as reference pixels, in which pixels at the boundary with blocks A, B, C, and D have no change in pixel values or similar values to pixel values, and pixels at the boundary with block E are changed.

In this state, even if any prediction modes in Groups 2 to 4 shown in FIG. 27 are used, the same or similar prediction block is generated so that redundancy of the most probable mode (MPM) candidate group may occur.

First, it is possible to classify blocks whose variance $\sigma_A$, $\sigma_B$, $\sigma_C$, $\sigma_D$, and $\sigma_E$ for reference pixel vales of each block is smaller than the threshold (Th). Assuming that the variances $\sigma_A$, $\sigma_B$, $\sigma_C$, and $\sigma_D$ are smaller than the boundary value and the variance $\sigma_E$ of block E is larger than the boundary value in FIG. 33, the redundancy of the most probable mode (MPM) candidate group may occur when the variance of two or more consecutive blocks is smaller than the boundary value. For example, if the reference pixels of block B and block C have the same or similar value, group 4 that are prediction modes generated using only block B and block C and the prediction block generated by vertical mode may be regarded as having the same or similar values. Therefore, group 4 and vertical mode can perform a redundancy removal process. If the reference pixels of block A and block C are the same or similar, a prediction mode generated by using only block A and block C does not exist so that there is no need to consider.

First, since the prediction blocks generated from horizontal, group 2, group 3, and vertical that are prediction modes generated using the reference pixels of blocks A, D, and B have the same and similar value, the redundancy may be determined to occur.

Since it is assumed that the prediction blocks generated from vertical and group 4 that are prediction modes generated using the reference pixels of blocks B and C have the same and similar value, the redundancy may be determined to occur in the modes.

Since it is assumed that the prediction blocks generated from horizontal, group 2, group 3, vertical, group 4, group 4, and DC planar that are prediction modes generated using reference pixels of blocks A, D, B, C have the same prediction block, the redundancy may be determined to occur in the modes. That is, it can be confirmed that the variance of consecutive blocks is calculated ($\sigma_{ADB}$, $\sigma_{BC}$, $\sigma_{ADBC}$), which is smaller than the boundary value.

In the case of FIG. 33, it is confirmed that variances of A, D, B and C are smaller than the boundary value and most probable redundancy is caused. Then, the MPM candidate group can be reset by removing the redundancy as described above. Variance is mentioned for illustration of the above example, but is not limited thereto.

When the prediction mode of the block A is different from the prediction mode of the block B, referring to FIG. 25, MPM[0]=prediction mode of block A, MPM[1]=prediction mode of block B, MPM[2]=one of planar, DC, or vertical (according to the prediction mode of block A and the prediction mode of block B). If one of two blocks is in group 1, and the other is in other cases, the prediction mode of block A is one of horizontal, group 2, group 3, vertical, group 4, DC, planar classified to generated the same prediction block through comparison of the above variance values, and the prediction mode of block B may be constructed not to overlap with the prediction mode of block B among MPM[0]=prediction mode of block A, MPM[1]=prediction mode of block B, and MPM[2]=mode of group 1 when the mode is one of modes of the group 1. If both modes belong to group 1, MPM[0]=prediction mode of block A, MPM[1]=prediction mode of block B, and MPM[2]=planar. If both modes do not belong to group 1, MPM[0]=prediction mode of block A, MPM[1]=one of the modes of group 1, MPM[2]=one of modes of group 1 that is overlap with MPM[1]. If the prediction mode of block A and the prediction mode of block B are the same and the two modes are larger than the mode 2 (not DC and planar) and go out of the center of FIG. 25, it may be configured to be one of MPM[0]=prediction mode of block A and MPM[1]=prediction mode of group 1 and one of the modes that are not overlapped with MPM[2]=MPM[1] if both modes are horizontal, group 2, 3, and vertical. Otherwise, MPM[0]=prediction mode of block A, MPM[1]=prediction mode a of block A, and MPM[2]=prediction mode+1 of block A may be configured. If two modes are the same and two modes are less than mode 2 (one of DC and planar), MPM[0]=planar, MPM[1]=one of the modes of group 1, MPM [2] is one of a modes of group 1 that does not overlap with MPM [1].

Figure 34:
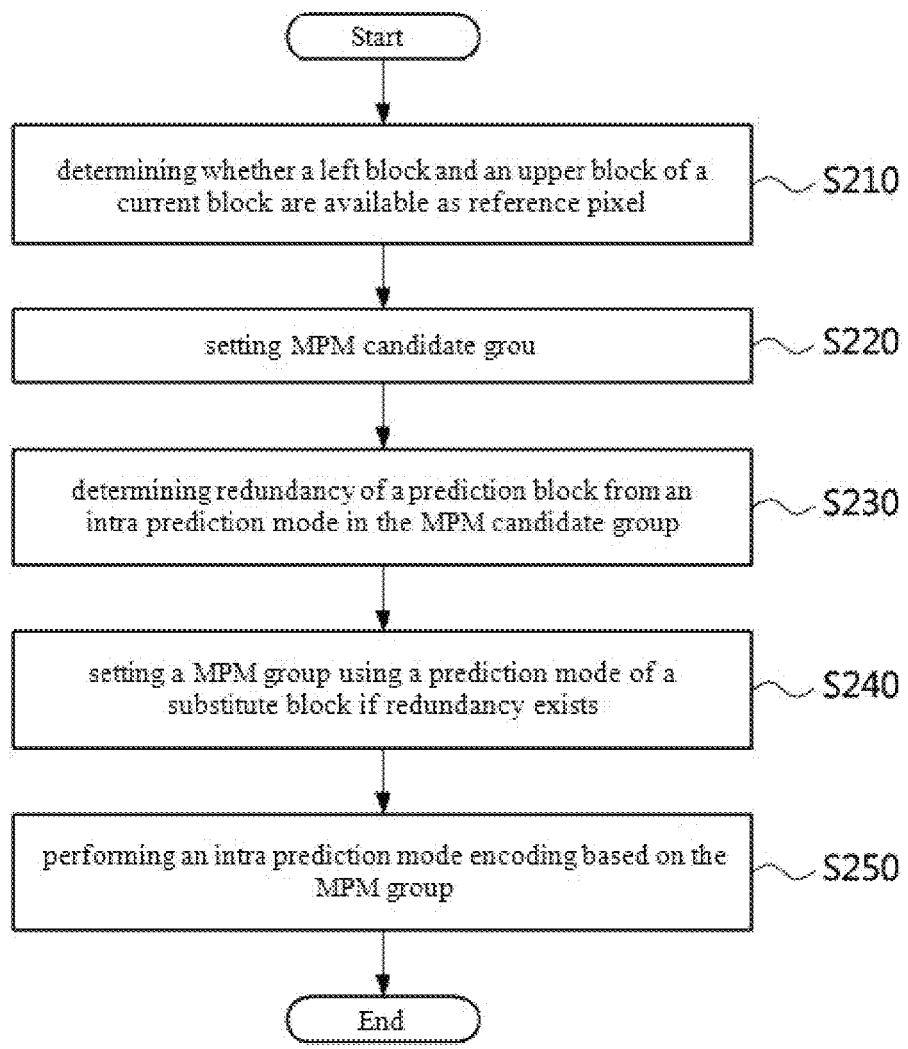
FIG. 34 is a flowchart illustrating an image encoding method for performing intra prediction according to an embodiment of the present invention.

FIG. 34 is a flowchart illustrating an image encoding method for performing intra prediction according to an embodiment of the present invention.

Referring to FIG. 34, an image encoding method for performing intra prediction includes determining whether each of a left block and an upper block of a current block are available in the reference pixel configuration of the current block (S210), selecting a most probable mode MPM candidate group based on the determined result (S220), determining the redundancy of a prediction block derived from an intra prediction mode in the MPM candidate group (S230), selecting a MPM group using a prediction mode of a substitute block adjacent to the left block or adjacent to the upper block if it is determined that the redundancy exists (S240), and performing an intra prediction mode encoding for the current block based on the selected MPM group (S250).

Here, the determining whether or not each block is available (S210) may be determined to be unavailable when the left block and the upper block exist outside the image boundary or are encoded with the inter prediction, and may be determined to be available when they are otherwise.

Herein, the MPM candidate group may include at least one of intra prediction mode for the block determined to be available among the left block and the upper block, intra-prediction mode predetermined for the block determined to be unavailable, a planar prediction mode, planar prediction mode, vertical prediction mode, and a DC prediction mode.

Here, the determining the redundancy (S230) may determine the redundancy based on variance values computed for reference pixel values in two or more consecutive blocks among the blocks located at lower left, left, upper left, upper, and upper right of the current block, when the left block and the upper block are all available. For example, two or more consecutive blocks are selected and grouped, and the variance values of the selected groups are calculated. If the calculated variance value is smaller than the boundary value, it can be determined that the redundancy exists.

The determining the redundancy (S230) includes steps of selecting the intra prediction mode constructed by referring only to boundary pixels between the unavailable block and the current block when at least one of the left block and the upper block is unavailable, and determining that the redundancy exists when at least two of the prediction modes selected are included in the MPM candidate group.

Here, the substitute block can be selected from adjacent blocks located at lower left, upper left, and upper right of the current block.

Herein, if the adjacent block is composed of one or more blocks, the substitute block may be selected with a clockwise or counterclockwise priority among one or more blocks.

Here, the substitute block may be selected with a clockwise or counterclockwise priority among the adjacent blocks located at lower left, upper left, and upper right of the current block.

An image decoding method for performing intra prediction may include extracting data on whether a prediction mode for a current block is included in a most probable mode MPM group from received bitstream, determining whether a prediction mode for the current block is included in the MPM group based on the data, extracting MPM group index data of the current block from the received bitstream when it is determined that the prediction mode for the current block is included in the MPM group, confirming the prediction mode for the current block in the MPM group based on the extracted MPM group index data, and performing intra prediction on the current block based on the confirmed prediction mode.

Here, the MPM group may be selected by determining whether a left block and an upper block of the current block can be used for constructing a reference pixel of the current block, selecting a most probable mode MPM candidate group based on the determined result, determining redundancy of prediction blocks derived from intra prediction modes in the MPM candidate group, and using a prediction mode of a substitute block adjacent to the left block or adjacent to the upper block when it is determined that the redundancy exists.

Here, the determining whether or not the blocks can be used may determine to be unavailable when each of the left block and the upper block exists outside an image boundary or encoded with inter prediction, and may determine to be available when they are otherwise.

Here, the MPM candidate group may be selected from intra prediction mode for a block determined to be available among a left block and an upper block, intra-prediction mode predetermined for a block determined to be unavailable, a planar prediction mode, a prediction mode, and a DC prediction mode.

Here, the determining the redundancy of the prediction block may be performed by determining the redundancy based on variance values computed for reference pixel values in two or more consecutive blocks among the blocks located at lower left, left, upper left, upper, and upper right of the current block, when the left block and the upper block are all available.

Here, the determining the redundancy of the prediction block may be performed by selecting an intra prediction mode constructed by referring only to boundary pixels between the unavailable block and the current block when at least one of the left block and the upper block is unavailable, and determine that the redundancy exists when at least two of the prediction modes selected are included in the MPM candidate group.

Here, the substitute block may be selected from adjacent blocks located at lower left, upper left, and upper right of the current block.

Here, when an adjacent block is constructed with one or more blocks, the substitute block may be selected with a clockwise or counterclockwise priority among the one or more blocks.

Here, the substitute block may be selected with a clockwise or counterclockwise priority among the adjacent blocks located at lower left, upper left, and upper right of the current block.

In an image decoding device including one or processors according to other aspect of the present invention, the one or more processors may extract data related to whether a prediction mode for a current block is included in a most probable mode MPM group from bitstream received, determine whether the prediction mode for the current block is included in the MPM group based on the data, extract MPM group index data of the current block from the received bitstream when it is determined that the prediction mode for the current block is included in the MPM group, confirm the prediction mode for the current block in the MPM group based on the extracted MPM group index data, and perform intra prediction on the current block based on the confirmed prediction mode.

Here, the MPM group may be selected by determining whether a left block and an upper block of the current block can be used for constructing a reference pixel of the current block, selecting a MPM candidate group based on the determined result, determining redundancy of the prediction block derived from an intra prediction mode in the MPM candidate group, and using a prediction mode of a substitute block adjacent to the left block or adjacent to the upper block when it is determined that redundancy exists.

Here, the determining whether or not the blocks can be used may be performed by determining to be unavailable when each of the left block and the upper block exist outside an image boundary or encoded with inter prediction, and may determine to be available when they are otherwise.

The determining the redundancy of the prediction block may be performed by selecting intra prediction mode constructed by referring only to boundary pixels between the unavailable block and the current block when at least one of the left block and the upper block is unavailable, and determine that the redundancy exists when at least two of the prediction modes selected are included in the MPM candidate group.

According to the embodiment described above, it is possible to provide the image encoding and decoding technology of high performance and efficiency that is generally available in an international codec such as MPEG-2, MPEG-4, and H.264 or other codec in which the intra prediction is used, a medium using such codec, and image industry.

In future, it is expected to be applied to the current high efficiency image encoding technology (HEVC) and the image processing using standard codec such as H.264/AVC and intra prediction.

While the present invention has been particularly shown and described with reference to exemplary embodiments thereof, it will be understood by those of ordinary skill in the art that various changes and modifications may be made without departing from the spirit and scope of the present invention as defined by the following claims.

The invention claimed is:

1. An image decoding method, comprising:
    decoding information indicating whether or not a current picture including a current block is included in a reference list;
    generating a reference picture list 0 and a reference picture list 1 for the current block;
    determining a reference picture of the current block based on the reference picture list 0 and the reference picture list 1; and
    performing inter prediction on the current block using the reference picture,
    wherein the reference picture list 0 and the reference picture list 1 include the current picture according to the information,
    wherein the reference picture list 0 is generated by sequentially assigning a first reference picture previous to the current picture, a second reference picture subsequent to the current picture, and the current picture, and
    wherein the reference picture list 1 is generated by sequentially assigning the second reference picture subsequent to the current picture, the first reference picture previous to the current picture, and the current picture.

2. An image encoding method, comprising:
    generating a reference picture list 0 and a reference picture list 1 for a current block;
    determining a reference picture of the current block based on the reference picture list 0 and the reference picture list 1;
    performing inter prediction on the current block using the reference picture; and
    encoding information indicating whether or not the current picture including the current block is included in a reference list;
    wherein the reference picture list 0 and the reference picture list 1 include the current picture according to the information,
    wherein the reference picture list 0 is generated by sequentially assigning a first reference picture previous to the current picture, a second reference picture subsequent to the current picture and the current picture, and
    wherein the reference picture list 1 is generated by sequentially assigning the second reference picture subsequent to the current picture, the first reference picture previous to the current picture and the current picture.

3. A recoding medium storing a bitstream formed by a method for encoding a video signal, the method comprising:
    generating a reference picture list 0 and a reference picture list 1 for a current block;
    determining a reference picture of the current block based on the reference picture list 0 and the reference picture list 1;
    performing inter prediction on the current block using the reference picture; and
    encoding information indicating whether or not the current picture including the current block is included in a reference list;
    wherein the reference picture list 0 and the reference picture list 1 include the current picture according to the information,
    wherein the reference picture list 0 is generated by sequentially assigning a first reference picture previous to the current picture, a second reference picture subsequent to the current picture and the current picture, and
    wherein the reference picture list 1 is generated by sequentially assigning the second reference picture subsequent to the current picture, the first reference picture previous to the current picture and the current picture.

* * * * *

UNITED STATES PATENT AND TRADEMARK OFFICE
CERTIFICATE OF CORRECTION

PATENT NO. : 11,368,675 B2  
APPLICATION NO. : 16/579217  
DATED : June 21, 2022  
INVENTOR(S) : Je Chang Jeong et al.

Page 1 of 1

It is certified that error appears in the above-identified patent and that said Letters Patent is hereby corrected as shown below:

On the Title Page

Column 2, item (56) Other Publications, Line 1, delete "Motifications" and insert --Modifications--.

In the Claims

Column 52, Claim 2, Line 24, after "sequent to the current picture", insert --,--.

Column 52, Claim 2, Line 29, after "previous to the current picture", insert --,--.

Column 52, Claim 3, Line 50, after "sequent to the current picture", insert --,--.

Column 52, Claim 3, Line 55, after "previous to the current picture", insert --,--.

Signed and Sealed this  
Fourteenth Day of January, 2025

Derrick Brent  
*Acting Director of the United States Patent and Trademark Office*